United States Patent [19]

Masaitis et al.

[11] Patent Number: 4,499,595
[45] Date of Patent: Feb. 12, 1985

[54] SYSTEM AND METHOD FOR PATTERN RECOGNITION

[75] Inventors: William Masaitis, Castle Hayne; Robert O. Canada, Wilmington, both of N.C.

[73] Assignee: General Electric Co., Orlando, Fla.

[21] Appl. No.: 307,541

[22] Filed: Oct. 1, 1981

[51] Int. Cl.³ .............................................. G06K 9/68
[52] U.S. Cl. ........................................ 382/9; 382/30; 382/34; 382/50
[58] Field of Search ........................ 382/9, 30, 34, 50

[56] References Cited

U.S. PATENT DOCUMENTS

| | | | |
|---|---|---|---|
| 3,217,294 | 11/1965 | Gerlach et al. | 382/62 |
| 3,278,899 | 10/1966 | Shelton, Jr. et al. | 382/42 |
| 3,432,673 | 3/1969 | Mader | 382/48 |
| 3,444,517 | 5/1969 | Rabinow | 382/17 |
| 3,462,737 | 8/1969 | Malaby | 382/47 |
| 3,484,747 | 12/1969 | Nunley | 382/52 |
| 3,517,167 | 6/1970 | Bell | 250/219 |
| 3,522,585 | 8/1970 | LeMay | 382/34 |
| 3,559,169 | 1/1971 | Gillman et al. | 340/146.3 |
| 3,576,534 | 4/1971 | Steinberger | 382/34 |
| 3,581,281 | 5/1971 | Martin | 382/14 |
| 3,596,063 | 7/1971 | Curtis et al. | 235/61.11 F |
| 3,601,805 | 8/1971 | Snook | 340/149 R |
| 3,614,736 | 10/1971 | McLaughlin | 382/34 |
| 3,618,016 | 11/1971 | Van Steenis | 382/30 |
| 3,629,826 | 12/1971 | Cutaia et al. | 382/9 |
| 3,699,536 | 10/1972 | Roberts | 382/56 |
| 3,706,071 | 12/1972 | Gray | 382/34 |
| 3,710,078 | 1/1973 | Lemelson | 235/61.11 E |
| 3,713,099 | 1/1973 | Hemstreet | 382/34 |
| 3,713,100 | 1/1973 | Hemstreet | 382/34 |
| 3,717,848 | 2/1973 | Irving et al. | 382/48 |
| 3,723,970 | 3/1973 | Stoller | 382/50 |
| 3,735,349 | 5/1973 | Beun et al. | 382/55 |
| 3,747,066 | 7/1973 | Vernot et al. | 382/52 |
| 3,760,355 | 9/1973 | Bruckert | 382/34 |
| 3,760,356 | 9/1973 | Srivastava | 382/30 |
| 4,173,015 | 10/1979 | Owens et al. | 382/9 |
| 4,244,029 | 1/1981 | Hogan et al. | 382/34 |
| 4,250,488 | 2/1981 | Haupt | 382/50 |
| 4,288,782 | 9/1981 | Bader et al. | 382/34 |
| 4,308,523 | 12/1981 | Schapira | 382/34 |

Primary Examiner—Leo H. Boudreau
Attorney, Agent, or Firm—James H. Beusse

[57] ABSTRACT

A system and method are disclosed for optically reading out one or more discrete line patterns from a pattern-carrying medium under a range of different conditions. The patterns may constitute alphanumeric characters arranged in serial alignment on the medium or a variety of other types of line patterns, or a single line pattern. In accordance with the present invention, the disclosed system is capable of successively reading out the patterns with a high degree of reliability, notwithstanding variations in their size, orientation and location, or variations in the color and reflectivity of the pattern-carrying medium surface. Further, the disclosed system and method are tolerant of the presence of blotches, scratches and other surface marks, and of irregularities in the otherwise uniform planar or curved surface of the medium. The invention is applicable to the readout of patterns that are printed on the surface, stamped or otherwise impressed onto it, or raised above it by embossing or the like.

46 Claims, 51 Drawing Figures

Microfiche Appendix Included
(1 Microfiche, 63 Pages)

FIG. 1
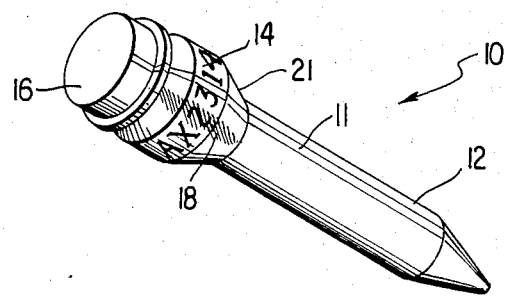
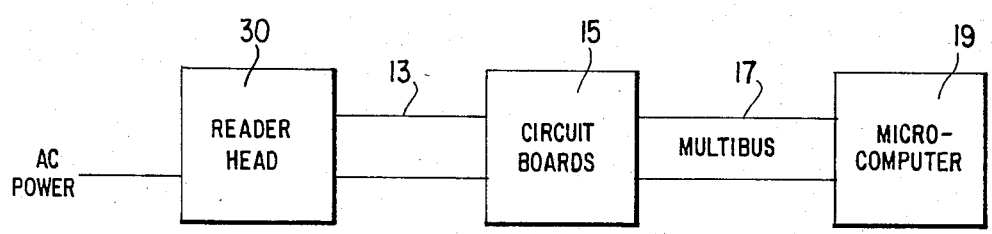
FIG. 2A
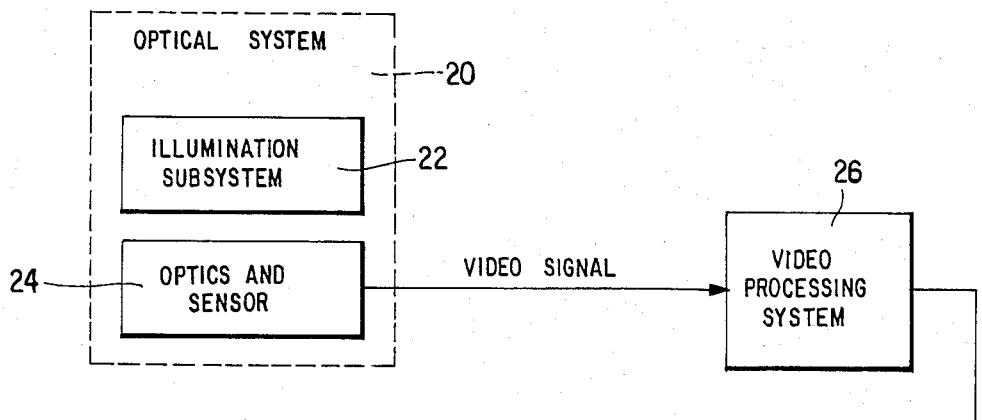
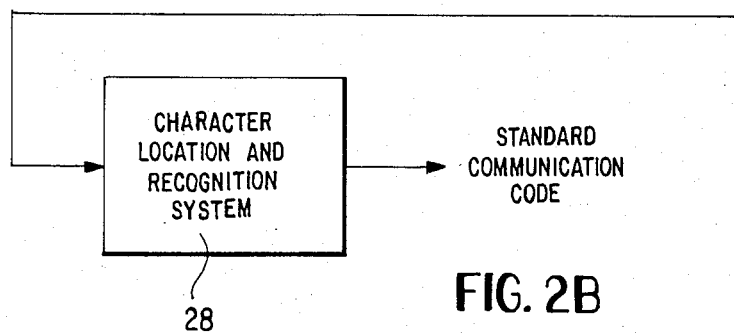
FIG. 2B

FIG. 5A
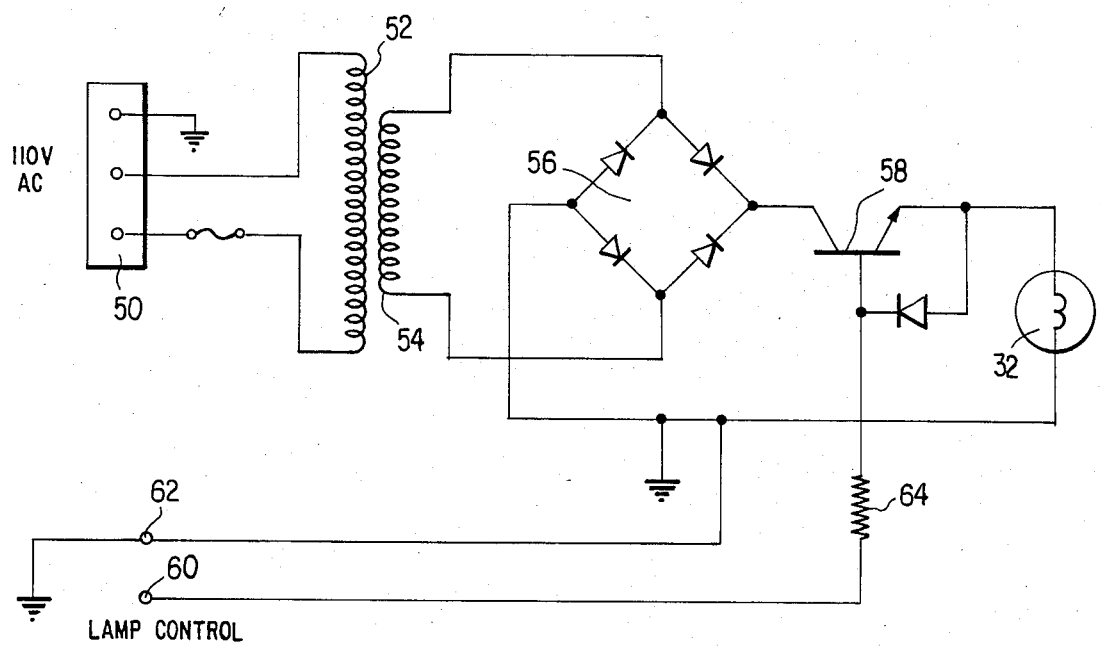
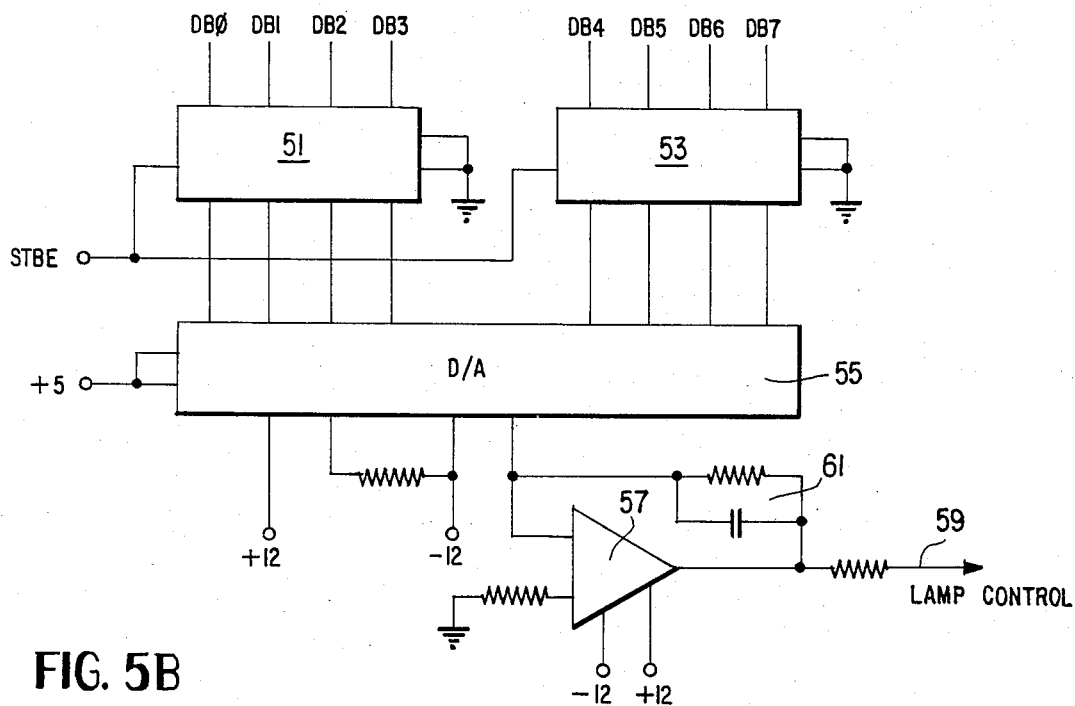
FIG. 5B

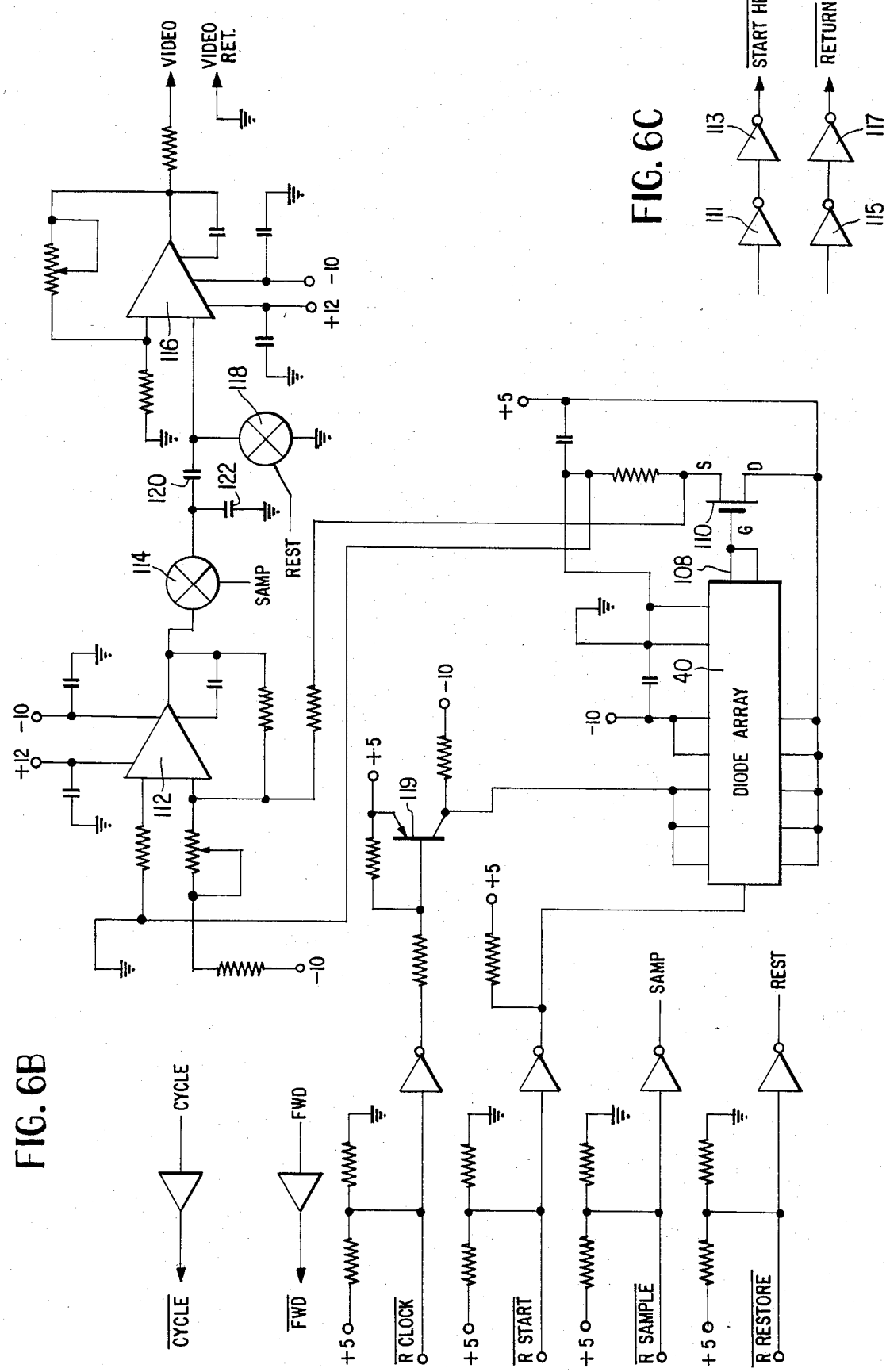

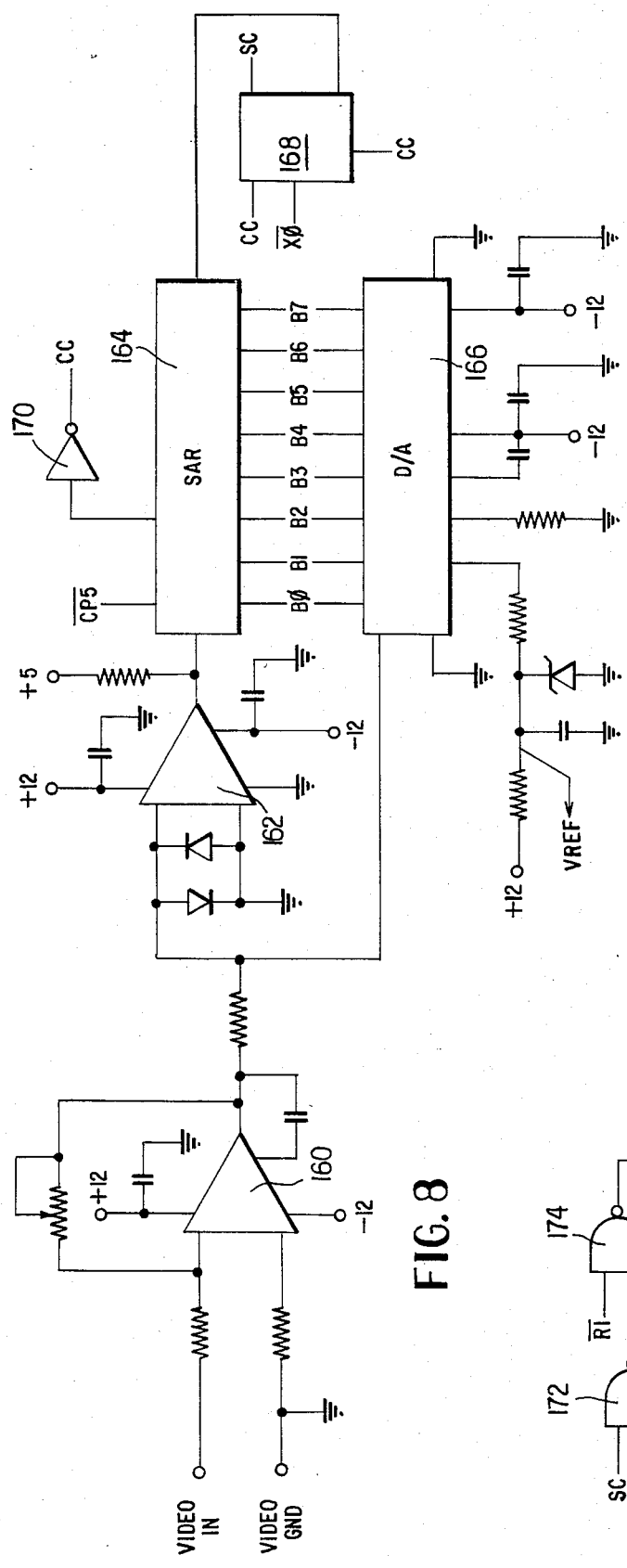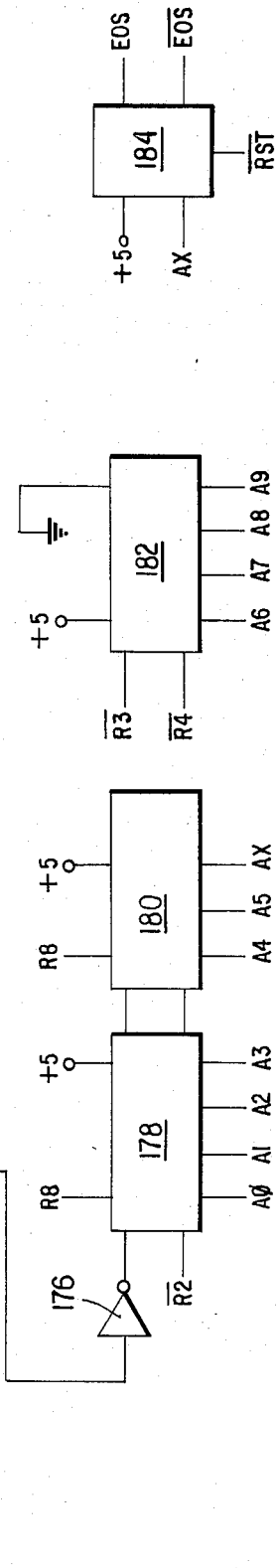
FIG. 8
FIG. 9A
FIG. 9B
FIG. 9C

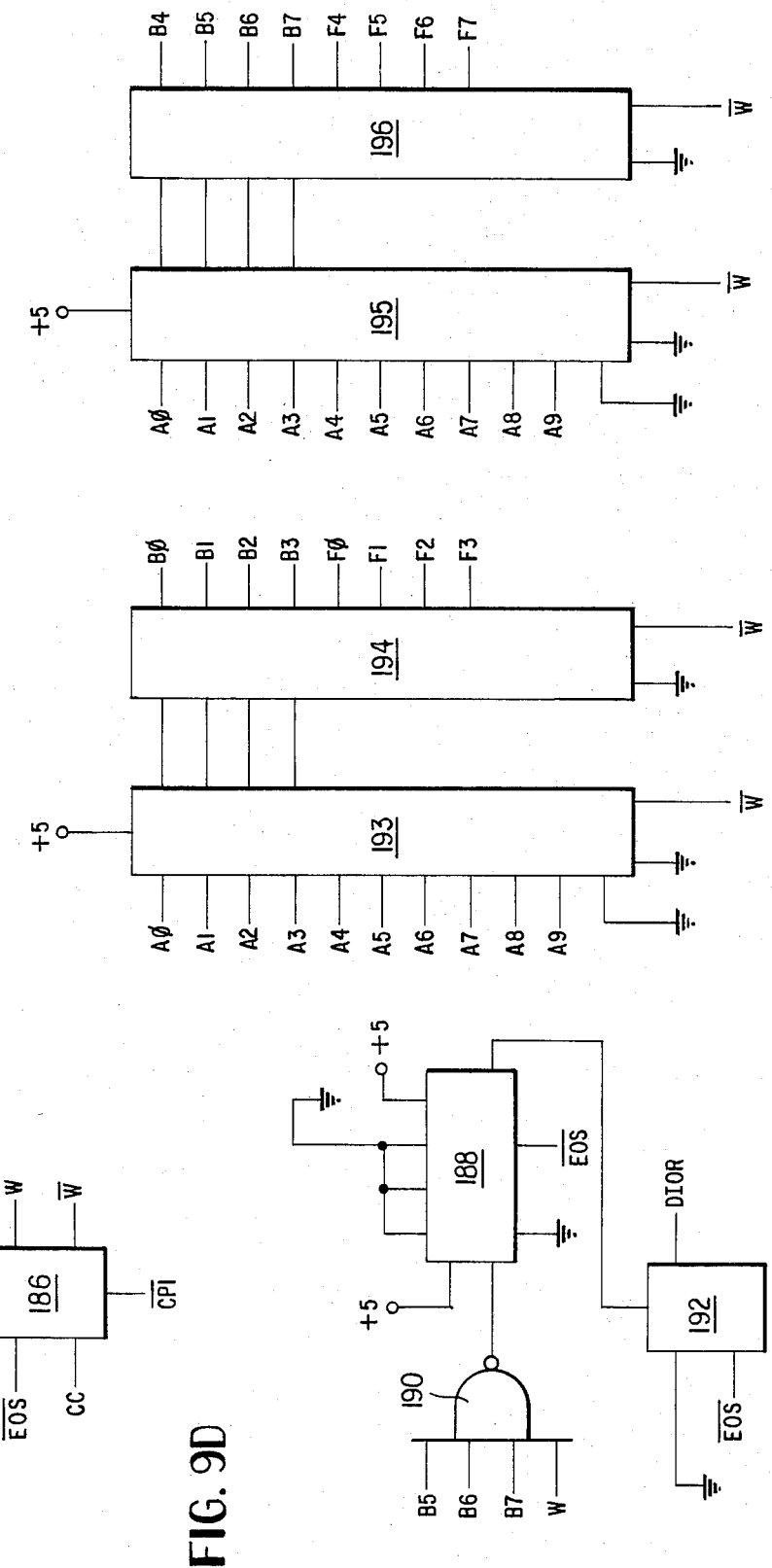

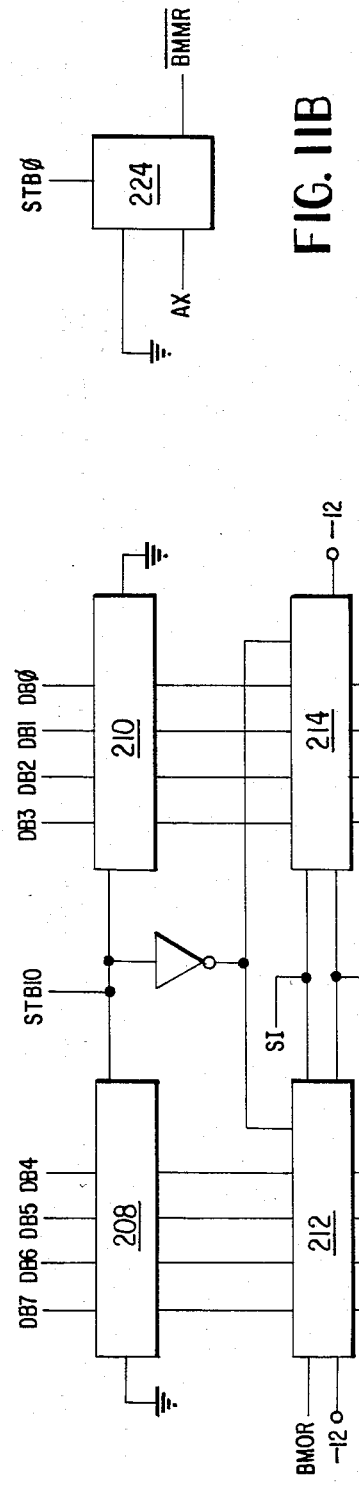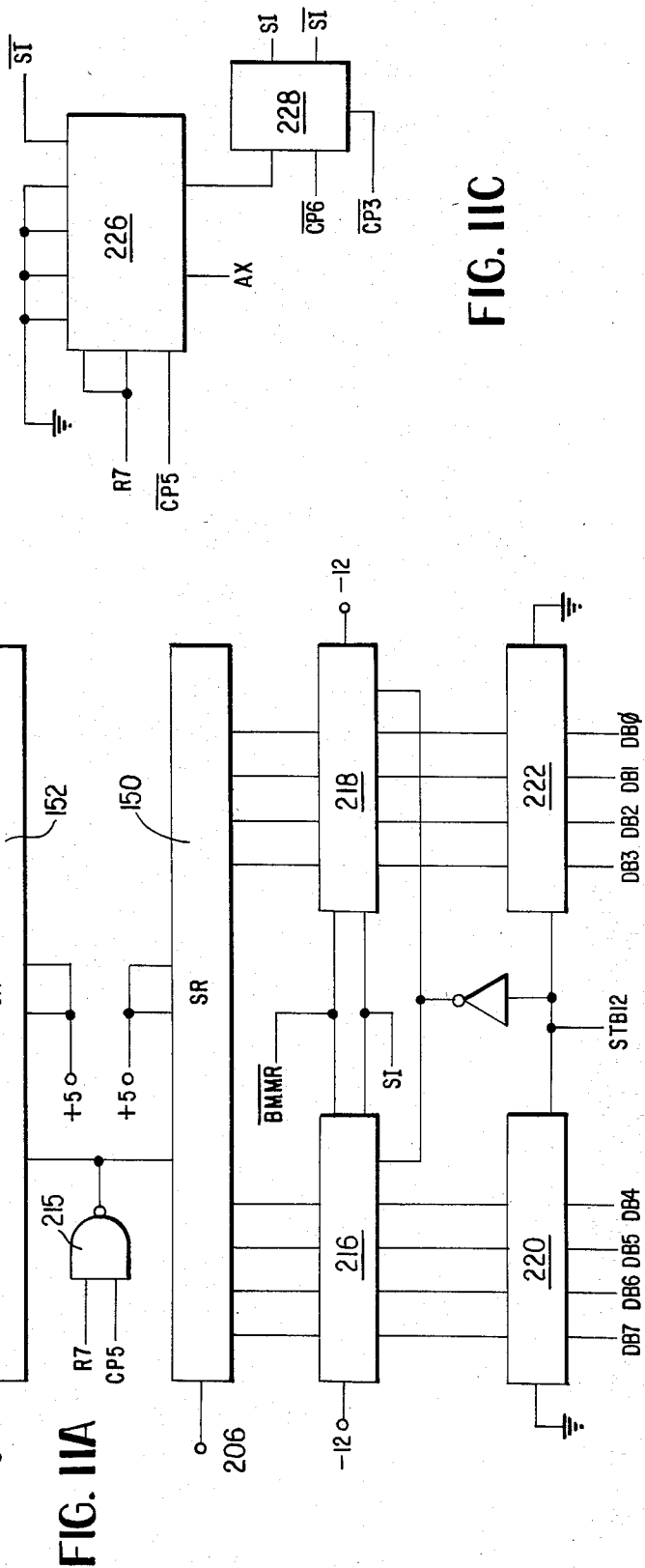
FIG. 11A  FIG. 11B  FIG. 11C

FIG. 17D
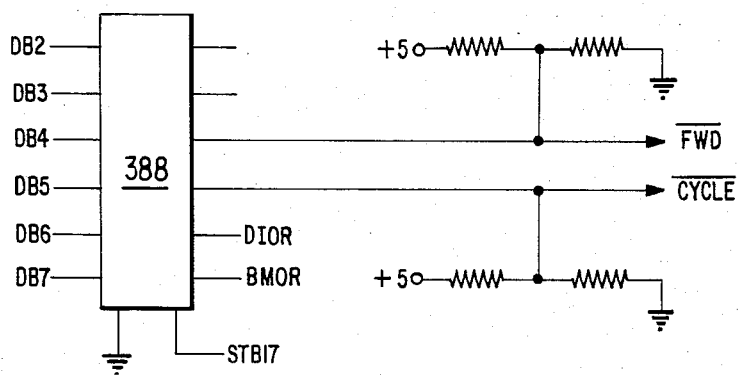
FIG. 17E
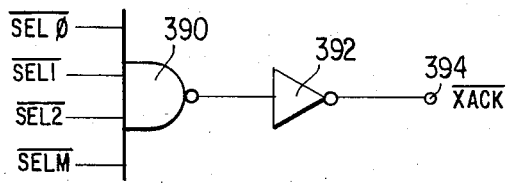
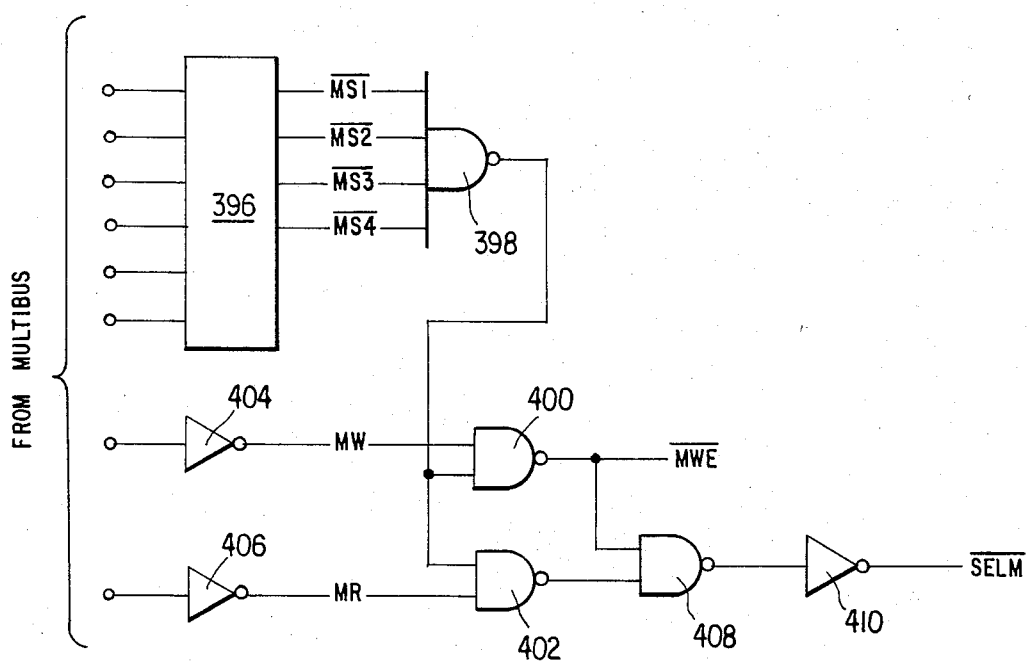
FIG. 17F

SYSTEM AND METHOD FOR PATTERN RECOGNITION

This application includes a microfiche appendix comprising one sheet having 63 frames.

The present invention relates in general to new and improved systems and methods for optical pattern recognition, in particular to a system and method for reliably reading out line patterns of arbitrary shape, orientation and location from a pattern-carrying medium.

BACKGROUND OF THE INVENTION

The art is replete with examples for optically reading patterns of uniform size and spacing from planar surfaces of relatively low and unvarying reflectivity, on which the patterns are printed or are otherwise placed in a conventional manner. In general, these patterns are discrete characters belonging to one or more sets of such characters, e.g., to a set of alphabetical characters and a set of numerical characters, each having a predetermined format. Problems arise during the readout of these patterns when, instead of being printed on the pattern-carrying surface, the patterns are raised above the surface by embossing or the like, or when they are impressed into the surface by stamping, engraving, laser cutting, grinding, or by other methods. Such patterns are sometimes referred to as "low-quality" patterns, because they are difficult to read and recognize for reasons associated either with the pattern itself, or with the background from which the pattern must be distinguished in order to be read, or both.

Low quality patterns occur where, for example, the uniformity of pattern size, orientation or spacing cannot be controlled, or where the uniformity of the pattern-carrying surface is not predictable. For example, it may be desired to read line patterns which are serially disposed around the periphery of a cylindrical, specular surface. While optical readout from such a surface is itself difficult, the problem is further compounded if the surface reflectivity varies due to surface blotches or marks, or if surface scratches exist which may be confused with the line patterns themselves.

The problem of reliable readout becomes still more difficult where the patterns do not lie in the surface of the medium, for example where they are stamped or otherwise impressed onto the surface. The stamping of patterns, particularly onto the surface of a metallic medium, may further bring about edge upset, which occurs when the stamping process displaces metal and produces raised ridges along the edges of the stamped line. Where edge upset is present and the uniformity of the surface has been disturbed even by a small amount, the appearance of the pattern image may be altered insofar as an optical pattern recognition system is concerned. Edge upset may cause a pattern to appear enlarged, diminished, or otherwise distorted, so as to produce variations with respect to the predetermined format of the corresponding known pattern to which it must be compared for identification purposes.

Where the stamping or other pattern-applying process is not precisely controlled, the spacing of the respective patterns in a succession, or string, of such patterns may not be uniform. Further, the respective patterns may not be properly aligned with each other along their path on the medium. It is also possible for the orientation of the respective patterns to vary. Finally, any wear of the stamping die, which will be most pronounced in those dies that are more frequently used, may cause the pattern stamped into the surface of the medium to vary in line width, size and shape.

There are many situations in which an optical pattern recognition system must be capable of handling some or all of the above-described variations, yet produce reliable readout of the unknown patterns. Examples of such situations are the reading of type with a view to checking the quality of the type fonts, reading serial numbers from tires in situations where the background of the pattern provides little contrast with respect to the pattern; and reading serial numbers from reflective surfaces, particularly from curved metallic surfaces onto which the line patterns have been stamped.

The last-recited situation poses particularly trying conditions and any or all of the above-mentioned variations may be encountered. For example, serial numbers or other identifying indicia are normally stamped on the cylindrical collars of the end plugs of fuel rods of the type used in a conventional nuclear-fueled power generating station. The serial numbers make it possible to keep track of these rods before and after use. After the number is stamped on the collar of each plug and before the plug is inserted into its fuel rod housing, the plug may or may not be sanded down to reduce the effect of metal upset produced by the stamping process. Plug handling during these operations inevitably produces some scratches on the plug surface which may conceivably be confused with the line patterns during readout. Outgassing during the use of the plug on the rod may create blotches and other marks on the plug surface, which in turn may produce relatively large variations of the reflectivity of the specular plug surface. Finally, even where the plugs are sanded down, some unevenness of the surface due to edge upset is likely to remain and affect the reliability of readout of the patterns.

Heretofore available systems and methods for reading out low-quality patterns of the type described have yielded unacceptably high error rates, ranging as high as 1/100. Some improvement is obtained by carefully monitoring the process by which the pattern is stamped on the end plug surface. However, the relatively small size of the plug diameter, on the order of $\frac{1}{2}$ inch, makes accurate control of the stamping process difficult. Further, in a practical situation monitoring cannot be guaranteed, except at relatively high cost. A further disadvantage of applicable prior art optical pattern recognition equipment has been its high cost. This is particularly the case for equipment required to operate under the above-described adverse conditions. As a consequence, there has been a general reluctance to invest in such equipment and a tendency to search for other ways of identifying the fuel rods.

In a copending application of William D. Barber et al, Ser. No. 149,841, filed May 14, 1980, now U.S. Pat. No. 4,339,745 which is assigned to the assignee of the present invention, certain improvements over the prior art in the optical character recognition field are described, which deal with some of the problems outlined above. However, the system and method described in the aforesaid copending application is situation-limited in a number of respects and it requires readout conditions that may not always be present under truly adverse operating conditions.

OBJECTS OF THE INVENTION

It is a primary object of the present invention to provide new and improved systems and methods for optical pattern recognition, which are cost effective and which provide materially improved performance over heretofore available systems and methods for reading such patterns.

It is another object of the present invention to provide a new and improved system and method for optical pattern recognition for reliably reading one or more line patterns against a highly reflective background.

It is a further object of the present invention to provide a new and improved system and method for optical pattern recognition for reliably reading discrete line patterns against a background whose reflectivity may undergo large variations due to blotches and marks on the pattern-carrying surface.

It is still another object of the present invention to provide a new and improved system and method for optical pattern recognition for reliably reading a succession of discrete line patterns that are stamped or otherwise impressed onto the surface of a pattern-carrying medium.

It is still a further object of the present invention to provide a new and improved system and method for reliably reading one or more discrete line patterns by optical pattern recognition techniques, which are tolerant of variations of the size, location, orientation, alignment and line width of the patterns, as well as of scratches on the pattern-carrying surface.

Yet a further object of the present invnetion is to provide a new and improved system and method of optical pattern recognition capable of learning many different types of known patterns and reading out unknown patterns by comparison thereto.

It is yet another object of the present invention to provide a new and improved system and method for optical pattern recognition for reliably reading line patterns from flat or curved surfaces of a pattern-carrying medium, which are tolerant of non-uniformities in such surfaces caused by edge upset or the like.

An additional object of the present invention is to provide a system and method for optically reading out characters stamped onto a metallic surface, wherein the characters are selected from a plurality of character sets and readout occurs rapidly and with a high degree of reliability.

These and other objects of the present invention, together with the features and advantages thereof, will become apparent from the following detailed specification when read together with the accompanying drawings in which applicable reference numerals have been carried forward.

SUMMARY OF THE INVENTION

The present invention provides a system and method for reading out a succession of unknown line patterns from a pattern-carrying medium. The readout process employs an optical system including a linear array of light sensitive devices, which reads a progressively advancing area along the path in which the patterns are generally disposed. A light source illuminates the patterns and the light sensitive devices provide output signals proportional to the intensity of the diffused light reflected to them from the patterns. Variations of the reflectivity of the medium surface, which provides the background against which the patterns are read, are accommodated by rapidly varying the light intensity of the light source. The signals are digitized and a status indication is derived for each area element of the pattern-carrying surface. These status indications are generated by means of an edge enhancement operation, which provides a line-present or a line-absent indication for each area element of the surface. The status indications are stored at appropriate addresses of a memory and are jointly adapted to map the unknown patterns on an imaginary grid matrix whose matrix elements correspond to the aforesaid area elements of the pattern-carrying surface.

The invention permits the readout of unknown patterns which depart in size, alignment, orientation or location from their expected norms by determining the starting point of the pattern succession and then manipulating each pattern into a small portion of the grid matrix to fix its location. Pattern recognition of each unknown pattern is carried out by comparing it with prelearned maps of the set(s) of patterns from which the unknown pattern has been selected. This is done for a plurality of different locations of the known pattern within its grid matrix portion. The comparison results are further compared to a care map associated with each pattern of the set, i.e. a pre-learned map in which only points of maximum difference are plotted. A correlation index is provided by each of the last-mentioned comparisons from which an identification of the read out unknown pattern is made with one of the known patterns of the set. A standard communication code is then stored for the pattern so read out.

BRIEF DESCRIPTION OF THE DRAWINGS

FIG. 1 is an enlarged view of an end plug which bears a stamped serial number for readout;

FIG. 2A illustrates the physical layout of the pattern recognition system to which the invention is directed;

FIG. 2B is a block diagram of certain functional portions of the pattern recognition system that are pertinent to an understading of the invention;

FIG. 5A shows a lamp control circuit for controlling the illumination intensity level in the reader head;

FIG. 5B shows a lamp control signal circuit for use with the circuit shown in FIG. 5A;

FIG. 6B illustrates a control circuit for the diode array used in the optical system of the reader head;

FIG. 6C illustrates circuitry for the generation of certain control signals used by the reader head motor;

FIG. 8 illustrates the A/D converter of the video processor shown in FIG. 7A and associated circuitry;

FIGS. 9A–9G illustrate different portions of the video processor for generating various address and control signals and for providing intermediate RAM storage;

FIG. 11A illustrates the shift registers and the memory buffers of the video processor;

FIGS. 11B and 11C show circuitry for developing various control signals for use in the video processor;

FIG. 17D shows another interface circuit;

FIG. 17E illustrates an acknowledgement circuit;

FIG. 17F illustrates a decoding circuit for obtaining memory select signals;

FIGS. 22A-22B illustrate the generation of pattern maps; and

FIGS. 23A-23B illustrate the generation of care maps.

Figure 3:
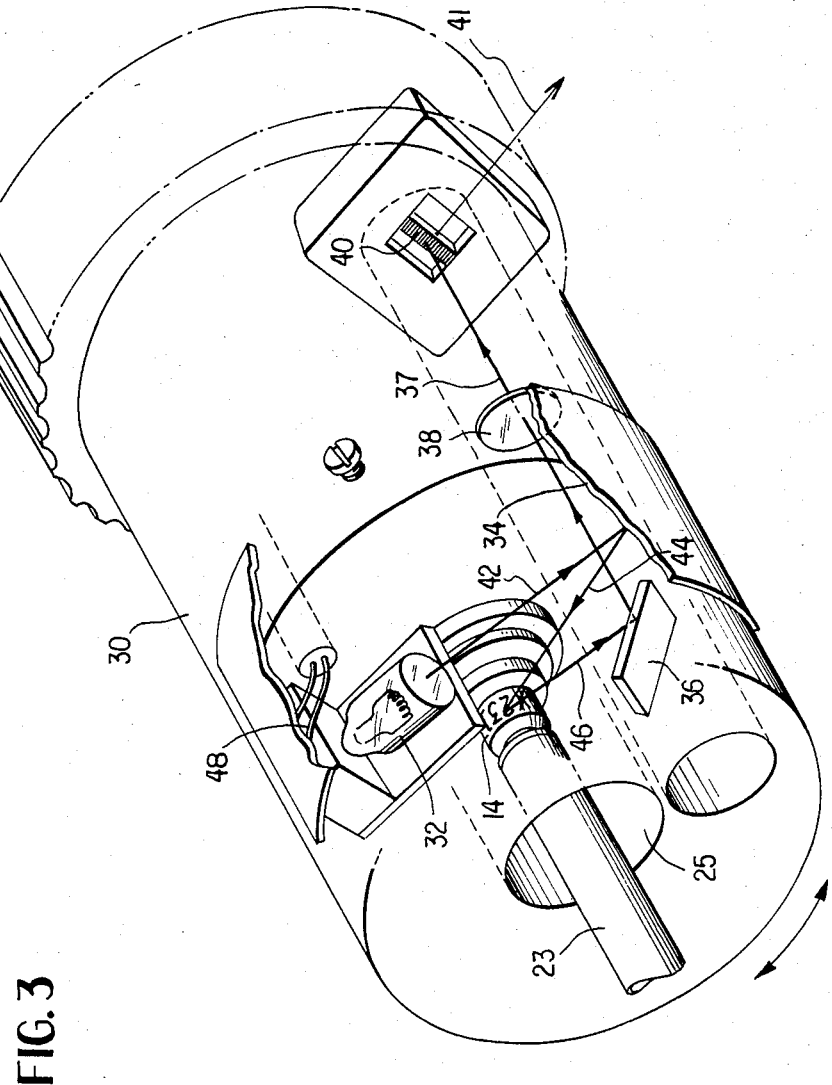
FIG. 3 illustrates a reader head for reading out patterns from an end plug of the type shown in FIG. 1.

The invention will be explained with reference to the readout of patterns which take the form of alphanumeric characters, specifically characters that are stamped as an identifying serial number on the cylindrical surface of the end plug of a fuel rod. However, it will be understood that the invention is not so limited and that it is applicable to many different situations in which a line pattern must be reliably read out by means of optical pattern recognition under adverse and unpredictably varying conditions.

With reference now to the drawings, FIG. 1 is an enlarged view of an end plug 10 for use on a fuel rod of the type that is found in a conventional nuclear-fueled power generating station. Plug 10 includes a shaft 12, a collar 14 having a conical section 21, and a cap 16. Collar 14 forms a cylindrical surface on which the identification number of the associated fuel rod is stamped. In an actual example, the succession (or string) of characters consists of two alphabetical characters succeeded by five numerical characters, each having a height of about 70 mil. Because the plug is made of metal, e.g. from a zirconium alloy or the like, the reflectivity of the cylindrical pattern-carrying surface, as shown at 11, tends to interfere with the optical readout of the patterns. Further, the pattern-carrying surface may be marred by scratches sustained in the plug handling process, by blotches due to outgassing, or by other marks. One such spot, indicated by reference numeral 18, is seen to darken the background against which the character is read and it therefore reduces the contrast between them.

FIG. 2A illustrates the physical layout of the system to which the invention is directed. A reader head 30 is connected through an electrical connecting link 13 to various circuit boards which are mounted on a rack 15. The latter further includes an 8-bit data bus which serves as the main data commuication channel between the respective circuit boards, or portions thereof.

The circuit boards and the data bus are connected to a microcomputer 19 through a bidirectional multibus 17 which carries both data as well as control signals. In a preferred embodiment of the invention, microcomputer 19 comprises an Intel 8080 microprocessor and support circuits, specifically Model SBC 80/20-4. However, it will be understood that the invention is not so limited and that other commercially available microprocessors may be used.

FIG. 2B illustrates in block diagram form certain functional portions of the overall pattern recognition system to which the invention herein is directed. An optical system 20 is seen to include an illumination subsystem 22, as well as a block 24 which contains the optics and the sensor that are used. The output of block 24 provides a video signal representative of the sensed pattern image.

The video signal is coupled to a video processing system 26 whose output, in turn, is applied to a character location and recognition system 28. Unit 28 is adapted to provide a standard communication code at its output which designates a particular character of a set (or sets) of known characters, with which the character that was read out has been identified. In the example under consideration, there are two character sets, i.e., the alphabet and the numbers 0 through 9, each conforming to a predetermined format.

FIG. 3 illustrates a reader head 30 in which end plug 12 is shown inserted for reading out the serial number stamped on the cylindrical surface of plug collar 14. Conical section 21 mates with a conforming surface of the reader head to position the plug in an axial direction. In the illustrated example, cap 16 of the plug is welded to a fuel rod 23. The cap is not visible in FIG. 3. The greater portion of the fuel rod remains outside opening 25 when the plug is inserted for readout.

The reader head contains a portion of optical system 20 which is illustrated in FIG. 2B. The optical system includes a source of illumination 32, which is shown as a high-intensity incandescent lamp in the drawing. The light which reaches the sensor is diffused by a series of reflectors. Alternatively, the light source may consist of a source of diffused light or, under certain conditions, a laser source. The optical system further includes a first reflector 34, a second reflector 36, a schematically indicated optical arrangement 38, and a sensor 40. In the example under consideration, the sensor comprises a linear array of 64 discrete light sensitive devices, such as photodiodes. Such an array is commercially available from Reticon Corp. of Sunnyvale, Calif. Each photodiode has a height and width respectively of approximately 2 mil. Although the actual characters on the plug may have a height on the order of 125 mil, optical arrangement 38 reduces the character height projected onto array 40. Accordingly, as will be seen from the discussion below, an array having fewer diodes would be adequate for the purpose at hand, if readily available on a commercial basis.

As is schematically shown in FIG. 3, a light beam 42 is emitted by lamp 32 and is reflected by curved reflector 34. The reflected beam 44 is directed to the surface of plug collar 14 on which the aforesaid serial succession of characters has been stamped. As indicated by light beam 46, the image of the character so illuminated is reflected to reflector 36 and thence, by way of beam 37, to photodiode array 40 through optical arrangement 38.

In a preferred embodiment of the invention, reader head 30 is constructed to allow the optical system to rotate relative to stationary end plug 12. In a specific embodiment of the invention, the angle of rotation is selected to be 420°, after which the optical system rotates back to its starting position. This angle is chosen such that, regardless of the point along the path at which viewing is begun, the complete string of characters may be viewed by the array, starting with the first character. The apparatus may be programmed to repeat the reading operation several times in order to enhance the reliability of the readout. Continuous rotation in the same direction is precluded by wires 48 in the illustrated embodiment, as well as by lead 41 which transmits the diode output signals from the array. However, slip rings could be used if continuous rotation is desired. Further, although such an arrangement is impractical because of the size of the fuel rod, it will be clear that the plug itself may be rotated while the optical system remains stationary.

As shown in FIG. 1, the path of the character string encircles the cylindrical surface of collar 14. The characters are generally aligned with each other along the path and each conforms generally to an expected pattern orientation substantially perpendicular to the path. However, the process of stamping the characters on the plug, unless carefully monitored, does not always produce consistent results. Similarly, a character may vary in size and line width if the stamping die shows wear. Variations may also occur in the spacing of the characters. As will become apparent from the discussion below, the present invention is tolerant of such variations and can accommodate them while still providing reliable readout results.

As stated above, the relative rotary motion between the plug and the optical system results in bringing successive characters along the direction of the path, sometimes referred to herein as the "horizontal" direction, into view before array 40. Although all beams are schematically indicated as lines in FIG. 3, it will be appreciated that each beam has a "vertical" dimension, i.e. perpendicular to the path. Since the height of the characters is about $\frac{1}{8}''$, i.e. 125 mil, the vertical dimension of beam 46 must be at least the same. Optical arrangement 38 reduces this dimension to about 28 mil, which is the vertical dimension of beam 37. Thus, 14 photodiodes of the 64-diode array cover the height of the characters.

During the rotation of the optical system, the array may be viewed as receiving reflected light from a progressively advancing area, specifically from successive columns of the pattern-carrying plug surface. Each column has a width which is equal to the width of a diode after allowing for changes due to optical transformations and it may be viewed as being divided up into area elements. Thus, the light received by an individual diode having a 2 mil height, is attributable to a corresponding area element of the aforesaid column. Since 14 diodes cover the vertical dimension of a character, 14 area elements, each having a height of 9 mil, minimally make up a column. However, the actual vertical dimension of the column on the pattern-bearing suface extends beyond the nominal $\frac{1}{8}''$ height of the characters to allow for character misalignment and the like.

Figure 4:
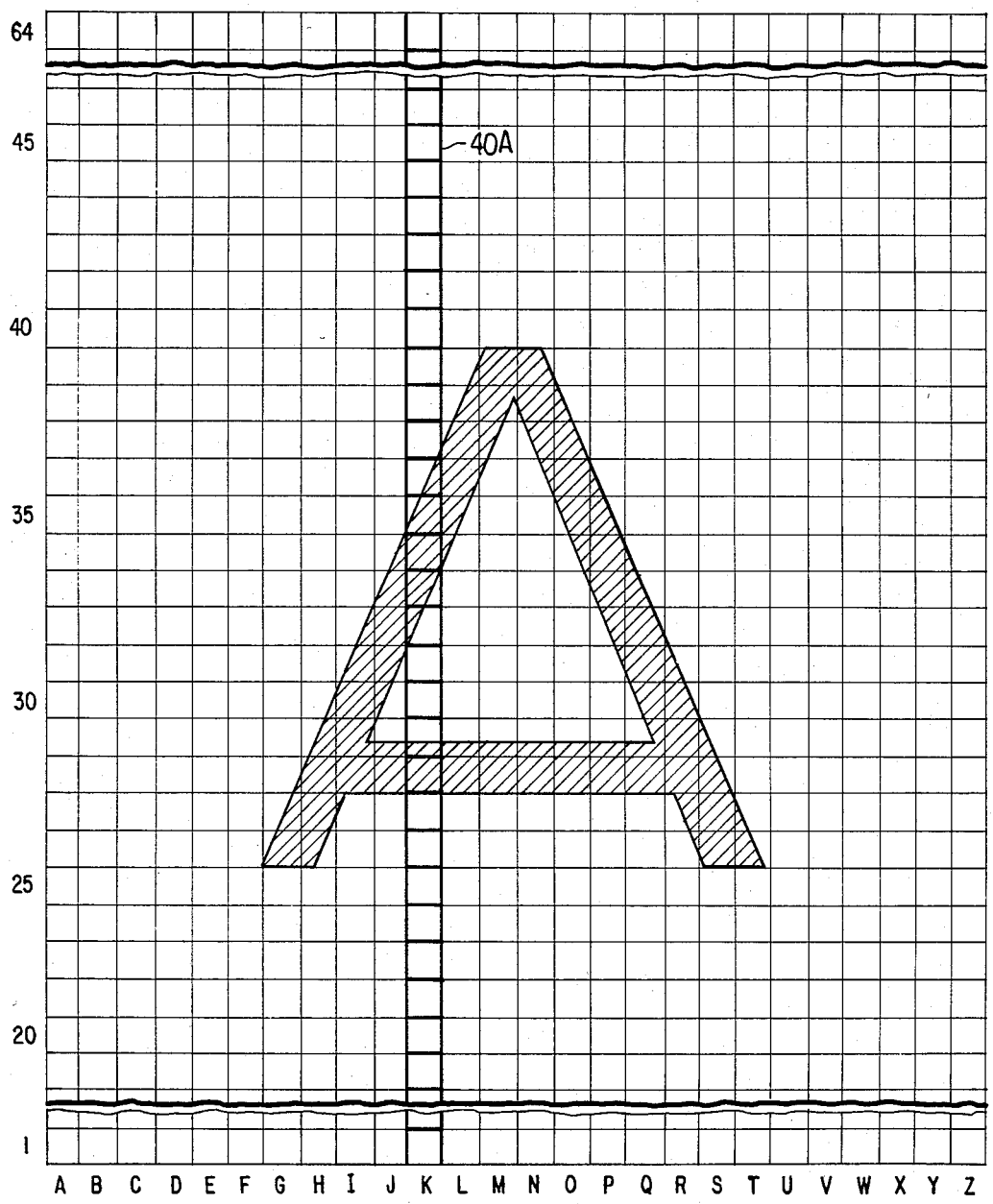
FIG. 4 illustrates an imaginary grid matrix on which a pattern is mapped.

FIG. 4 illustrates an imaginary grid matrix in which each matrix element corresponds to one of the aforesaid area elements of successive columns of the pattern-carrying surface. Although shown as being only 26 elements wide, the full dimension of the matrix in the horizontal direction encompasses the entire character string. The vertical dimension of the matrix is shown as being 64 elements high, corresponding to the number of diodes in array 40. Column 40A represents a single column of illuminated, discrete area elements of the cylindrical surface of plug collar 14, whose reflected light is at that moment being sensed by linear diode array 40.

As shown in FIG. 4, column 40A intersects the character "A", which is assumed to be the character in the 7-character string on the plug which is currently being read. The light reflected by elements 28, 29 and 32-36 of column 40A is diminished by the presence of a line of the character. Hence, the output signals of the corresponding light sensitive diodes will be proportionally reduced in amplitude.

As successive columns of discrete element areas are viewed by the diode array during the above-discussed relative motion, the diode output signals will vary in dependence on whether or not a line is present in the corresponding area element of the column being read. Through a process discussed below, these signals are transformed into status indications for each element, i.e. line-present or line-absent signals stored at appropriate addresses of a memory. These stored status indications are adapted to map the character on the grid matrix. Thus, after the optical system has rotated through 420°, the maps of the complete succession of characters stamped on collar 14 of the plug are defined on the imaginary grid matrix. In practice, the aforesaid status indications for each element are only stored as signals at appropriate addresses in memory and are not actually mapped on a grid matrix, although such could readily be done if it were desired to reproduce the character that is read out. In the embodiment of the invention under consideration, all manipulations are carried out in the signal domain.

As discussed in connection with FIG. 3, array 40 provides 64 output signals. These 64 output signals are periodically sampled at intervals of 8 msec. This sampling rate is high compared to the speed of the aforesaid relative motion, which is on the order of $\frac{1}{2}$ inch per second in the example under consideration. With the line width of the characters being on the order of 6 mil, a vertical character line may be sampled three times before it moves beyond the view of the array. In other words, the line width is viewed by the array for at least 24 msec. In order to reduce the amount of circuitry required, the 64 outputs of array 40 are electronically scanned in succession, rather than being sampled simultaneously. Thus, 64 output signals are serially provided on lead 41. In the example under consideration, the actual scanning requires approximately 1 msec, followed by a 7 msec interval before the next electronic scan takes place.

FIG. 5 illustrates the lamp control circuit which forms part of illumination subsystem 22. 110 volt AC is available at terminal board 50 which is preferably grounded to the chassis of the equipment. The AC voltage is applied to primary winding 52 of a stepdown transformer, whose output winding 54 is connected to two nodes of a full wave bridge rectifier 56. A DC voltage of approximately 7½ volt is provided between the remaining nodes of bridge 56 and is applied to the collector of a series-pass regulating transistor 58. The transistor base is coupled to an input terminal 60 by way of a resistor 64 to receive a lamp control signal. A further input terminal 62 is grounded. The emitter of transistor 58 is diode-coupled back to the base, as well as being connected to one terminal of lamp 32. The remaining lamp terminal is connected to bridge 56.

In operation, the voltage applied across the lamp is clamped to the control voltage applied through resistor 64. The resistance provided by transistor 58 changes to provide the current demanded by the lamp for that particular control voltage. Thus, the amplitude of the control voltage determines the intensity of lamp illumination. The manner in which the control voltage amplitude is controlled is explained below in connection with the operation of the overall system.

FIG. 5B illustrates the lamp control signal circuit which generates the control voltage that is applied to the circuit of FIG. 5A. A pair of latches 51 and 53 are connected to receive data by way of data bus lines DBØ-DB7, under the control of a strobe signal STBE. The latches are coupled to a D/A converter 55 which provides a single analog signal at its output, for application to an amplifier 57. In a preferred embodiment of the invention, the amplifier operates as a current-to-voltage converter by virtue of a resistor-capacitor feed back path 61. The lamp control signal is resistor-coupled to output 59, whence it is applied to terminal 60 of the lamp control circuit shown in FIG. 5A.

Figure 6A:
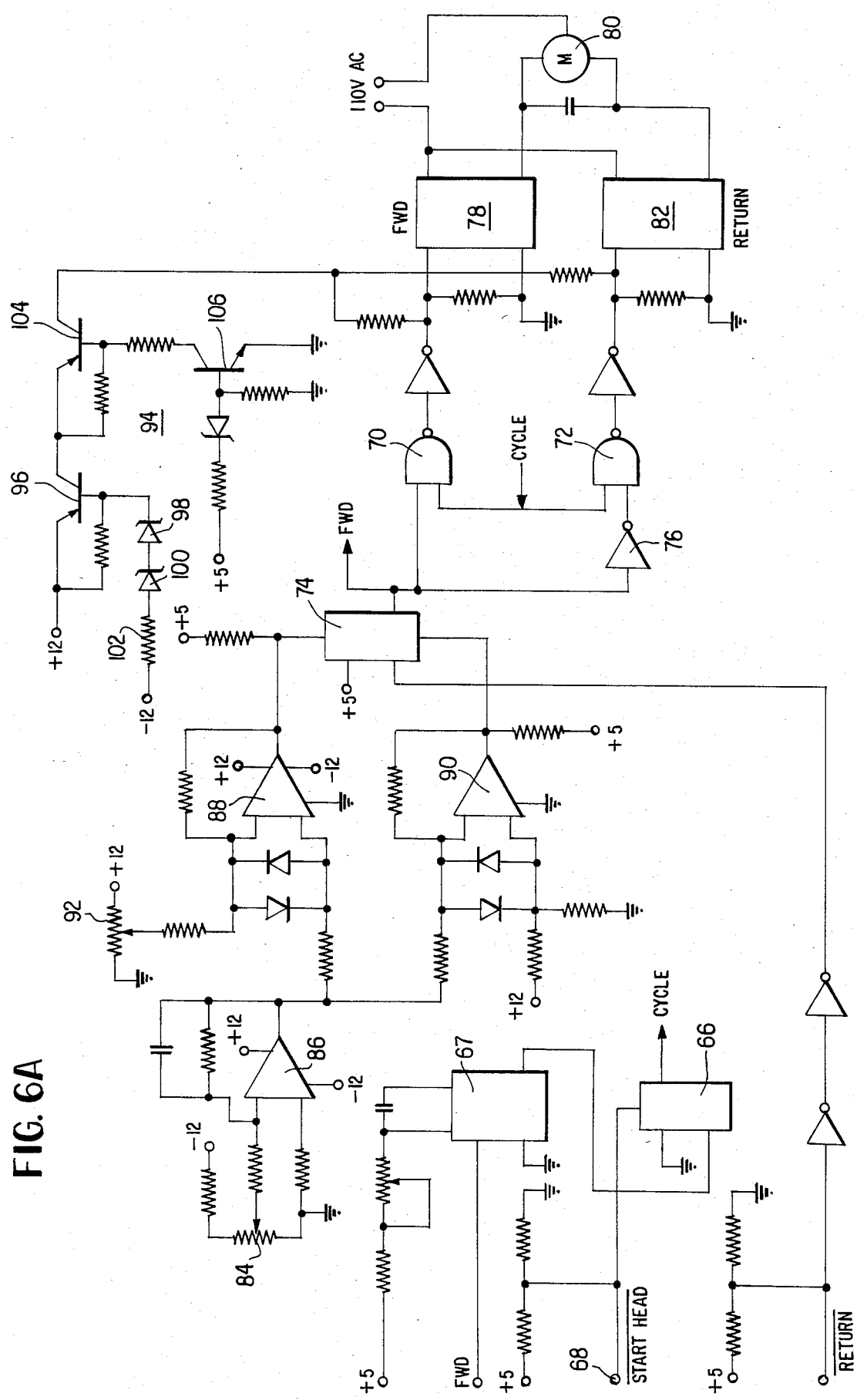
FIG. 6A illustrates a control circuit for the reader head motor.

FIGS. 6A and 6B illustrate the reader head circuitry. In FIG. 6A a $\overline{\text{STARTEAD}}/$ signal is applied to a terminal 68 and is coupled to flip-flop 66. The applied signal causes the flip-flop to switch and to assert a CYCLE signal at its output. The flip-flop is switched back to its initial state by a one shot oscillator 67, which responds to the application of a signal FWD. The CYCLE signal is applied to a pair of NAND gates 70 and 72, which conditions the latter for receipt of a direction signal provided by a flip-flop 74. As shown in FIG. 6A, the output of flip-flop 74 is coupled directly to one input of gate 70 and it is representative of forward signal FWD, which ultimately controls the rotation of reader head motor 80. Further, the signal FWD is applied to gate 72 through an inverter 76, to provide motor rotation in the opposite direction.

The output of gate 70 is inverted and coupled to a solid state relay 78 which controls the application of a 110 V AC line voltage to motor 80. The latter is adapted to rotate the optical system in a forward direction with respect to the stationary end plug, as discussed in connection with FIG. 3. Similarly, the output of gate 72 is coupled by way of an inverter to a solid state relay 82, which likewise switches the 110 volt line voltage to the motor, but is adapted to reverse its polarity so as to cause the motor to rotate in the opposite direction.

Motor 80 also controls the position of the tap on a potentiometer 84, which receives −12 V DC and which varies the input signal applied to an operational amplifier 86. The output of the latter amplifier is coupled to one input of each of a pair of comparators 88 and 90. A second input of comparator 88 is coupled to the tap of a trim potentiometer 92 which receives +12 V DC and which sets a predetermined threshold voltage for comparator 88. A second input of comparator 90 is likewise connected to receive a threshold voltage from a +12 V DC source. When the threshold set for either comparator 88 or 90 is exceeded, flip-flop 74 is switched and applies a signal to gate 70. The output signal from gate 70 ultimately enables solid state relay 78 and causes the motor to rotate in the forward direction. The return rotation of the motor is initiated when flip-flop 74 is switched by a $\overline{\text{RETURN}}$ signal which is received as shown in the drawing, or by the output of comparator 88 if the CYCLE signal is active.

A motor protection circuit 94 is provided to protect motor 80 from simultaneously receiving forward and return signals in the event of a loss of either the +12 volt DC signal or the −12 volt DC signal from the power supply. As shown in the drawing, the +12 volt DC signal is applied to the emitter of a transistor 96 whose base is connected through a pair of Zener diodes 98 and 100 and through a resistor 102 to the −12 volt DC source. Further, the base of transistor 96 is resistively coupled to its emitter. The collector of transistor 96 is connected to the emitter of a transistor 104 whose base is likewise coupled to its own emitter. The latter base is also coupled to the collector of a transistor 106 whose emitter is grounded and whose base is Zener-coupled to receive a +5 volt DC signal. The emitter of transistor 104 is coupled to one input of each of solid state relays 78 and 82 to apply a bias voltage to each.

With reference now to FIG. 6B, the incoming signals designated on the left-hand side of this drawing, are control signals for diode array 40, which is shown elsewhere in the Figure. The outgoing signals are the CYCLE and FWD signals which are generated elsewhere. As previously explained, the 64 photodiodes which constitute linear array 40, are successively scanned in the example under consideration, rather than being simultaneously sampled. The scanning is timed by clock pulses received from a transistor 119 whose base is connected to receive $\overline{\text{RCLOCK}}$ pulses. Thus, array 40 has only a single output 108 which is shown connected to an FET 110 and which provides buffering between array 40 and a video amplifier 112.

The input pair of amplifier 112 is connected between FET 110 and ground. The output of amplifier 112 is coupled to one input of a video amplifier 116 by way of a switch 114 and a capacitor 120. Switch 114 is controlled by a SAMP signal, which is derived from the RSAMPLE signal received in the left hand portion of the drawing. In order to reduce array-originated noise, the SAMP signal is applied only while the array output signal is valid. Thus, amplifier 116 is able to receive an input signal only during that interval and hence noise transmitted to the amplifier is cut down.

A capacitor 122 is connected between the output of switch 114 and ground. A further switch 118 is connected between the aforesaid input of video amplifier 116 and ground and is responsive to a signal REST. When the latter signal closes switch 118, the accumulated charge on capacitor 122 is dumped and the circuit is in effect reset. The output of amplifier 116 then provides a video signal whose amplitude is representative of the intensity of light reflected from an area element of the pattern carrying surface of plug 10 which corresponds to the scanned diode.

FIG. 6C illustrates the generation of the $\overline{\text{STARTEAD}}/$ signal and the $\overline{\text{RETURN}}$ signal for use in controlling the reader head motor. A strobe signal STB1 is applied to an inverter 111 whose output is coupled to a further inverter 113. The $\overline{\text{STARTEAD}}$/ signal is provided at the output of inverter 113 and is effective to start the rotation of the reader head motor in a particular direction, e.g. clockwise. A strobe signal STB2 is applied to an inverter 115, which is further coupled to an inverter 117. The $\overline{\text{RETURN}}$ signal derived at the output of inverter 117 causes the reader head motor to rotate in the opposite direction.

As explained above, each video signal derived at the output of video amplifier 116 in FIG. 6B, is proportional to the intensity of light reflected by a single area element of the character-carrying plug surface. The purpose of video processing is to determine what kind of status indication is to be stored for each grid element of the grid matrix in order to map the character that is being read out. Specifically, it must be determined whether or not a line-present (dark) indication is to be stored or line-absent (light) indication for each element. For example, the elements defined by coordinates K-28 and K-34 in FIG. 4 are both stored in the RAM as line-present indications. On the other hand, such elements as K-24 and K-38 are both stored as line-absent indications.

In order to determine the status of each element, an edge enhancement technique is used, whereby a predetermined configuration of neighboring elements is examined. As shown in FIG. 7B, the configuration is selected such that the element under test is at the center of it. The configuration of neighboring elements need not be a circle. The neighboring elements may be arranged in various ways, provided only that the test elements are located at the center, i.e. that the neighboring elements are symmetrically disposed relative thereto.

It should be noted that the actual plug area scanned by a single diode during one scan is on the order of $2 \times 2$ mil. Thus, each matrix element represents a $2 \times 2$ mil area. The actual line width of the characters is on the order of 6 mil however, or wider. Since the radius of the configuration shown in FIG. 7B is 3 elements wide, it will capture smears, blobs and other marks that go beyond the actual line of the character being read.

As previously explained, the amplitude of each diode output signal is proportional to the intensity of the light reflected by the area element of the character-carrying surface currently being read. In accordance with the present invention, in the video processor shown in FIG. 7A the intensity level of each of these signals is stored as an 8-bit digital word, such that each word is representative of 1 of 256 possible light intensity levels. The intensity levels stored for all elements of the aforesaid configuration are averaged, excluding however the amplitude of the test element. The average light intensity level so obtained is then compared with the stored intensity level of the test element to determine the status of the test element. The actual determination is performed by converting the aforesaid average intensity level, as well as the intensity level of the test element, to analog signals and comparing their relative amplitudes. This approach reduces the complexity of the circuitry used.

Returning now to FIG. 7A, the incoming video signal is applied to an A/D converter 130 which provides an 8 bit code at its output. Thus, 256 different 8 bit words, each representative of a separate light intensity level, may be distinguished. The output of converter 130 is coupled to a circular RAM 132. The RAM output is coupled to one input of an adder 134, as well as to a D/A converter 138. The adder output is applied to a summing register 136 whose output, in turn, is coupled to a second input of adder 134, as well as to a further D/A converter 140. Units 132, 134 and 136 are all connected to be controlled by a programmable control circuit 142.

The output of D/A converter 140 is coupled to a pair of potentiometers 142 and 144 which are tapped by one input of each of a pair of comparators 146 and 148 respectively. A second input of each of the latter amplifiers is connected to D/A converter 138. Comparator 146 has its output connected to a shift register 150 which, in turn, is connected to a memory buffer 154. Similarly, comparator 148 is connected to a shift register 152 whose output is coupled to a memory buffer 156. Shift registers 150 and 152 are both controlled from programmable control circuit 142. The outputs of memory buffers 154 and 156 are coupled to microprocessor 19 through an appropriate computer interface.

As previously noted, following the A/D conversion of the video signal, processing is carried out on the incoming data after the latter has been digitized. Subsequently, the signals are converted to analog form and compared against predetermined thresholds set by potentiometers 142 and 144. The outputs of comparators 146 and 148 then provide a pair of digital signals, which are ultimately stored in memory as status indication for the area element in question.

Figure 7A:
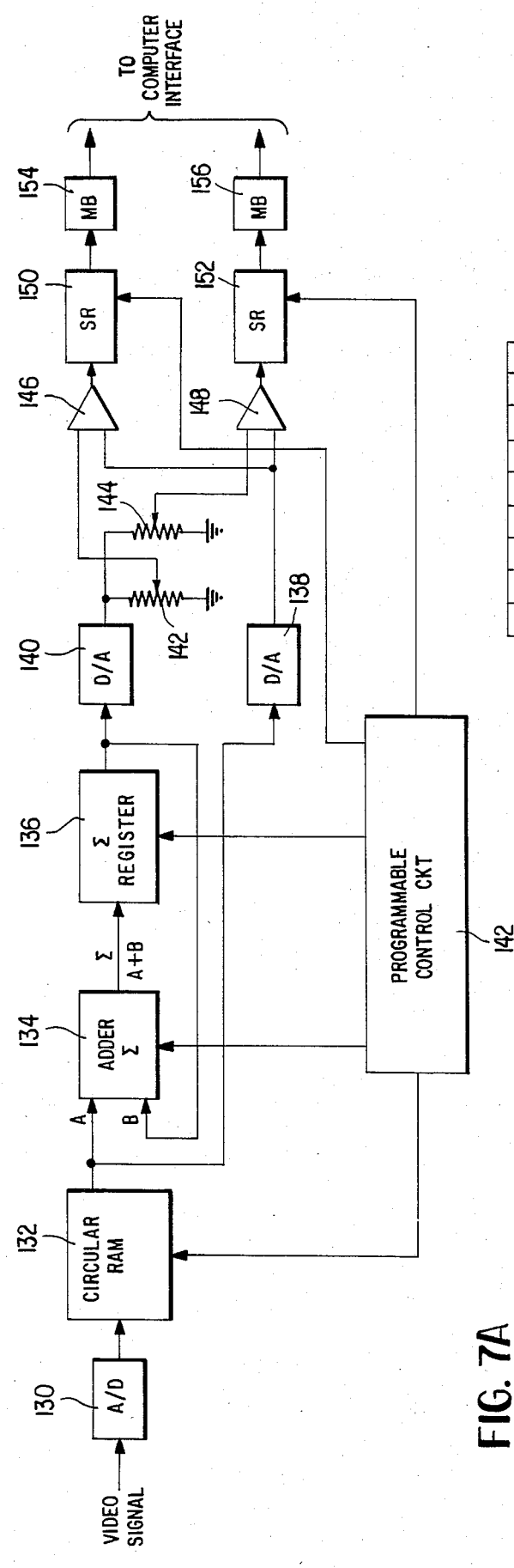
FIG. 7A is a block diagram of a video processor in accordance with the present invention.
Figure 7B:
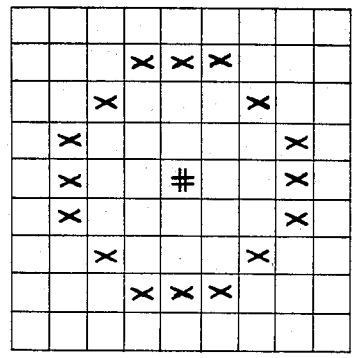
FIG. 7B illustrates a test configuration of elements on a portion of the grid matrix for determining the status of a centrally located test element.

The video processor illustrated in block diagram form in FIG. 7A is shown in greater detail in FIGS. 8–13. FIG. 8 shows an operational amplifier 160 which receives the video signal provided at the output of amplifier 116 in FIG. 6B. The output of amplifier 160 is coupled to an A/D converter circuit comprising a comparator 162, a successive approximation register 164, a D/A converter 166 and a flip-flip 168. Comparator 162 compares the output signal of amplifier 160 to the output of converter 166 so as to control successive approximation register 164 which is coupled to the output of the comparator. Outputs B0–B7 are adapted to load the contents of register 164 in parallel into RAM, as well as into D/A converter 166. Flip-flop 168 is clocked by signal $\overline{X0}$ to gate signal CC. The latter is a conversion complete signal which is derived from an inverter 170 whose input is connected to register 164. The application of the CC signal to flip-flop 168 produces a signal SC, representative of start scan, which is used as a gating signal to control memory addressing.

With reference now to FIGS. 9, FIGS. 9, 9A shows a NAND gate 172 which receives input signals SC and $\overline{\text{EOS}}$, representative of start scan and end of scan respectively. The output of gate 172 is applied to one input of a further NAND gate 174, which receives an additional input signal $\overline{\text{R1}}$ that constitutes a control signal derived from a ROM. The output of gate 174 is coupled to an up-down counter 178 by way of an inverter 176. A further ROM-derived signal $\overline{\text{R2}}$ is applied to a second input of the counter. Counter 178 is incremented whenever an SC pulse is applied to gate 172 upon completion of an A/D conversion. This action causes the digitized video data to be stored at appropriate addresses of the RAMs shown in FIGS. 9F and 9G. An up-down counter 180 is connected to counter 178 to receive the overflow therefrom. The output of counter 178 is constituted by outputs A0–A3, while counter 180 has outputs A4, A5 and AX.

The manipulation of the address represented by signals A6–A9 permits the examination of the data stored at various addresses. As will now become clear with reference to FIG. 7B, the aforesaid address manipulation permits the examination of data taken at the various points of the predetermined configuration of elements, which has the element under test at its center.

FIG. 9B shows an up-down counter 182 which receives signals $\overline{R3}$ and $\overline{R4}$. These control signals are derived from the aforesaid read only memory. Counter 182 provides output signals A6-A9. The address represented by the latter signals is incremented or decremented by signals $\overline{R3}$ or $\overline{R4}$ respectively.

The outputs of counters 178, 180 and 182 provide 64 addresses for a pair of RAM's 193 and 195, which are illustrated in FIGS. 9F and 9G respectively. The RAM chips may be of the type which are commercially available from Intel Corp. under the designation 2114. At each address of RAMs 193 and 195, a number is stored which corresponds to the light intensity reflected from the corresponding area element of the plug surface. RAM 193 is coupled to a bus driver 194 whose terminals B∅-B3 and F∅-F3 are bidirectional. Similarly, RAM 195 is coupled to a bus driver 196 which has bidirectional terminals B4-B7 and F4-F7. Each of RAMs 193 and 195, as well as buffers 194 and 196, further receive $\overline{W}$ signals, which enable the RAMs for writing in data. The applied address signals A∅-A9 are active to address the proper storage location of these memories, whether data is read into or out from the RAMs. In the example under consideration, each RAM chip is capable of storing 4K bits of data, actually 4069 bits of data. Thus, each RAM can store data from approximately ten scans of array 40.

Signal AX, which is derived at the output of counter 180, is applied to a flip-flop 184, which is shown in FIG. 9C. This flip-flop provides a pair of signals $\overline{EOS}$ and EOS at its outputs indicative of end of scan. Signal $\overline{EOS}$ is coupled to a flip-flop 186 which is illustrated in FIG. 9D and which provides signals $\overline{W}$ and W at its outputs, i.e. write and read signals respectively, as discussed above. Flip-flop 184 is further adapted to be reset by signal $\overline{RST}$, and flip-flop 186 is adapted to be reset by a timing signal $\overline{CP1}$.

FIG. 9E shows a counter 188 which receives an input from NAND gate 190 whose inputs, in turn, are signals B5, B6, B7 and W. Signal $\overline{EOS}$ is coupled to counter 188 and is adapted to load the count represented by the inputs of gate 190 into that counter.

Subsequently, whenever there is a pulse applied to the input of counter 188, the stored count is decremented by one. When the count reaches 0, an output signal is generated and is applied to a flip-flop 192. The switching action of the flip-flop provides a signal DIOR at its output. This signal serves as a flag to the microprocessor to indicate that one full scan of data, i.e. the data collected from 64 diodes, has been processed by determining the status indication for each scanned element. Signal $\overline{EOS}$ is adapted to reset flip-flop 192 and thus resets the DIOR flag.

Figure 10:
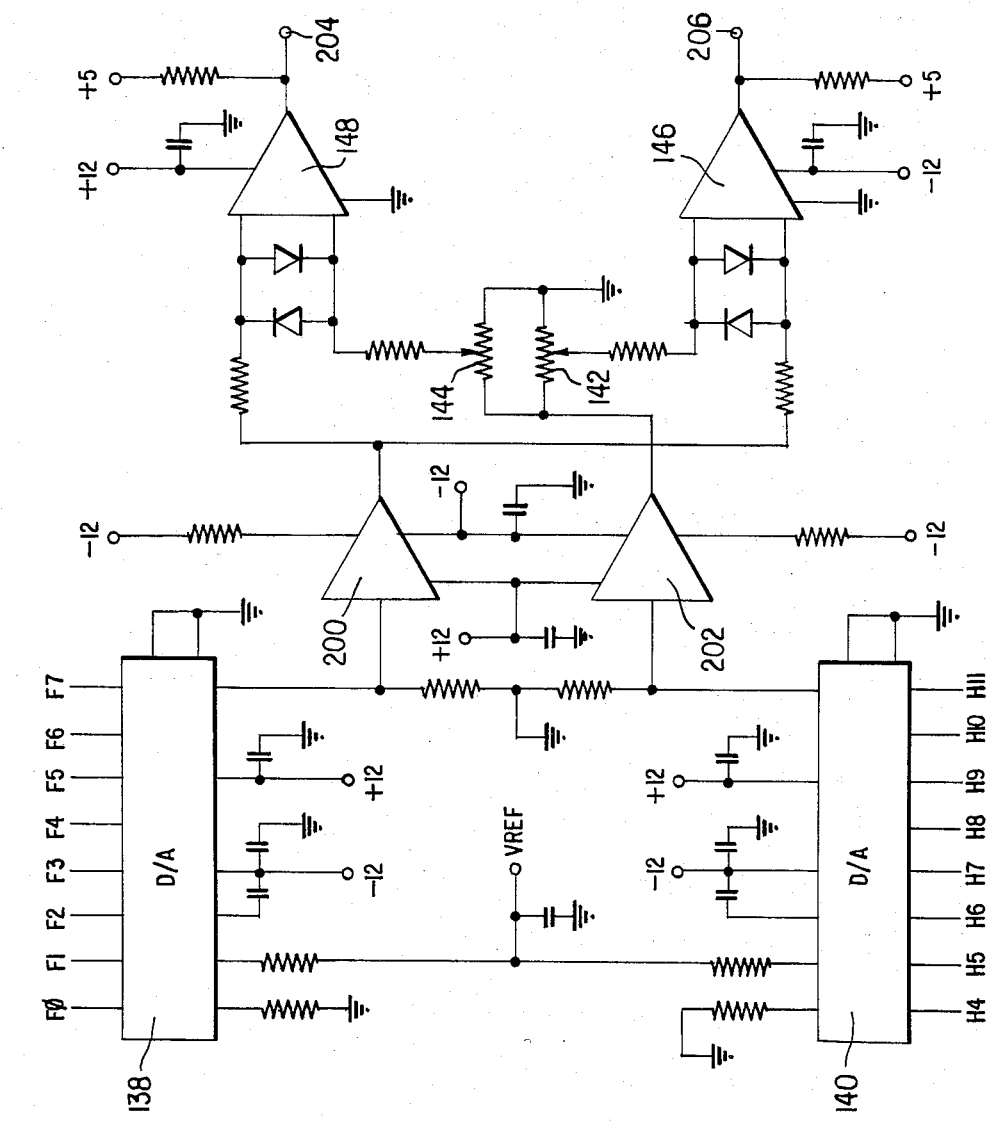
FIG. 10 illustrates the D/A converter in use in the video processor.

FIG. 10 illustrates in greater detail D/A converters 138 and 140, as well as comparators 148 and 146, all shown in block diagram form in FIG. 7A. Converter 138 is connected to receive inputs F∅-F7 in parallel and has its analog output coupled to comparator 148 by way of a buffer amplifier 200. A second input of comparator 148 is derived from potentiometer 144, which is likewise illustrated in connection with FIG. 7A. Converter 140 is connected to receive inputs H4-H11 in parallel and has its analog output coupled to potentiometer 142 by way of a buffer amplifier 202. The tap of the latter potentiometer is coupled to one input of comparator 146. The other input of unit 146 is coupled to the output of buffer amplifier 200. The function of the comparators is to threshold the incoming analog signals. Thus, only binarized data appears at the outputs of comparators 148 and 146 and is applied to a pair of terminals designated 204 and 206 respectively.

FIG. 11A illustrates shift registers 150 and 152 and their associated circuitry. As shown, shift register 152 is connected to terminal 204 which corresponds to the like-numbered terminal in FIG. 10. Similarly, the input of shift register 150 is derived from terminal 206, which corresponds to the terminal of the same number in FIG. 10.

Each of units 212, 214, 216 or 218 comprises a memory. In a preferred embodiment of the invention each of the latter units is a bubble memory. After eight bits are serially shifted into shift register 152, they are shifted out in parallel to bubble memories 212 and 214. This occurs upon receipt of a control signal from a NAND gate 215, which receives signals R7 and CP5 at its inputs. Similarly, following an eight bit serial input into shift register 150 and upon receipt of a control signal from gate 215, the contents of the latter shift register are shifted out in parallel to bubble memories 216 and 218.

Bubble memories 212 and 214 are connected in parallel to bus drivers 208 and 210 respectively, which interface with the above-mentioned 8-bit data bus. Units 208, 210, 212 and 214 in FIG. 11A thus jointly form memory buffer 156 of FIG. 7A. Likewise, units 220 and 222 constitute bus drivers which interface bubble memories 216 and 218 to the data bus. Units 220, 222, 216 and 218 in FIG. 11A jointly form memory buffer 154 of FIG. 7A. The data so applied to the data bus constitutes binarized data signals representative of line-present or line-absent indications.

FIG. 11B shows a flip-flop 224 which is responsive to the signal AX to develop output signal $\overline{BMMR}$. As shown in FIG. 11A, the latter signal is used to control the bubble memory.

FIG. 11C illustrates a counter 226 which is responsive to input signals R7 and $\overline{CP5}$ to advance the count. When the count of 8 is reached, an output signal is generated which switches a flip-flop 228 so as to provide output signal SI which is used to control the bubble memories. Resetting of flip-flop 228 is accomplished by timing signals $\overline{CP6}$ or $\overline{CP3}$.

Figure 12:
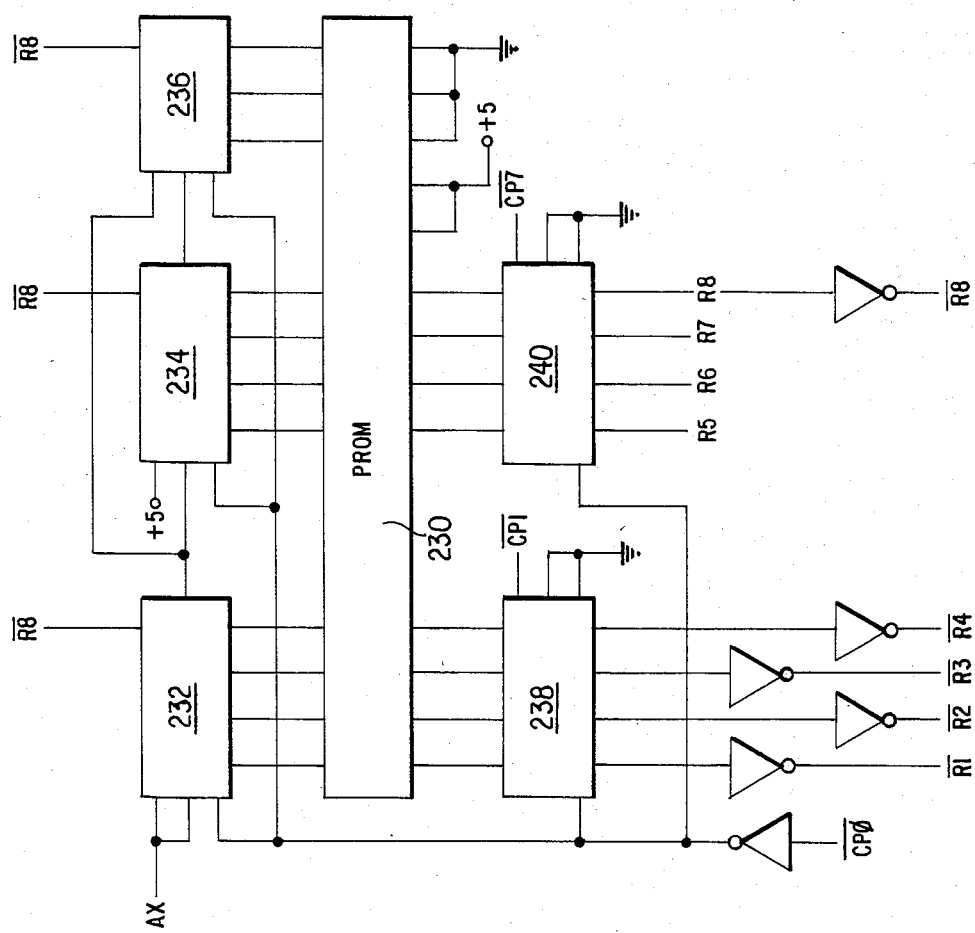
FIG. 12 illustrates a PROM and its associated controls for use in the video processor.

FIG. 12 illustrates a PROM 230 which forms part of programmable control circuit 142 in FIG. 7A. This PROM is adapted to store a program for testing a particular test element, as is described in greater detail below. Units 232, 234 and 236 are counters capable of addressing this PROM in response to control signals AX and $\overline{R8}$. Signal $\overline{R8}$ provides a jump back to start whenever it comes up. In a preferred embodiment of the invention, PROM 230 may be a unit of the type which is commercially available from Intel Corp. under the designation 2716.

A pair of latches 238 and 240 is used to latch the data residing in PROM 230 whenever the PROM is incremented. During that interval, the output of the PROM is undefined and hence the latching operation prevents erroneous signals from being generated. The PROM may be incremented at any time when it is addressed by one of counters 232, 234 and 236. After it is so addressed some settling time is required. The latching operation, which is controlled by timing signals CP∅, CP1 and CP7, is provided to prevent false signals from being generated.

The outputs of latch 238 are applied to four separate inverters. At the outputs of the latter the signals $\overline{R1}$, $\overline{R2}$, $\overline{R3}$ and $\overline{R4}$ are obtained. Signal $\overline{R8}$ is derived at the output of an inverter which itself is connected to the output of latch 40.

Figure 13:
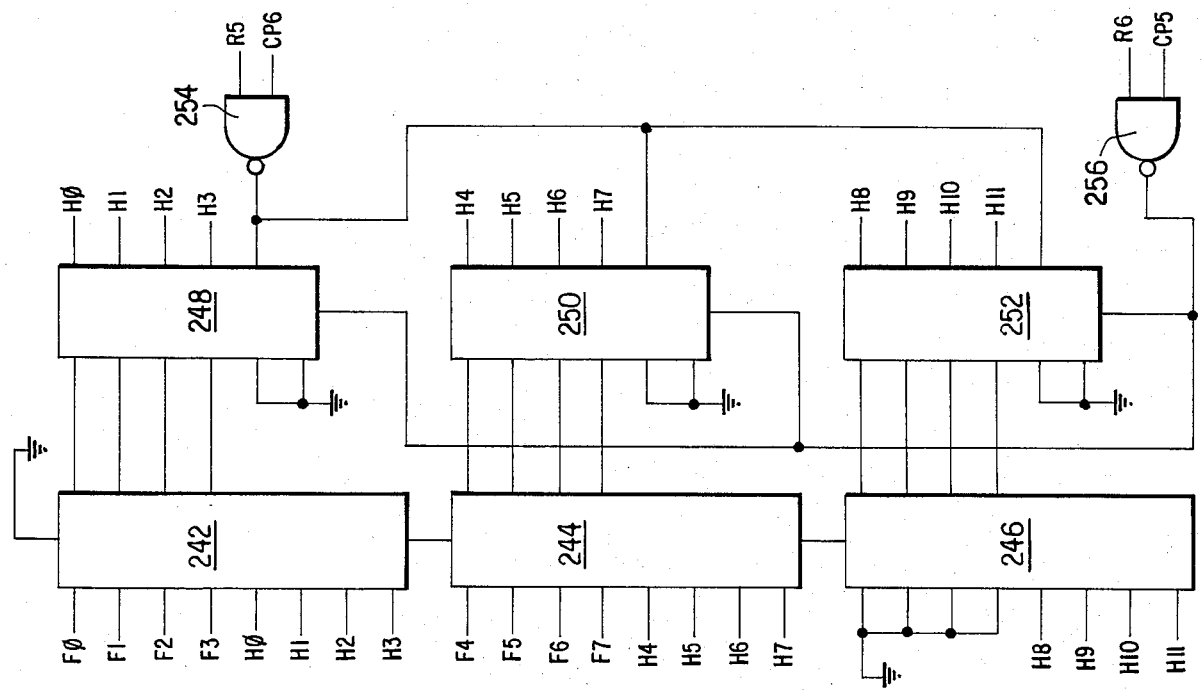
FIG. 13 shows the adder used in the video processor for computing a running sum.

FIG. 13 illustrates adder 134 in greater detail, which is shown in block diagram form in FIG. 7A. Binary adder chips 242, 244 and 246 receive input signals from RAM's 193 and 195 in FIGS. 9F and 9G. The output signals from adder chips 242, 244 and 246 are applied to a set of latches 248, 250 and 252 respectively. A NAND gate 254 is connected to apply a signal to these latches in response to the application of a pair of signals R5 and CP6. Likewise, a NAND gate 256 is responsive to signals R6 and CP5 to apply a signal to the latches. The output signal from gate 254 causes the sum of the previous signals H∅...H11 plus the new signals F∅...F7 to be latched in. The output signal of gate 256 transfers the contents of latches 248, 250, 252 to adder chips 242, 244 and 246 respectively. The result is to compute an average of the signals applied to the adder chips and thus average the intensity levels stored in signal form in the RAM's.

Figures 14A, 14B:
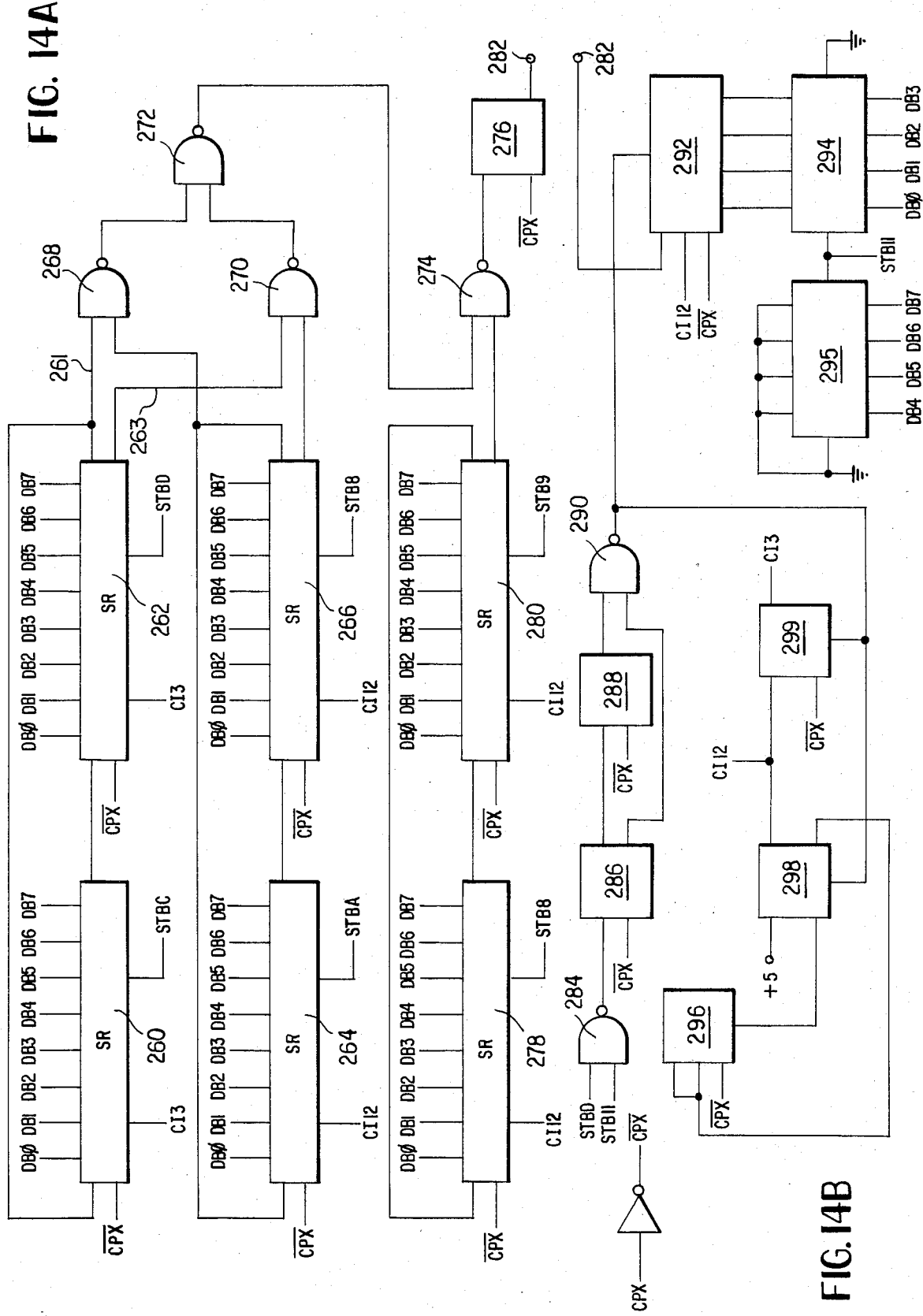
FIG. 14A illustrates a portion of the correlation circuitry.
FIG. 14B illustrates another portion of the correlation circuitry.

FIGS. 14A and 14B illustrate the correlation circuit which is used in a dual capacity, as will become clear from the discussion of the operation below. With reference now to FIG. 14A, a shift register 260 receives clock pulse $\overline{CPX}$ at one input thereof and has its output connected to a second shift register 262. The latter receives clock pulse $\overline{CPX}$ at a second input thereof and provides a first output 261 which is fed back to a second input of shift register 260. It is also applied to one input of a NAND gate 268. A second output 263 of shift register 262 is connected to a first input of a NAND gate 270. Both shift registers further receive a control signal CI3 which is generated in a separate part of the circuit, as will be explained in connection with FIG. 14B. Further, shift register 260 has the signal STBC applied thereto and shift register 262 receives a signal STBD. The inputs of both shift registers are coupled to receive parallel signals DB∅-DB7, which are provided by the data bus.

A further pair of shift registers 264 and 266 is connected in substantially identical manner as shift registers 260 and 262. Both registers 264 and 266 receive a control signal CI12. Shift register 264 receives a strobe signal STBA, while register 266 has a signal STBB applied thereto. One output of shift register 266 is fed back to one input of register 264, as well as being applied to a further input of the aforesaid NAND gate 268. The other output of register 266 is applied to a second input of NAND gate 270. The outputs of both NAND gates 268 and 270 are applied to a pair of inputs of a third NAND gate 272. Thus, an EXCLUSIVE OR operation is performed with respect to the 16 bits of data which reside in each pair of shift registers 260, 262 and 264, 266.

A further pair of shift registers 278 and 280 is connected substantially like shift registers 264, 266, both registers receiving control signal CI12. Further, shift register 278 receives strobe signal STB8, while shift register 280 receives strobe signal STB9. One output of register 280 is fed back to one input of register 278. A second output of register 280 is coupled to a NAND gate 274, whose other input is connected to the output of gate 272.

It will be clear from the connection just described, that the data applied to shift registers 278 and 280 is AND-ed together with the EXCLUSIVELY OR-ed data provided at the output of gate 272. The output of gate 274 is coupled to a flip-flop 276, which is adapted to be reset by clock signal $\overline{CPX}$. The output of flip-flop 276 is coupled to a terminal 282, which is connected to an identically designated terminal in FIG. 14B.

With reference now to FIG. 14B, a NAND gate 284 receives strobe signals STBD and STB11 on its inputs. The output of gate 284 is coupled to a timing and synchronizing circuit which includes a first flip-flop 286 and a second flip-flop 288. Both of the latter flip-flops receive clock signal $\overline{CPX}$ at their reset inputs. The output of flip-flop 288 is coupled to one input of a NAND gate 290, whose second input is coupled to a second output of flip-flop 286. The output of gate 290 is coupled to the reset input of a counter 292 which has one input coupled to the aforesaid terminal 282. As shown, counter 292 further receives control signal CI12, as well as clock signal $\overline{CPX}$. The output of counter 292 is applied to a bus driver circuit 294, which is used as an interface between counter 292 and data bus lines DB∅-DB3. A strobe signal STB11 is applied to driver 294 so that the correlation index will be strobed onto the data bus at the proper time. A second driver unit 295 acts as a dummy unit and is used merely to fill out the remaining eight bits on the data bus.

A counter 296 is incremented by clock pulse $\overline{CPX}$ and is connected as a divider circuit comprising a pair of flip-flops 298 and 299. Upon the occurrence of a predetermined number of counter incrementations, a counter output pulse is generated which resets flip-flop 298 and which generates the aforementioned control signal CI12 at one output thereof. A second output of flip-flop 298 is connected back to counter 296 and disables CI12 and CI3 after eight $\overline{CPX}$ pulses occur. Flip-flop 299 is set by the resetting action of flip-flop 298 which generates signal CI12. Thus, a signal CI3 is generated whenever flip-flop 298 is reset. Flip-flops 298 and 299 both have one input connected to the output of the aforesaid gate 290.

As previously explained, the correlation circuit has a dual use in the present invention. In one application, where it is used for character recognition, data representative of pre-learned care maps is applied to shift registers 278 and 280. Data representative of pre-learned character or pattern maps is applied to shift registers 264 and 266. Data representative of the unknown characters or patterns is applied to shift registers 260 and 262. A correlation index is determined from the EXCLUSIVE OR operation applied to this data and from the subsequent AND operation and is provided at the output of counter 292. The correlation circuit also serves to determine the location of the unknown character in the matrix. In the latter case, the running sum of line-present signals is computed. Here the correlation circuit must be adapted to the particular situation. Specifically, dummy data is placed into shift registers 264, 266, 278 and 280 and scan data is placed into registers 260 and 262. Thus, the data applied to counter 292 will represent only data derived from that particular scan, specifically from the central portion of the scan in the present example. The function of the counter in this instance is simply to count the number of 1's which are representative of line-present indications.

Figure 15:
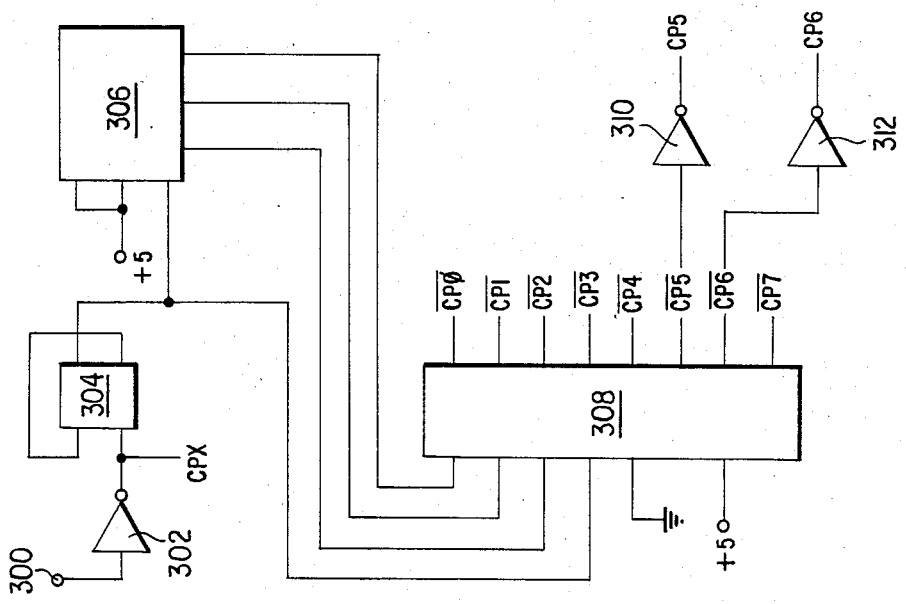
FIG. 15 illustrates a clock generator.

FIG. 15 illustrates the clock generator used in the present system. An input terminal 300, which is connected to the multibus, provides a pulse train of 9.216 uHz in a preferred embodiment of the invention. The pulse train is inverted by an inverter 302 and at the output of the latter clock signal CPX is derived. The output of inverter 302 is coupled to a flip-flop 304, which is connected to provide a divide-by-2 output. The latter output is applied to a counter 306, as well as to a 1-of-8 decoder 308. The 3-bit counter output is likewise coupled to decoder 308 which, in turn, provides signals $\overline{CP0}$-$\overline{CP7}$ in sequence at its own outputs. These signals are subsequently used to successively scan the diode output signals.

FIG. 15 further shows a pair of inverters 310 and 312 which are connected to the appropriate outputs of decoder 308 to provide signals CP5 and CP6 respectively, at their own outputs.

Figure 16:
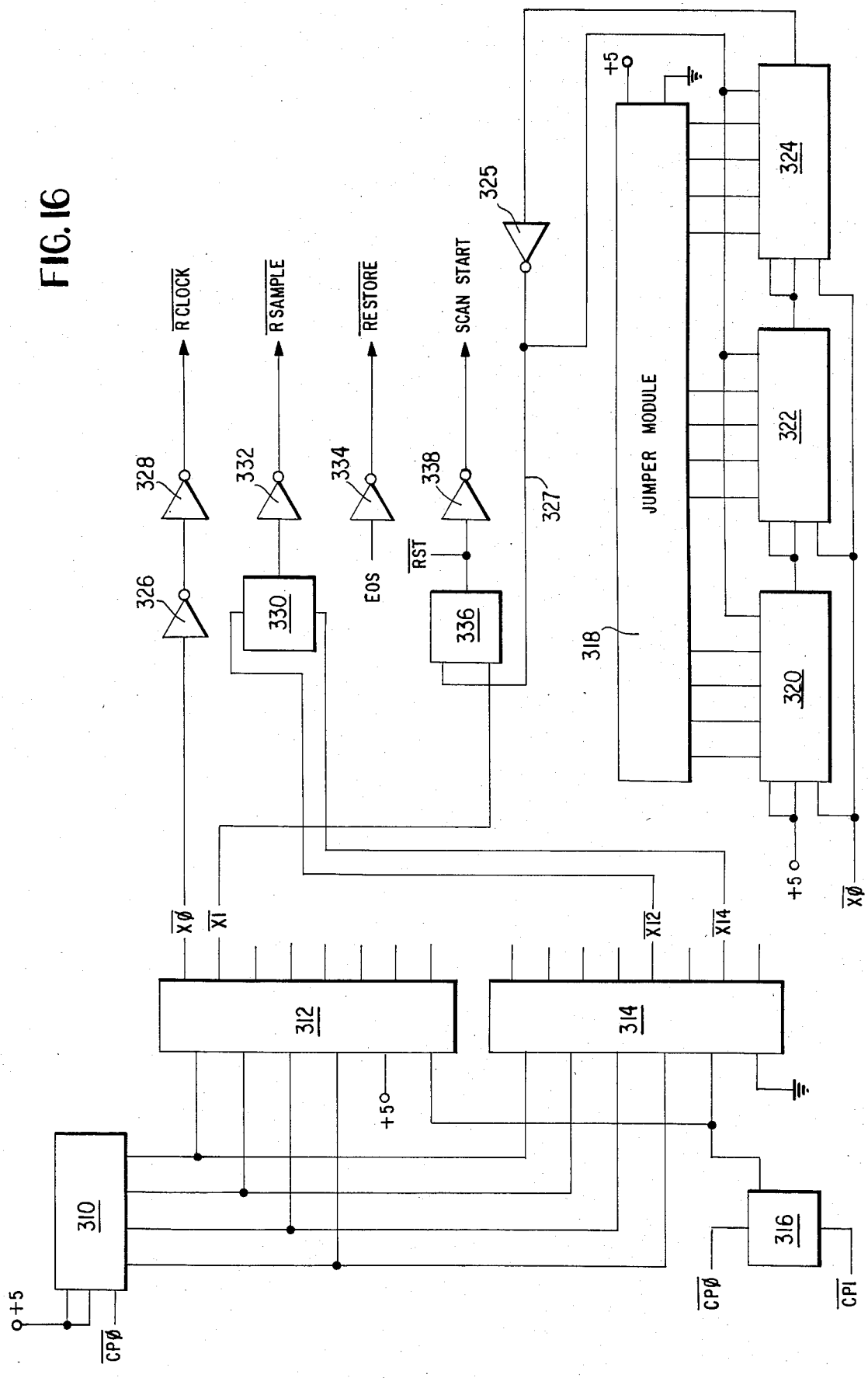
FIG. 16 illustrates a circuit for controlling the operation of the diode array.

FIG. 16 illustrates the control circuit for diode array 40. The diode array itself is shown in FIGS. 3 and 6B. A counter 310 is actuated by clock pulse $\overline{CP0}$ and provides a 4-bit output which is applied to a pair of 1-of-8 decoders 312 and 314. Of the 16 possible decoder output signals, (which are functionally clock pulses), only signals $\overline{X0}$, $\overline{X1}$, $\overline{X12}$ and $\overline{X14}$ are used. A flip-flop 316, which is controlled by signals CP0 and CP1, controls the operation of decoders 312 and 314 and hence it serves to gate signals $\overline{X0}$, $\overline{X1}$, $\overline{X12}$ and $\overline{X14}$.

A set of counters 320, 322 and 324 provides a count in response to signal $\overline{X0}$ is applied to each counter. The output of counter 320 is connected to unit 322, whose output is further connected to counter 324. Output signals from the latter are provided on line 327 by way of an inverter 325 and are also fed back to each counter. Upon overflow of the counters, i.e. when a predetermined count is reached, a pulse is applied to output line 327 and is subsequently coupled to the input of a flip-flop 336. The output of flip-flop 336 is inverted by inverter 338 to provide a SCAN START signal for application to the reader head.

A jumper module 318 is coupled to each of counters 320, 322 and 324 and comprises essentially a set of switches to provide either 0 voltage or +5 volt on each jumper module output. The jumper module permits the scan rate to be changed. This is accomplished by means of the aforesaid feedback of the output on output line 327 to each of counters 320, 322 and 324. This feedback signal effects the strobing of the data from the jumper module into the respective counters. The result is to preset each of counters 320, 322 and 324 such that overflow will occur in a predetermined number of $\overline{X0}$ pulses.

The signal EOS, which is derived elsewhere in these drawings, is applied to an inverter 334 to provide a $\overline{RESTORE}$ signal at the inverter output. This signal defines the period between scans, which is set at 7 ms in a preferred embodiment of the invention.

A flip-flop 330 is controlled by signals $\overline{X12}$ and $\overline{X14}$ and provides an output signal which is applied to an inverter 332. The signal derived at the output of the inverter is designated $\overline{RSAMPLE}$ and indicates that the diode output signals of the array are to be read.

Signal $\overline{X0}$ is applied to a pair of series-connected inverters 326 and 328 to provide the array clock signal at the output of the latter inverter. The latter signal is designated $\overline{RCLOCK}$ in the drawing. $\overline{RCLOCK}$, as well as the above discussed signals $\overline{RSAMPLE}$, $\overline{RESTORE}$ and SCAN START, are all used in the operation of the reader head, as will be evident from a consideration of the reader head circuits shown in FIGS. 6A, 6B and 6C.

Figure 17A:
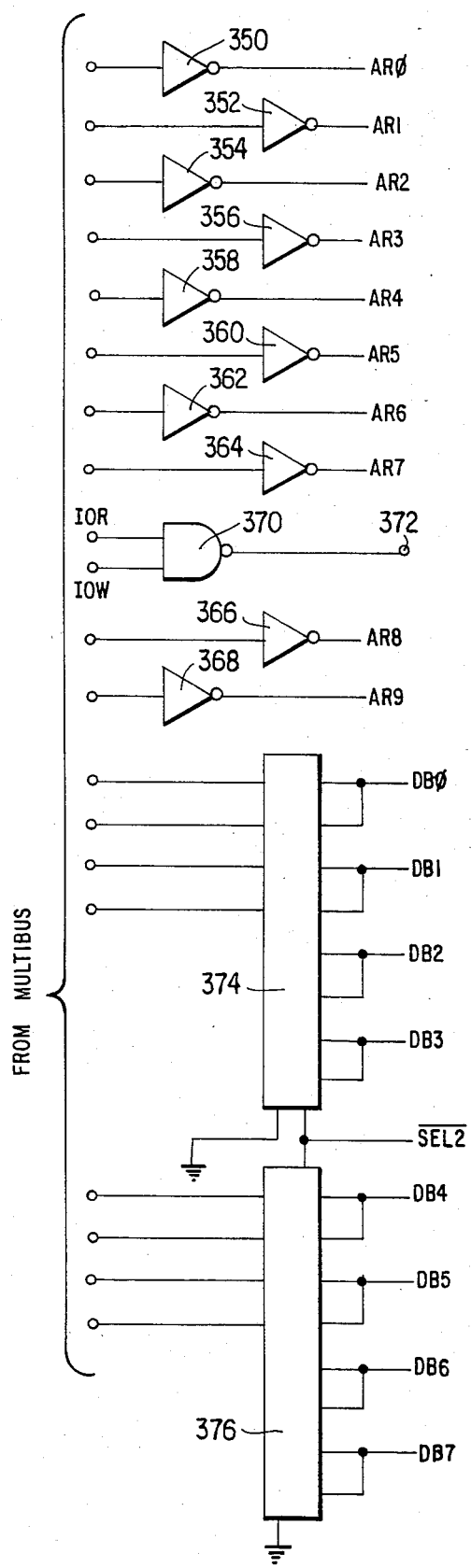
FIG. 17A illustrates an interface between the multibus and the data bus.

FIG. 17A illustrates the interface between multibus 17 and various circuits which are located on rack 15 as explained in connection with FIG. 2A. Each of a plurality of inverters 350, 352, 354 ... 368 receives a signal on a multibus line and provides a corresponding address signal on its output. Address signals AR0, AR1 ... AR9 are provided at the outputs of these inverters. A pair of multibus-derived control signals IOR and IOW, representative of input/output read and input/output write respectively, is applied to a NAND gate 370 which couples a signal to a terminal 372.

FIG. 17A further includes a pair of bidirectional bus drivers 374 and 376, each of which has four terminals on one side thereof connected to multibus lines. Data bus lines DB0, DB1, DB2 and DB3 are connected to the opposite side of unit 374. Similarly, data bus lines DB4, DB5, DB6 and DB7 are connected to the opposite side of unit 376. As previously explained, the data bus is internal to rack 15 and serves to transmit data between various circuit boards. The bidirectional bus drivers 374 and 376 thus provide an interface between the multibus and the data bus. The direction of data flow in each instance is determined by signal $\overline{SEL2}$, which is applied to both bus drivers as shown.

Figure 17B:
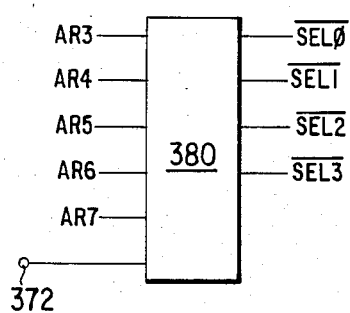
FIG. 17B shows a decoder for providing selection signals from address codes.
Figure 17C:
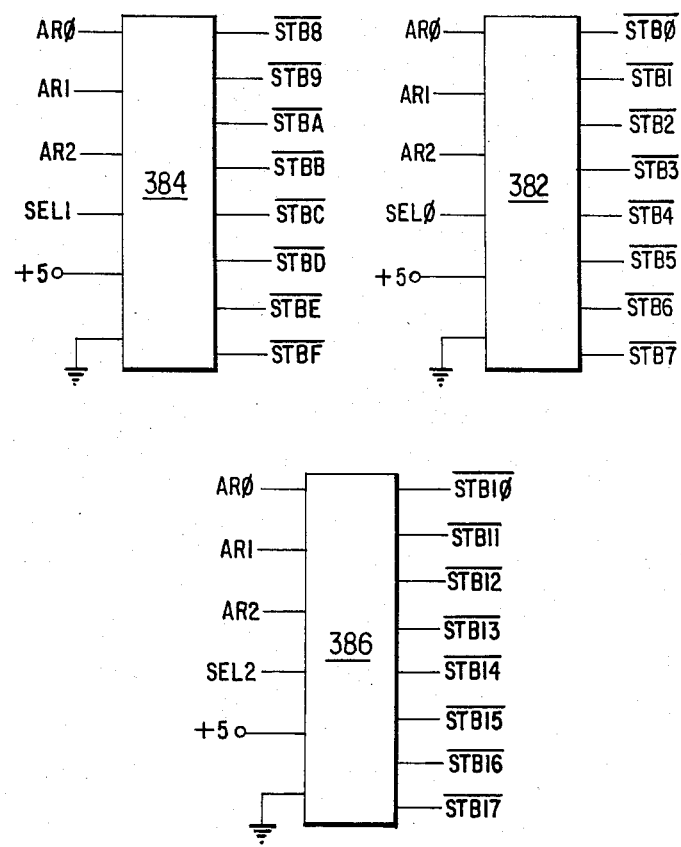
FIG. 17C illustrates decoders for providing strobe signals from address codes.

FIG. 17B shows decoder 380 which receives address signals AR3, AR4 ... AR7 at its inputs. Further, the signal provided at terminal 372 in FIG. 17A is applied to the decoder input, as indicated by the like-numbered terminal in FIG. 17B. The latter signal acts as a timing signal for decoding the applied address signals into selection signals $\overline{SEL0}$, $\overline{SEL1}$, $\overline{SEL2}$ and $\overline{SEL3}$, which are provided as shown in the drawing.

The strobe signals applied to the various circuits on rack 15 are provided by a set of decoders 382, 384 and 386, which receive both address signals and one of the aforesaid selection signals at their inputs. Thus, decoder 382 has address signals AR0, AR1 and AR2 applied on its inputs, as well as selection signal SEL0 and a +5 volt reference voltage. Depending on which of the last-mentioned address bits is active when SEL0 comes on, one of strobe signals $\overline{STB0}$, $\overline{STB1}$ ... $\overline{STB7}$ is provided at the output of decoder 382. Similarly, decoder 384 receives address signals AR0, AR1 and AR2 at its inputs, together with selection signal SEL1, and provides strobe signals $\overline{STB8}$, $\overline{STB9}$ at its outputs as well as strobe signals $\overline{STBA}$, $\overline{STBB}$ ... $\overline{STBF}$. Decoder 386 receives address signals AR0, AR1 and AR2 at its inputs, as well as selection signal SEL2 and a +5 V reference, and provides strobe signals $\overline{STB10}$, $\overline{STB11}$ ... $\overline{STB17}$ at its outputs.

FIG. 17D illustrates a decoder 388 which provides an interface between the data bus on rack 15 and reader head 30. As shown, data bus signals DB2, DB3 ... DB7 are applied to the inputs of decoder 388, timed by strobe signal STB17. A control signal $\overline{FWD}$ is derived at the output of unit 388 and causes the optical system of head 30 to rotate in the forward direction. A further control signal derived at the output of unit 388 is the $\overline{CYCLE}$ signal. The latter signal causes the optical system to rotate in a forward direction, e.g. approximately 420°, and then cycle back to its starting position. Decoder 388 further provides control signals DIOR and DMOR at its output whose functions are explained elsewhere herein.

FIG. 17E illustrates a circuit which is used in the present system to provide an acknowledgement signal to the microprocessor. A NAND gate 390 is adapted to receive signals $\overline{SEL0}$, SEL1, and $\overline{SEL2}$, all of which are representative of an input/output transaction. Further, gate 390 receives the signal $\overline{\text{SELM}}$ at its input, which is representative of a memory transaction. If all of these signals occur simultaneously, an output signal is generated by gate 390. Upon being inverted by inverter 392, a signal $\overline{\text{XACK}}$ is provided at output terminal 394, for application to the microprocessor. In essence, the circuit shown in FIG. 17E acknowledges to the microprocessor that the microprocessor may advance to the next instruction, all previous transactions having been completed.

FIG. 17F illustrates the derivation of signals $\overline{\text{SELM}}$ and $\overline{\text{MWE}}$ from signals received on various multibus lines. Unit 396 is a 1-of-8 decoder which provides memory select signals $\overline{\text{MS1}}$, $\overline{\text{MS2}}$, $\overline{\text{MS3}}$ and $\overline{\text{MS4}}$ in response to six input signals received from the multibus. Signals $\overline{\text{MS1}}$–$\overline{\text{MS4}}$ are applied to the input of a NAND gate 398 whose output is coupled to one input of each of a pair of NAND gates 400 and 402.

An inverter 404 provides a signal MW at its output in response to an applied multibus signal. The signal MW, which provides a memory write command, is applied to a second input of gate 400 to generate the signal $\overline{\text{MWE}}$ at the output of the latter gate. An inverter 406 provides the signal MR at its output in response to an applied multibus signal. Signal MR, which constitutes a memory read command, is applied to a further input of gate 402. The output of gate 402 is coupled to an input of a NAND gate 408. A second input of the latter gate is connected to receive signal $\overline{\text{MWE}}$. The output of gate 408 is coupled to an inverter 410 which provides the aforesaid $\overline{\text{SELM}}$ signal at its output.

Figure 18A:
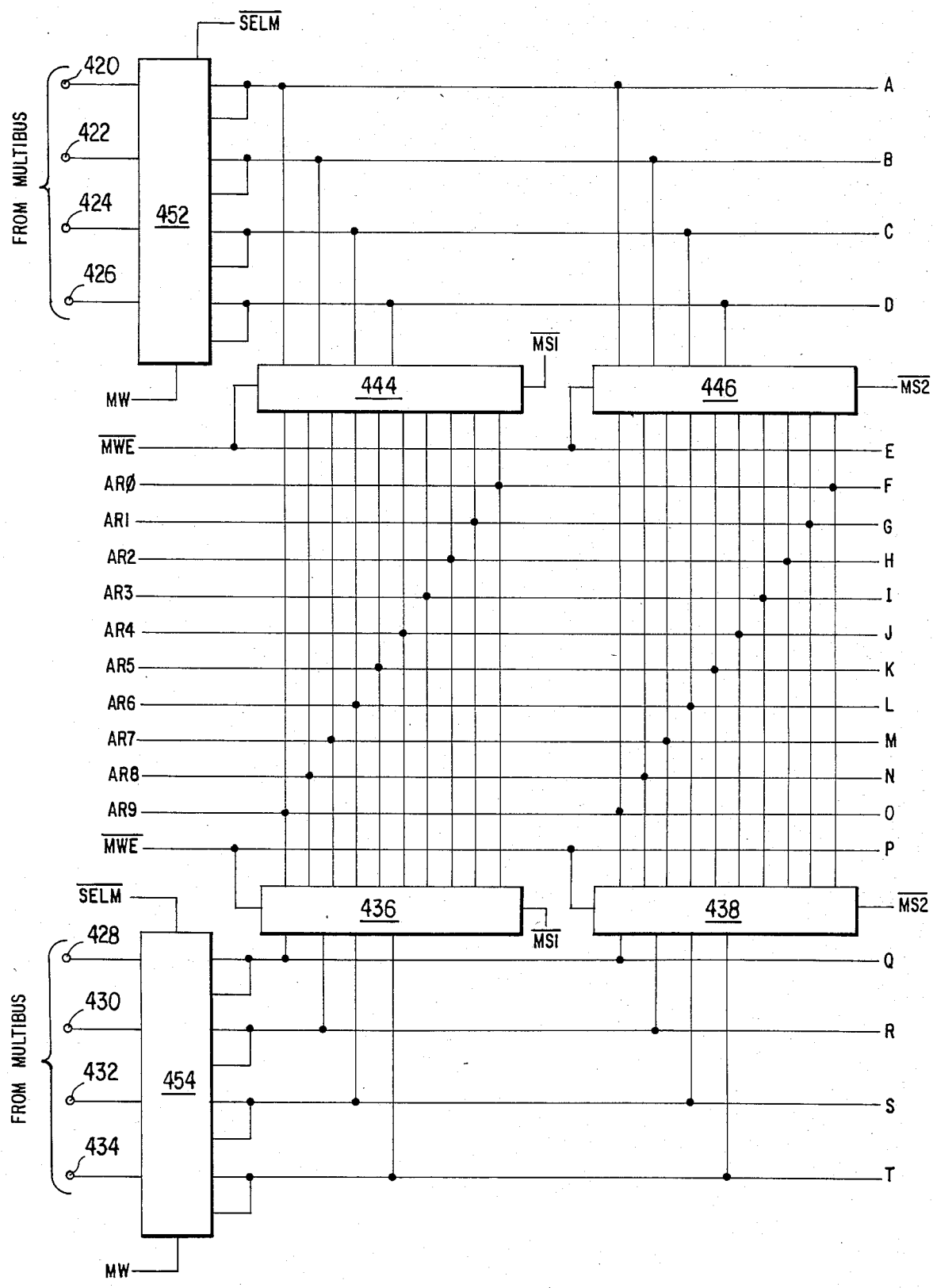
FIGS. 18A-18B illustrate a random access memory which is used for principal data storage in the present invention.
Figure 18B:
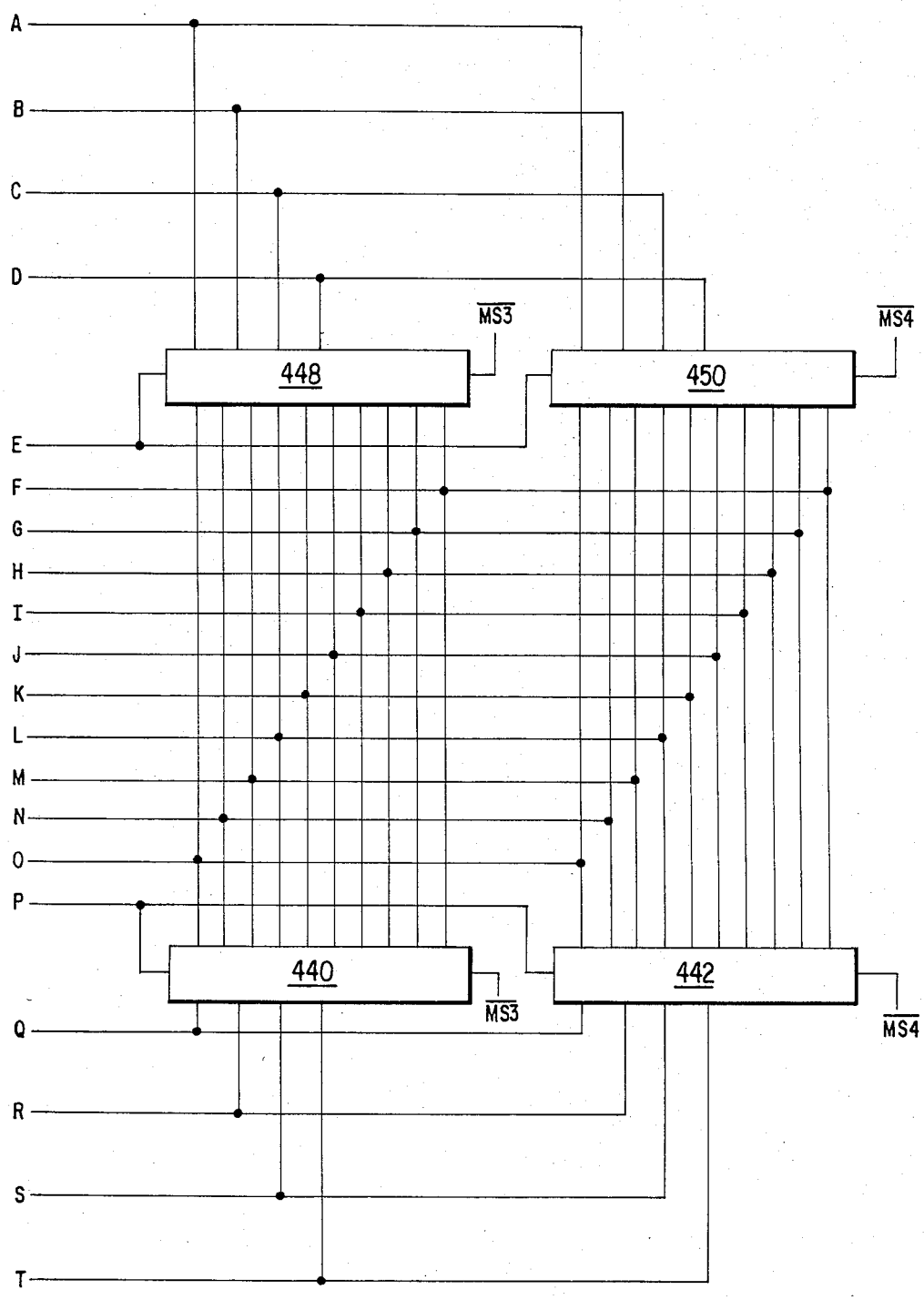

FIGS. 18A and 18B jointly illustrate a static random access memory of the type that may be used in the present system. Correspondingly lettered terminals in the two Figures are intended to connect with each other. The RAM is physically located on rack 15 and it includes a set of RAM chips 436, 438, 440 . . . 450, each providing 4K bits of storage. Thus, 4K bytes of memory are provided. The chips are commercially available from Intel Corp. under the designation 2114.

The RAM communicates with the multibus by way of terminals 420, 422, 424, 426, all connected to a bidirectional bus driver 452; and by way of terminals 428, 430, 432, 434, all connected to a second bidirectional bus driver 454. The memory select signals $\overline{\text{MS1}}$–$\overline{\text{MS4}}$ determine which of the chips is active. The signal $\overline{\text{MWE}}$, i.e. the write enable signal, controls whether or not data is to be transferred into or out of the chips. Similarly, signal MW controls the direction of data flow, but only in the bus drivers. Control signal $\overline{\text{SELM}}$ determines when the bus drivers are active. Address signals AR0, AR1 . . . AR9 determine the RAM address from or to which data is to be transferred.

The method in accordance with the present invention will be explained with reference to the specific example of the system discussed above, and with further reference to the functional flow charts shown in FIGS. 19, 20 and 21, and the maps of FIGS. 22 and 23. It should be noted that portions of various operations are pre-programmed and are carried out under the control of either microcomputer 19, shown in FIG. 2A, and its PROM, or under the control of PROM 230, shown in FIG. 12. The invention itself, however, is not intended to be limited in this manner and it may be hardware-implemented wherever performance and cost considerations so dictate.

As explained above, the characters stamped onto end plug 12 are generally aligned along a path which encircles the cylindrical surface of plug collar 14. The expected height, i.e. the "vertical" dimensions of each character in the specific example under consideration is approximately ⅛", which translates into 14 elements in the grid matrix shown in FIG. 4 after account is taken of optical transformations. The expected maximum width dimension is likewise 14 area elements, although it will be realized that some characters, e.g. the letter "I", will not be as wide. Further, as explained earlier herein, each plug carries a string of seven characters whose normal spacing along the path, i.e. its expected spacing, is generally uniform. In the specific example under consideration, the first two characters are always alphabetical, followed by five numerical characters. It was also shown above that variations can and do occur with respect to the "expected" norms, the latter further including the expected character orientation and expected line width. Nevertheless, these norms serve as criteria with respect to the location and the ultimate recognition of the unknown characters on the plug collar.

Figure 19A:
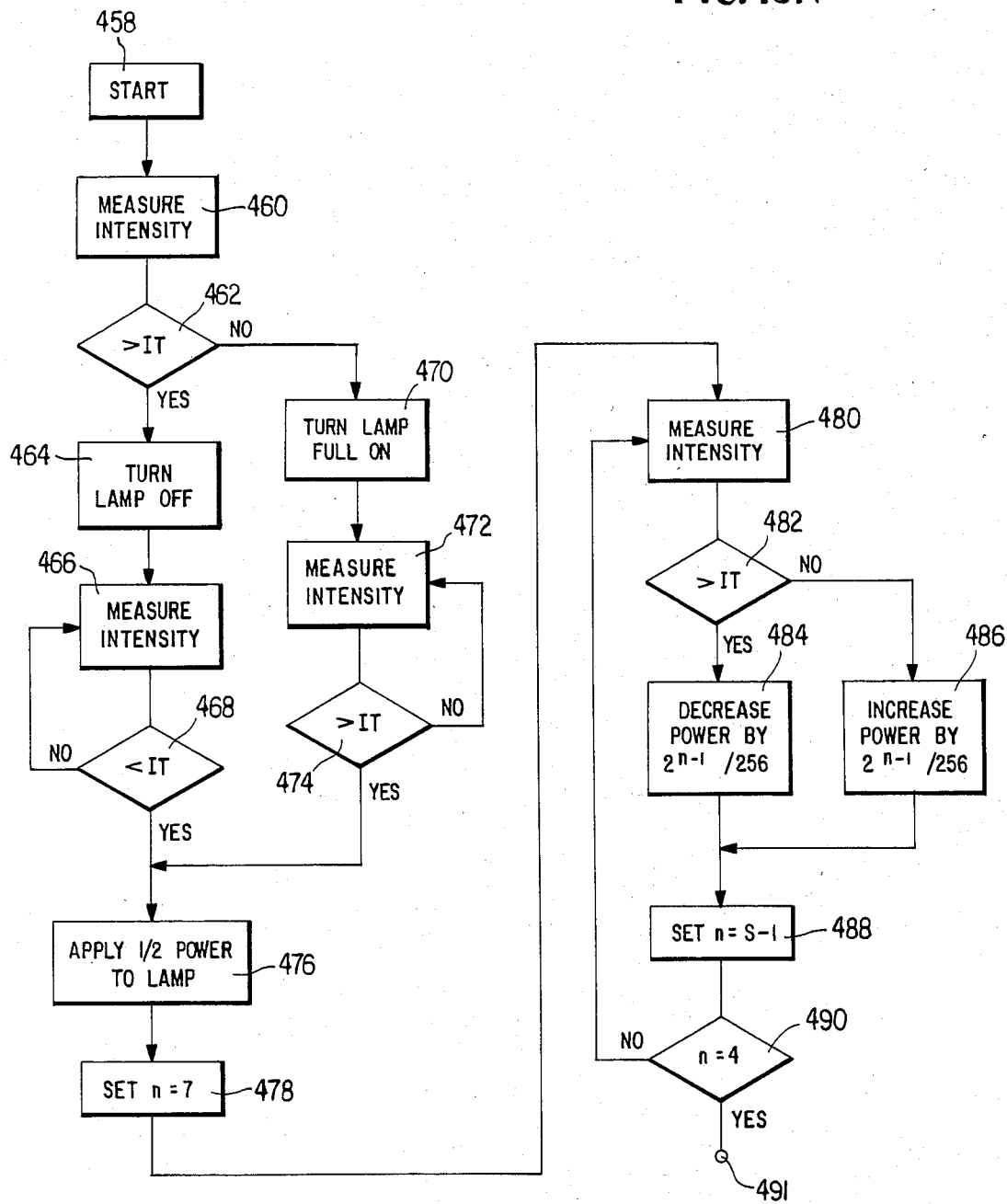
FIGS. 19A-19B constitute a functional flow chart which illustrates the light intensity control operation during pattern readout.
Figure 19B:
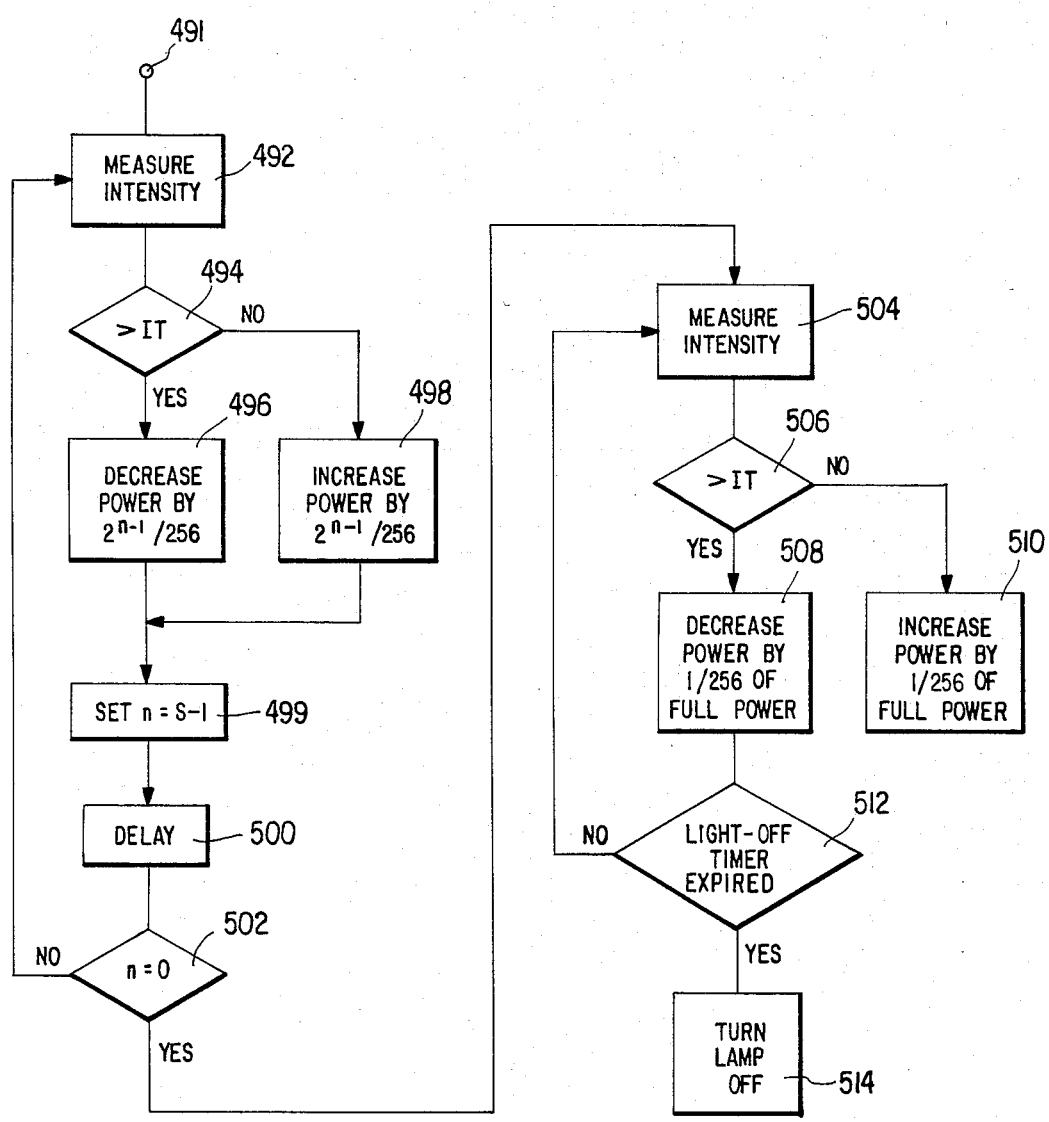

FIGS. 19A–19B jointly constitute a functional flow chart for controlling the illumination level in a manner that permits the readout of characters from surfaces, or from a single surface, whose reflectivity is likely to vary widely. As previously explained, the end plug is preferably made of a zirconium alloy and therefore presents a specular surface of relatively high reflectivity to the optical system. However, such a surface may have blotches, e.g. due to outgassing or the like, as well as other marks and scratches sustained in the handling of the plug. Any of these marks may affect the reflectivity of the character-carrying surface which provides the background against which the unknown character to be read out must be contrasted. As such, they may give rise to line-present indications or line-absent indications which are not actually true. Such false indications may also result from non-uniformities of the surface, such as occur from edge upset as a result of the stamping process.

Thus, in order to extend the operating range of the system, it is necessary to adjust the intensity level of the light source to accommodate a range of different reflective conditions, any of which may exist during the reading of the unknown patterns. The adjustment of the light intensity involves the control of high intensity lamp 32, which is an incandescent lamp in the specific example under consideration, and which therefore has a relatively long response time for increasing the light intensity and an even longer response time for decreasing it. This is not tolerable when a fast response is required, e.g. where a dark blotch suddenly moves within the field of view of the array as a result of the aforesaid relative motion of the optical system with respect to the plug. Thus, it becomes clear that the light intensity must be non-linearly controlled in order to achieve a rapid response and to reach the desired intensity level as quickly as possible. As will become clear from the explanation below, the present invention permits the final light intensity to be attained in a much shorter time interval than is possible by the use of conventional feedback control techniques employed in the prior art.

Block 458 in FIG. 19A represents the start of the illumination intensity control operation. At this point, the rotation of the reader head is started so that an isolated bright or dark spot will not unduly bias the results of the light intensity control operation. As shown by block 460, the light intensity is measured following the start of the operation. In a preferred embodiment of the invention, this intensity measurement is based on the output signals from a group of diodes, which have been selected on an empirical basis from the total number of diodes in the array. In the specific example under consideration, where 64 output signals result from each scan of the array, a control group of nine diode output signals is selected as representative of the general light intensity. The feedback signal for the control decision is based on the signals from the control group.

As indicated by block 462, the feedback signal is compared against a predetermined light intensity threshold IT. The latter is preferably stored as a reference signal level in the PROM of the microcomputer. If the light intensity is too low, then, at the end of each scan, the information is available to increase the intensity. Although the comparison could be carried out in a separate comparator circuit, in practice it is expedient to perform it in the microprocessor.

If the measured illumination intensity exceeds the light intensity threshold stored in the PROM at this stage of the operation, then lamp 32 is turned off as shown by block 464 in the flow chart. Lamp turn-off is implemented through the circuits discussed above in connection with FIGS. 5A and 5B. When the next scan occurs 8 msec later, the light intensity that is seen by the aforesaid control group of nine diodes is again measured and compared against the intensity threshold. This is shown by blocks 466 and 468. If the light intensity is still above the threshold, no action is taken other than a further measurement during the subsequent scan. If the intensity has fallen below the threshold, the operation proceeds to the next step, which is indicated by block 476 in the flow chart.

At the start of the operation, the more likely condition to be found when the comparison indicated by block 462 is made, is that the light intensity is below the set threshold IT, because lamp 32 is initially turned off. If the latter condition is found to exist, the microprocessor of microcomputer 19 commands that the lamp be turned on to its full intensity. Here again, the command is implemented by the circuits shown in FIGS. 5A and 5B. When the subsequent scan occurs 8 msec later, a further measurement is made of the light intensity, as indicated by block 472. Block 474 shows that the measured intensity is again compared to the intensity threshold. If the result of the last comparison shows that the light intensity continues to be below the threshold, no change is made. The lamp remains on at full power and a measurement is again made at the time of the next scan. These measurements at 8 msec intervals are repeated until the comparison indicated by block 474 finally shows the intensity to be above the set threshold. At this point the operation proceeds to the next step.

The action taken from the start of the operation to the point in time described above, represents the completion of the first control loop in bringing the light intensity to the vicinity of the desired level. At this point the second control loop is activated and provides successive approximations to reach the intensity level determined by the same intensity threshold IT. As previously explained, in the specific example under consideration, an 8-bit word is used to represent 256 possible light intensity levels. In accordance with the present invention, four successive approximations are made to achieve the desired intensity. Thus, in carrying out these successive approximations the four most significant bits of the 8-bit word which represents the intensity threshold are successively set.

The second control loop begins with block 476, which sets the level of power applied to lamp 32 at 50% of full power if either of the comparisons represented by blocks 468 and 474 produces a positive answer. As previously explained, a comparison is made following each scan of the diode array, i.e. every 8 msec. The number of comparisons remaining to be made in order to bring the light intensity to the desired intensity threshold level is represented by the expression "n" and it is decremented as successive comparisons are made. At this point, n is arbitrarily set to the value 7, as indicated by block 478. The latter number is selected on an empirical basis.

The light intensity sensed by the control group of diodes is again measured at this point, as shown by block 480. A comparison is made with the intensity threshold, as indicated by block 482. It will be remembered that lamp 32 is now at half power. If the light intensity has exceeded the intensity threshold at this point, the step indicated by block 484 is carried out, whereby the power is decreased by an amount $2^{n-1}/256$. On the other hand, if the measured intensity is below the intensity threshold, the power applied to the lamp is increased by the same amount, as shown by block 486.

At this point, as illustrated by block 488, n is set at $S-1$, where n still represents the number of comparisons remaining to be carried out and S represents the actual number of the last comparison, i.e. the number of the comparison made pursuant to block 482. As indicated by block 490, a determination is made as to whether or not $n=4$, i.e. whether or not four comparisons remain to be carried out. Here again, the number 4 is chosen on the basis of experience. If the answer is negative, the process reverts to the steps indicated by blocks 480 and those that follow and hence one more comparison will be made. Once the number of comparisons remaining to be made is down to 4, the second control loop has been completed and the operation advances to the third control loop.

The steps indicated by blocks 492, 494, 496 and 499 in the third control loop are substantially identical with those in the second control loop except that n has a different value and thus smaller power steps apply. At this point, as shown by block 500, a delay of 20 msec is inserted for the purpose of increased loop stability because of the thermal time constant of the lamp. Following this delay, a determination is made as to whether or not the number of comparisons remaining to be made is 0. If not, the operation reverts to block 492. If $n=0$, the operation advances to the final control loop.

The final control loop provides bang-bang type of control, whereby the power applied to the lamp is incremented or decremented by the smallest allowable step, i.e. 1/256th of full power in the example under consideration. Blocks 504 and 506 of the final control loop indicate that the light intensity is again measured and compared to the intensity threshold. Depending on whether the measured intensity is above or below the intensity threshold, the power applied to lamp 32 is decreased or increased respectively by 1/256th of full power. This process continues to the end of the period allocated for reading the characters, which has a predetermined duration. The interval is timed and at its conclusion the power applied to the lamp is turned off, as indicated by blocks 512 and 514.

The unique character of the process described permits the final light intensity to be reached in a much shorter time interval than could be achieved using conventional feedback control techniques. As shown, this is accomplished by the use of a plurality of different control loops, each having its own parameters tailored to the particular portion of the operation. The first correction required is assumed to be the largest and hence a full power step is provided. As a consequence of the latter action, the light intensity is rapidly increased (or decreased) to the general region of desired operation, as determined by the most significant bit of the control word. As each successive loop is employed, the amount of the correction is decreased, as determined by the next most significant bit and so forth. Thus, the rate at which the corrections can be made is increased.

It will be clear that the foregoing operation automatically adjusts for differences in the reflectivity of the background against which the characters appear. Thus, when a discolored area, such as area 18 in FIG. 1, suddenly appears before the array and reduces the amount of light reflected to the latter, a correction of the power applied to lamp 32 is quickly and automatically made.

The video processor and its function in the overall system have already been discussed in connection with the description of FIGS. 7A and 7B and in connection with the detailed circuit drawings of that equipment. It will be recalled that the video processor assigns a status indication to each element of the grid matrix after suitably testing it relative to the neighboring matrix elements. As a result of that process, status indications for all elements are stored in RAM which jointly map, element by element, each unknown character to be read out. The data thus stored in the RAM is subsequently used to first locate each character within the grid matrix and then to identify it through the correlation technique described below.

FIGS. 20A-20E illustrate the process of locating the first character in the succession, an operation that is essential to achieving a high level of reliability of readout. As shown by blocks 520 and 522 in FIG. 20A, the rotation of the head is started and a delay is interposed to enable the rotational speed, as well as the illumination intensity, to stabilize and achieve steady state.

It is important that the collection of data not begin in the middle of a character, or in the middle of a succession of such characters. To avoid that possibility, information is accumulated from the RAM for M scans of the array and the number of line-present signals (LP's) in the collected information is counted. This is shown by block 524. As illustrated by block 526, a comparison is made between the number of line-present indications and a count threshold. The latter is stored in the microprocessor. If the number of line-present signals exceeds the count threshold, it indicates that a character is being scanned. In a preferred embodiment of the invention $M=10$, in order to cover an area of the character-bearing surface which is wide enough to include at least one character. The width defined by 10 scans is nevertheless smaller than the maximum character width, which is 14 scans in the example here. The 10-scan width is required in the event that the first scan falls between two characters of the character string.

If the comparison illustrated by block 526 yields a negative result, it indicates that the last-examined sample of M scans was collected outside the character string, i.e. from a portion of the path where no characters exist. In the latter portion of the path, any line-present indications that may be stored are due to scratches, marks and other blemishes of the plug surface in that area. If the comparison yields a positive result, it indicates that M scans of data were collected from the path portion that contains the character string. In the latter case, the operation reverts to block 524 and a further sample of M scans is collected. The process repeats until a negative comparison result is obtained.

The operation illustrated by block 528 is substantially identical to that carried out in block 524 and need not, therefore, be further explained. In block 530 the count of line-present signals is compared to the aforesaid count threshold. If the count is smaller than the threshold, the operation reverts to block 528. If it is larger, the information collected from the last M scans is retained and is stored in RAM. The latter step is indicated by block 532 in FIG. 20B. Block 534 shows that information is now collected from N further scans, where $N=250$ in the example under consideration. Thus, $N+M$ total 260 scans of information, which completely cover the full succession of characters on the end plug.

As explained in connection with FIG. 4, the expected dimension of the characters in the vertical direction covers 14 grid matrix elements. Each scan of the 64-diode array collects 64 elements of information. However, only a portion of the information so collected is useful for the readout of the characters. In the example under consideration, the data collected from the total information provided by each scan covers only the central scan portion, specifically 16 diodes above and below the center respectively. Thus, for each of the aforesaid scans, only 32 locations in RAM are examined for line-present signals. The latter step is illustrated by block 535. Block 536 shows the counting of the line-present signals in the collected data, now limited to 32 diodes.

As illustrated by block 538, a running sum of line-present signals is computed, limited to P scans. In the preferred embodiment of the invention, $P=14$ and thus covers the maximum expected, horizontal character dimension which is 14 matrix elements wide. As the line-present count for each successive scan is added, the count from an earlier scan is subtracted. This is done for all 260 scans. The running total of these counts constitutes the aforesaid running sum.

Block 540 shows that the running sum data is examined for peaks. The location of each peak is marked and certain peaks are selected from the total number of detected peaks. The selection is based on the spacing of the detected peaks from each other. Only those peaks are selected whose spacing corresponds to the expected spacing of the characters. Data concerning the expected character spacing is stored in the PROM of the microcomputer. The operation is conveniently carried out in the microprocessor of the latter, but could also be implemented by more conventional circuitry. It continues until the count of selected peaks equals the number of characters in the succession. That number, which equals 7 in the present example, likewise resides in PROM where it has been previously stored. The determination of whether or not seven peaks have been found is carried out in block 542, as shown.

If the result of the comparison made by block 542 is negative, a determination is made as to whether or not the number of scans performed so far is greater than $M+N$. The latter process is illustrated by block 544.

Under the assumed conditions, if seven peaks have not been found and the number of scans is less than 260, the process reverts back to block 534 for further data collection and subsequent counting of the number of line-present signals. If seven peaks have not been found even though 260 scans of data have been examined, the process reverts to block 524. Under these conditions, the system assumes that the earlier part of the operation erroneously produced a positive result at the output of block 530. Such a situation may arise, for example, when an exceptionally marred plug surface provides erroneous line indications upon being scanned.

Once the seven peaks have been selected, the process continues by isolating the first character of the character string in a "horizontal" direction, i.e. in a direction parallel to the path of the characters. This is illustrated in block 546 in FIG. 20C. The horizontal centroid (center of mass) of line-present indications is located for a first portion of the grid matrix which asymmetrically straddles the path location of the first selected peak. The grid matrix portion is limited to $H_1$ scans, i.e. to a horizontal dimension of $H_1$ matrix elements. In the example under consideration, $H_1 = 18$ and all stored data which was collected outside these 18 scans is eliminated from consideration. Thus, the total horizontal dimension of the grid matrix portion in the example under consideration is 18 grid elements, which provides a margin of 2 elements on each side of the 14-element unknown character located inside this grid portion. Experience has shown that the character is not centered on the path location of its corresponding peak. Hence, the matrix portion is asymetrically positioned with respect to the peak. In the example under consideration, the matrix portion extends $-2$, $+16$ elements on opposite sides of the peak.

At this point, the unknown character has been horizontally isolated in a grid matrix portion which is 18 elements wide but 32 elements high in the "vertical" dimension, i.e. perpendicular to the path. The subsequent vertical isolation procedure is indicated by blocks 548 and 549. The vertical centroid of the aforesaid grid matrix portion is located, i.e. determined, and the area of the matrix portion is further reduced by reducing its vertical dimension to $V_1$ elements. In a preferred embodiment, $V_1 = 18$ and the vertical dimension of the remaining area of the grid matrix portion is centered on the aforesaid vertical centroid. As before, data which falls outside this $18 \times 18$ matrix portion is eliminated from further consideration.

As indicated by block 550, the second horizontal isolation step is initiated by locating the centroid of the line-present indications in the aforesaid $18 \times 18$ matrix portion. Block 552 indicates the reduction of the horizontal dimension of the grid matrix portion down to $H_2$ elements, centered on the last-determined horizontal centroid. In a preferred embodiment of the invention $H_2 = 16$. As before, data outside the now further-reduced area of the grid matrix is eliminated from consideration.

Figure 20A:
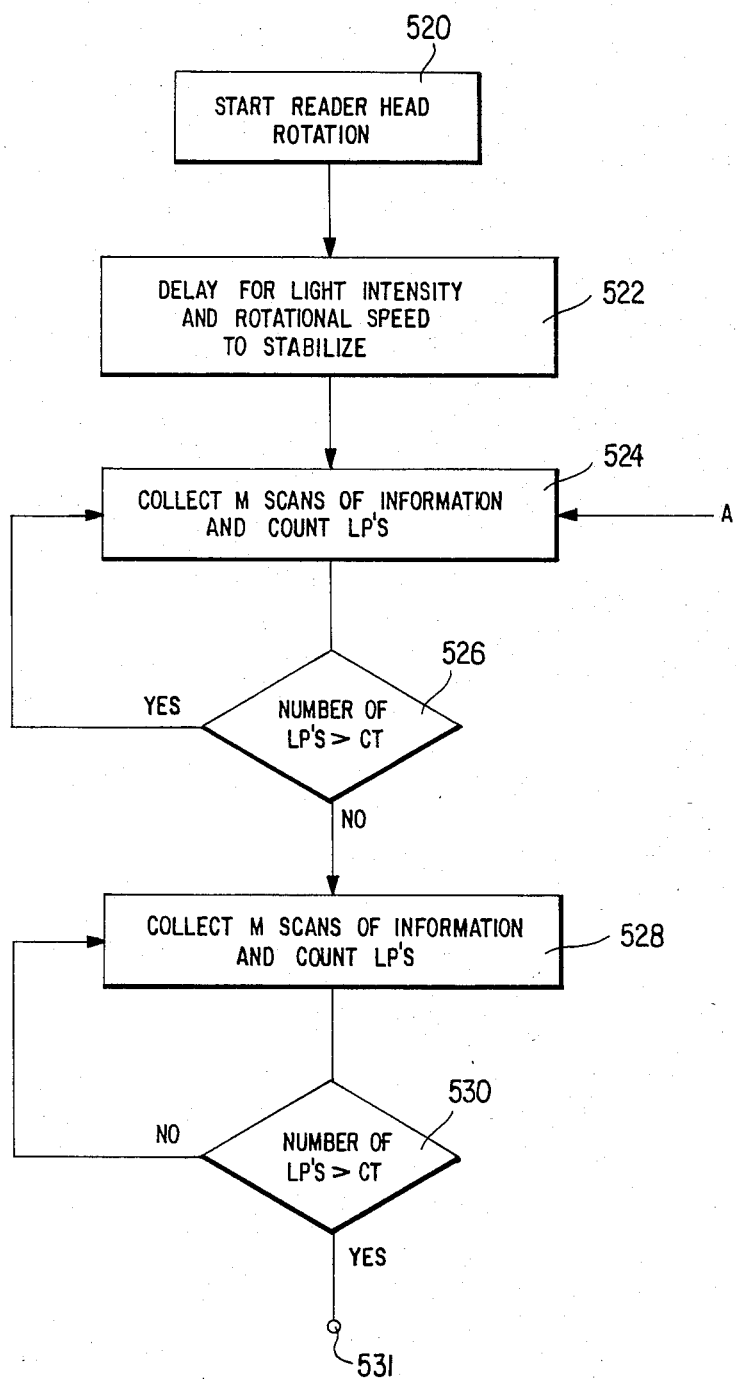
FIGS. 20A-20D constitute a functional flow chart which illustrates the pattern location operation during pattern readout.
Figure 20B:
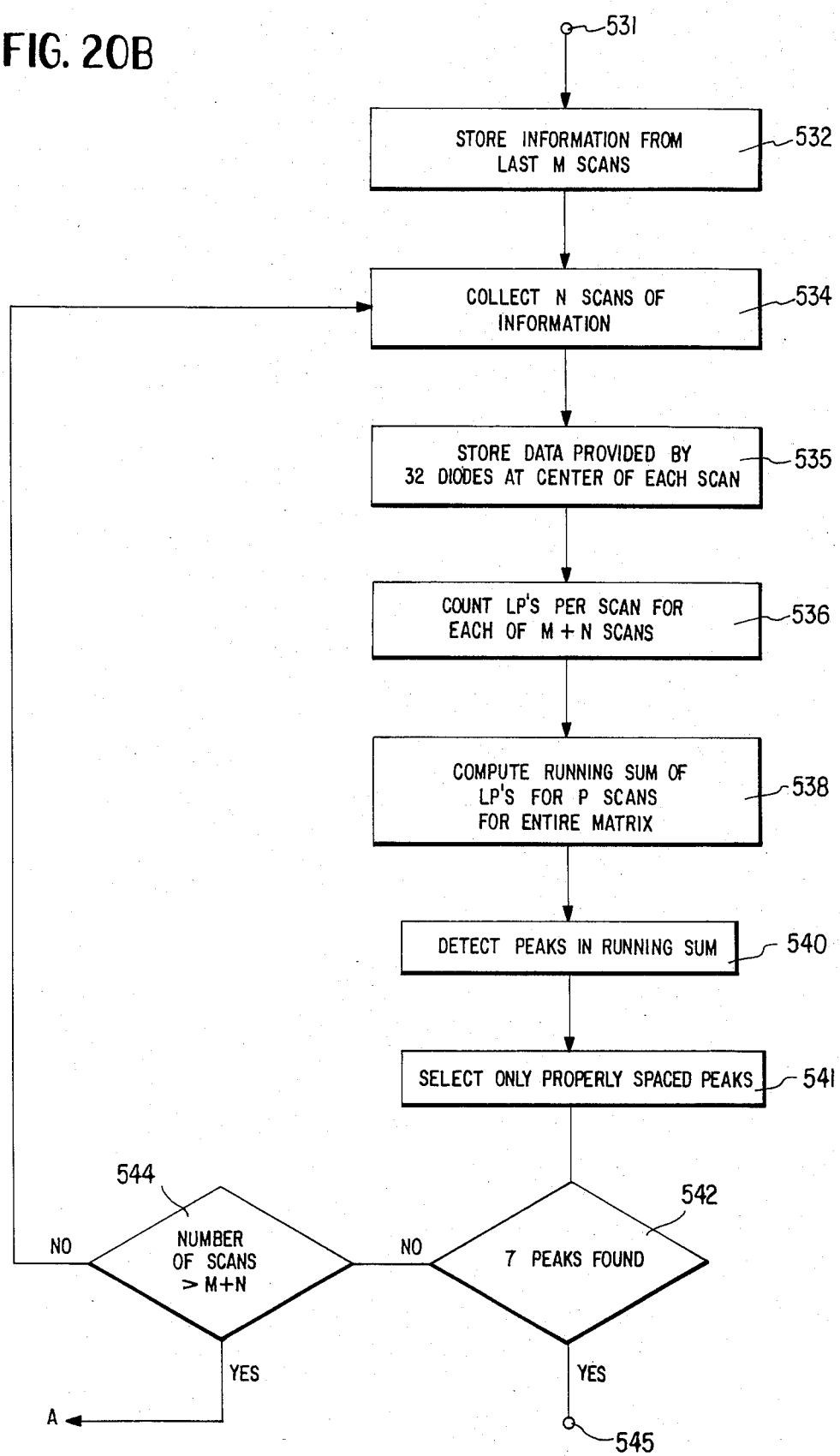
Figure 20C:
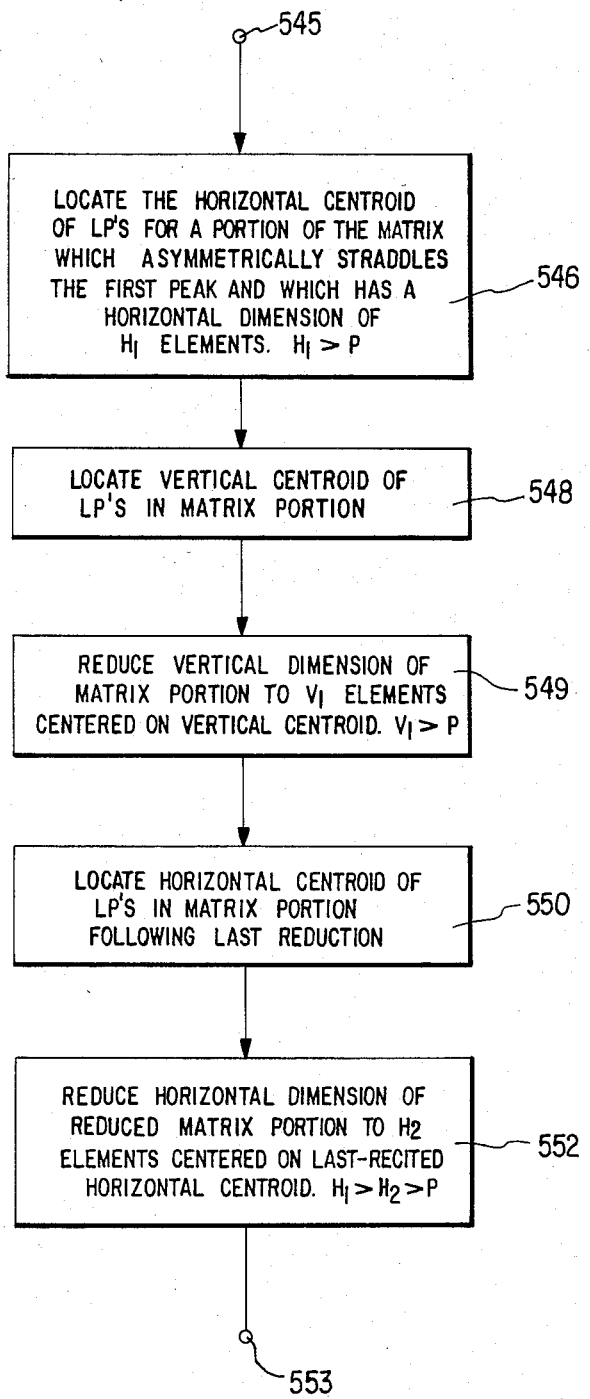
Figure 20D:
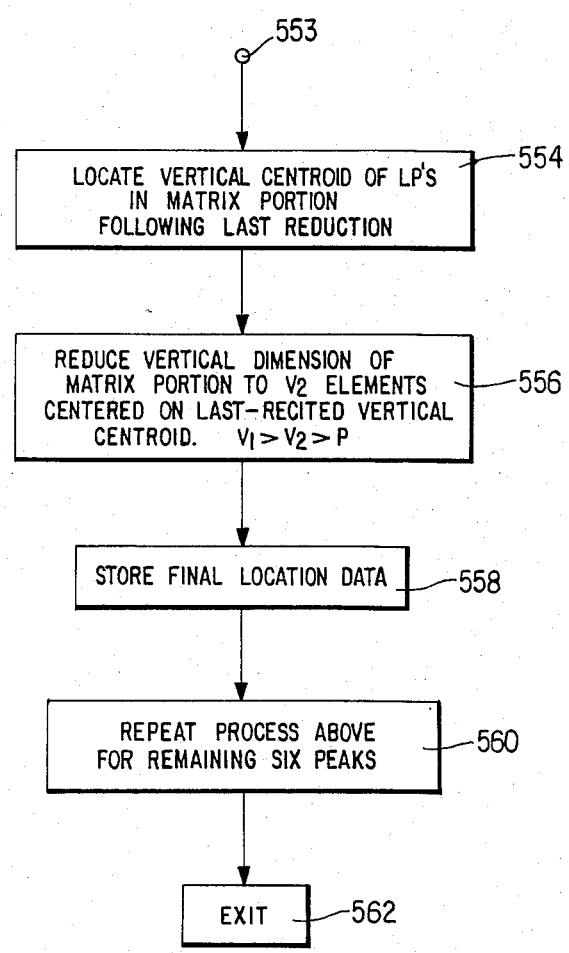

A second vertical isolation step is illustrated by blocks 554 and 556 in FIG. 20D. The location of the vertical centroid of the matrix portion that remains following the latest area reduction is now determined. As shown by block 556, the matrix portion is centered on the last-determined vertical centroid and its vertical dimension is reduced to $V_2$. In the example under consideration $V_2 = 16$. Again, all data which falls outside the reduced matrix portion is eliminated from consideration.

At the conclusion of the last step, the unknown character has been manipulated into a matrix portion which measures $16 \times 16$ elements and which constitutes the map of the unknown character. As indicated by block 558, the map of the character is now stored. In the present example, such storage occurs in RAM.

It will be appreciated that the invention is not limited to two iterations of each of the horizontal and vertical isolation steps. A closer degree of control may be obtained if additional steps are used to arrive at the aforesaid $16 \times 16$ grid matrix portion. For the present purpose, however, the two isolation steps in the horizontal and vertical directions respectively, are deemed to be adequate.

Block 560 indicates that the process described above is repeated for each of the remaining six peaks. Upon its conclusion, a map for each unknown character of the complete succession of characters resides in RAM. This ends the character location process, as indicated by exit block 562.

Figure 20E:
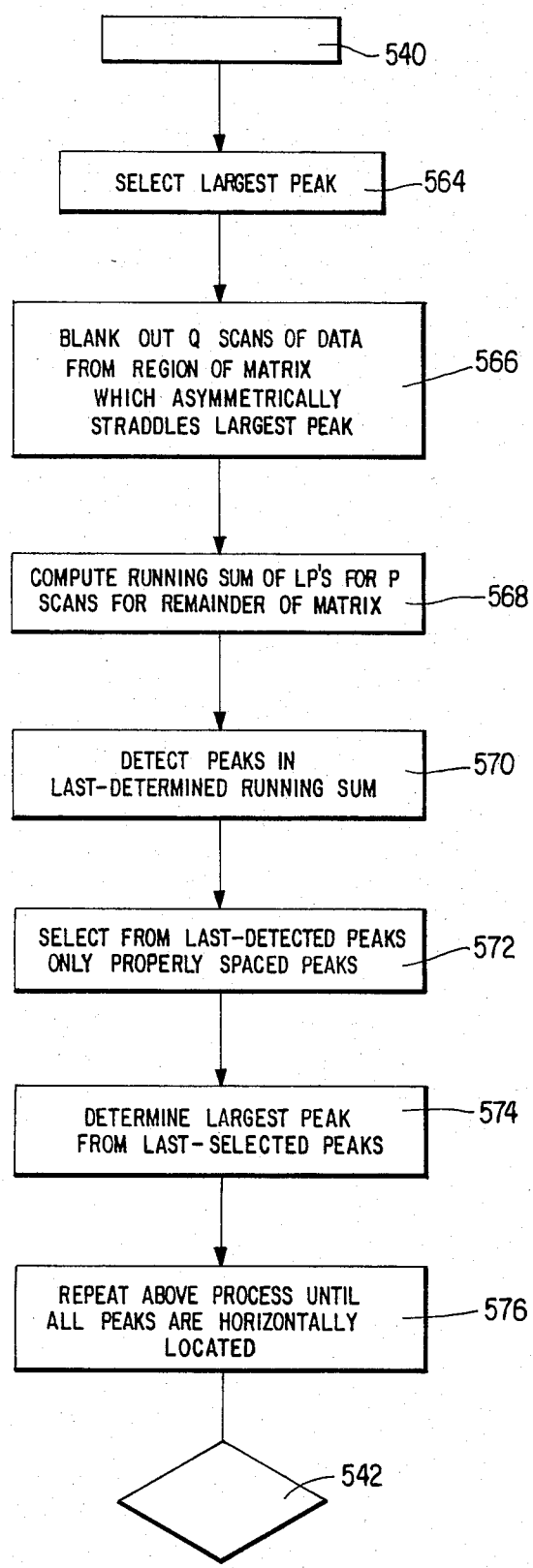
FIG. 20E represents an alternate flow chart for the character location process which can be substituted for block 41 of FIG. 20B.

A variation of the character location process described is illustrated in FIG. 20E and permits the location of the aforesaid peaks to be determined with even greater precision. The operation substitutes a series of steps for the step illustrated by block 541. Thus, following the detection of peaks in accordance with block 540, the largest one of the detected peaks is selected, as shown by block 564. Thereafter, as illustrated by block 566, Q scans of data are blanked out in a region straddling the location of the largest peak. $Q = 18$ in one example of the invention and is an empirically determined number. The last-mentioned region straddles the selected peak $-2$, $+16$ elements on opposite sides thereof.

With 18 scans of data blanked out, i.e. removed from consideration, the running sum of line-present signals for P scans is again computed, but only for the remaining portion of the stored data. This is shown by block 568 and again $P = 14$. Peaks are detected in the last-recited running sum, as indicated by block 570. From these peaks, certain peaks are selected by using the previous selection criteria, i.e. proper peak spacing which corresponds to the expected spacing of the characters. The step is shown in block 572.

From the last-selected peaks the largest one is again determined, as shown by block 574. As indicated by block 576, the steps outlined above are repeated until the number of peaks selected is equal to the number of unknown characters in the succession, i.e. seven characters in the example under consideration. The process then continues, starting with block 546.

The character recognition process utilizes the abovedescribed correlation circuitry to apply pre-learned maps, i.e. maps of the known character set and corresponding care maps, to the data map of the unknown character which is to be read out. This approach allows the use of any set of patterns, so that different types of line patterns may be identified. Depending on the available storage capacity of the system, there is essentially no limitation on the number of line patterns that can be identified. By using the correlation circuitry, high recognition speeds are attainable and the error rate is kept very low.

Figure 21A:
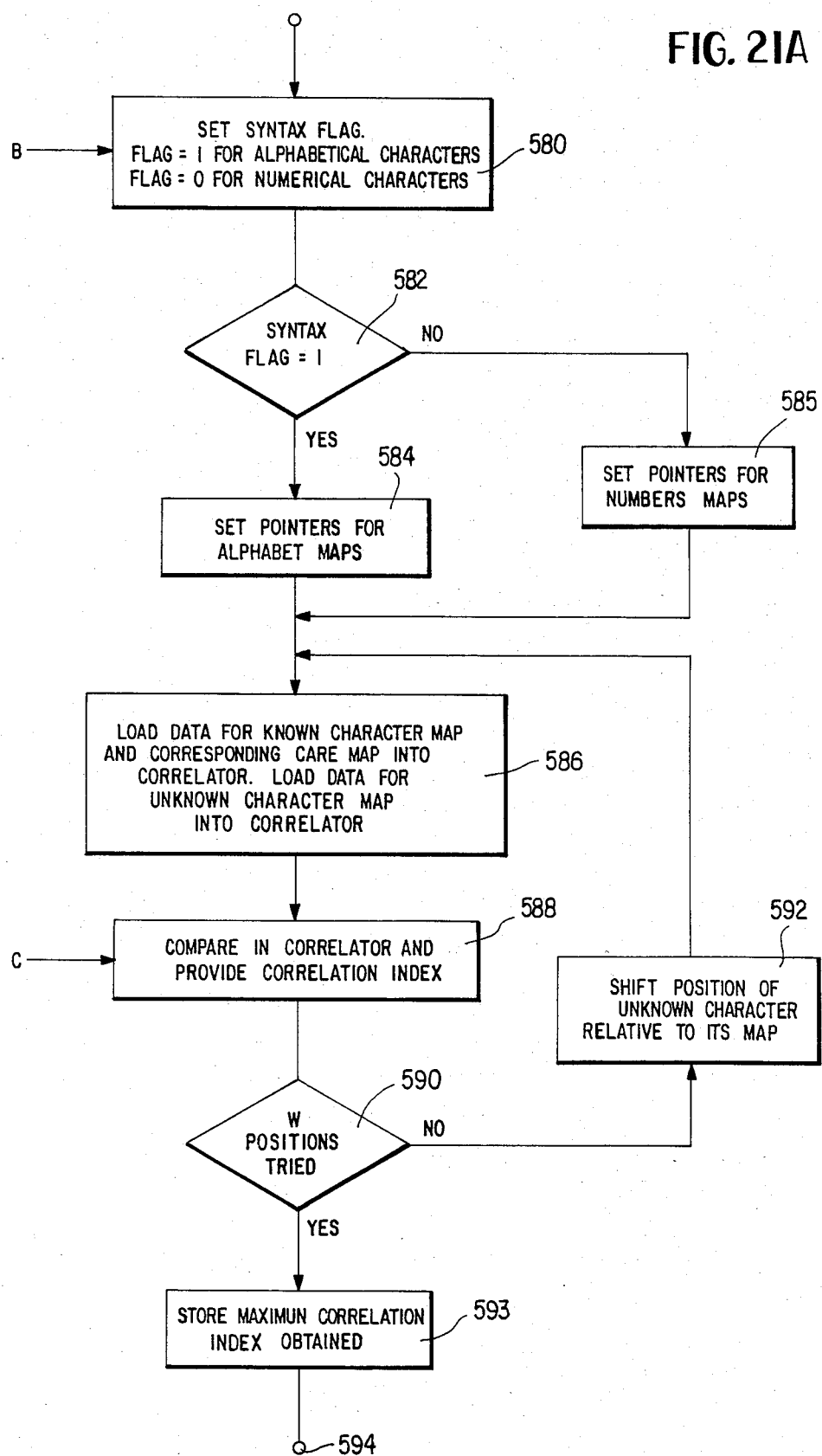
FIGS. 21A-21B constitute a functional flow chart wich illustrates the pattern recognition operation during readout.
Figure 21B:
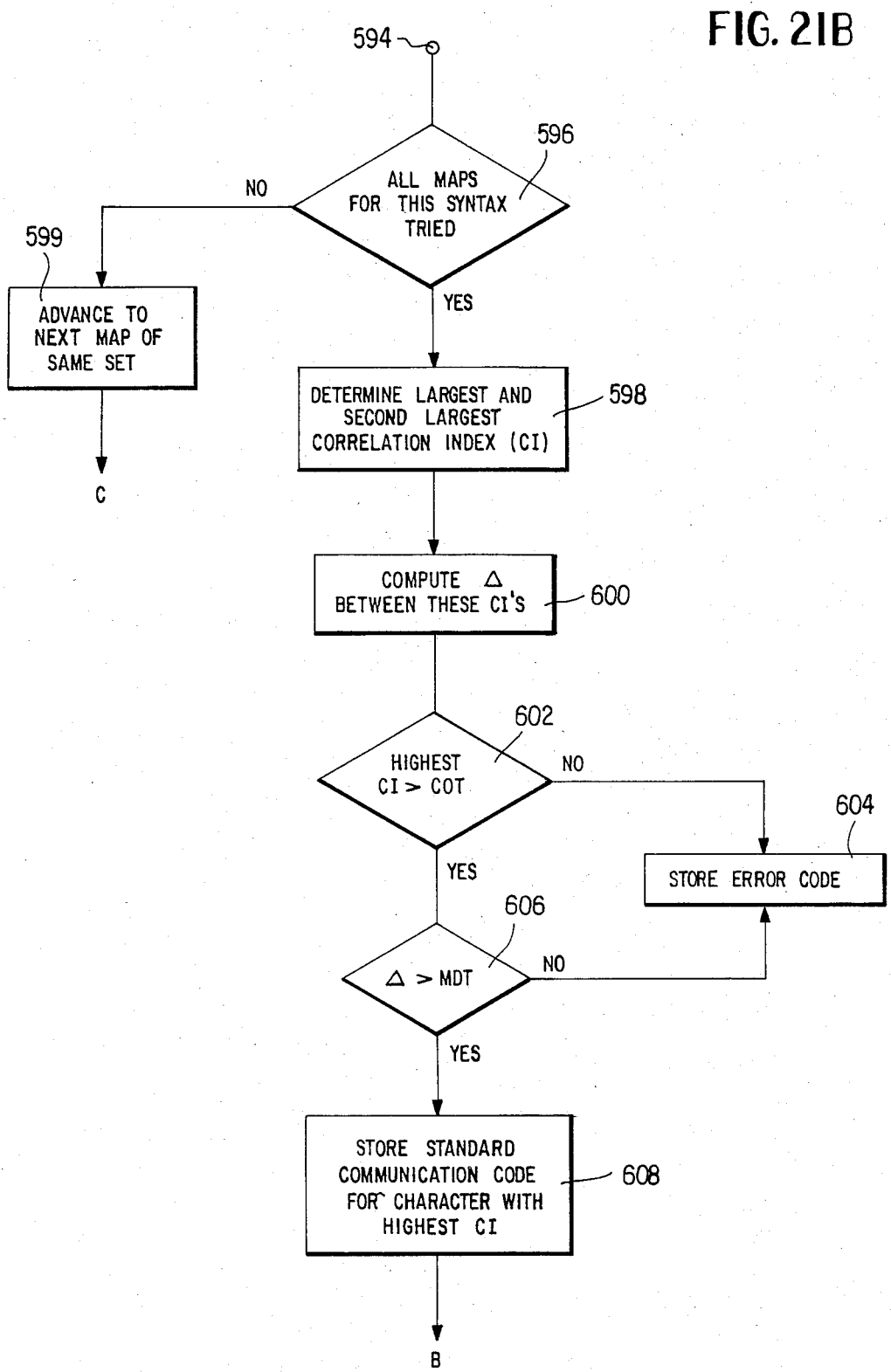

The character recognition process is illustrated in the flow chart shown in FIGS. 21A and 21B. This process follows the character location process described above.

The character to be identified (recognized) has, at this point been contained within a matrix portion whose dimensions are 16×16 elements.

Although the invention is not so limited, in the example under consideration the readout process proceeds on the assumptions that there is a serial succession of unknown characters; that there is general alignment of the unknown characters along the path; and that the unknown characters generally conform to expected line width, character dimensions, character spacing etc. As stated above, among the known factors is the fact that characters belonging to a particular character set will appear only in certain positions along the path and not elsewhere. Specifically, the first two characters in the succession will always be alphabetical characters, succeeded by five numerical characters.

The process is shown in FIG. 21A. As illustrated by block 580, a syntax flag is set in accordance with the characters that are being read. The convention adopted is to set a 1 for alphabetical characters and a 0 for numerical characters. First it is determined to which of the two available sets the unknown character belongs. This is illustrated by block 582. As shown by blocks 584 and 586, depending on whether or not the flag is equal to the ONE bit to which it is compared, pointers are set for alphabetical character maps or for numerical character maps. Assuming the pointers indicate the alphabetical maps, the data which defines the map of the first character in the alphabetical character set is loaded into the correlation circuit (shown in FIG. 14A), concurrently with the pre-learned data which defines the care map of the same character. Both are read out of the PROM of the microcomputer where they are stored. At the same time, the data which represents the map of the unknown character contained in the aforesaid 16×16 grid matrix portion is loaded into the correlator from RAM. Each of these items of data is loaded into a separate shift register of the correlator.

An element-by-element comparison is made between the map of the unknown character and the map of the first known character, i.e. the first character of the alphabetical character set. This is carried out in block 588 of FIG. 21A and it is done through an EXCLUSIVE OR operation. It serves to identify elements on the compared matrix grids which are identical to each other. The elements in the two maps that were identified as being identical to each other are then compared with their corresponding elements in the care map. This is implemented by an AND operation. Following further processing a correlation index (CI) is determined. The correlation index represents a figure of merit which indicates the degree of correlation between the unknown character and the known character to which it was compared.

In a preferred embodiment of the invention, these steps are repeated for each of W possible locations of the unknown pattern within its 16×16 grid matrix portion. These different locations test for variations of the position and orientation of the unknown character within its matrix portion, as well as for variations of character size and line width. In the example under consideration W=9. Accordingly, nine different positions of the known character within its 16×16 grid matrix portion are tested as described above. This is shown by blocks 590 and 592. If all positions have not been tried, data for the subsequent position is loaded in and compared. For each of these positions a correlation index is developed and the maximum index is stored, as indicated by block 593.

Following each such shifting to all possible positions, block 596, shown in FIG. 21B, determines whether or not all maps for the particular syntax, i.e. the particular alphabetical character set in the example under consideration, have been tried. If not, the map of the subsequent alphabetical character is loaded into the correlator, together with its corresponding care map. This is implemented through block 599, as shown. A comparison of the new map data is made with the map data of the previously compared unknown character, in substantially the same manner as explained above. The results of the latter comparison are then compared to the corresponding care map, again as previously explained.

Upon the completion of the above-described process, as indicated by a positive output from block 596, the maximum correlation index from the nine positions in which each known character was compared to the unknown character resides in storage. These CI's are now examined to determine the largest and second largest ones of the group, as shown in block 598, and their difference (Δ) is computed, as indicated by block 600. The largest of the two indices is now compared to a predetermined correlation threshold (COT), which is normally stored in the PROM of the microcomputer. This comparison is indicated by block 602.

If the result of the last-mentioned comparison is negative and the highest correlation index is smaller than the correlation threshold, an error code is stored as illustrated by block 604. If the results of the comparison are positive, a further comparison is made, as indicated by block 606. The last-recited comparison determines whether or not the difference Δ between the two highest correlation indices is greater than a predetermined minimum difference threshold MDT, which is likewise stored in the PROM. If Δ is smaller, it likewise results in an error code being stored, as illustrated by the indicated connection between blocks 606 and 604. The error code indicates that there was no identification of the unknown character and hence no readout.

If the results of the comparison performed by block 606 are positive, a standard communication character code is stored for the previously unknown character, which has now been successfully identified and read out. This is illustrated by block 608. In a preferred embodiment, the standard code stored is the ASC II code.

The process described above is now repeated for each subsequent character of the character string on the end plug. It will be understood that the syntax flag will change when the numerical characters are reached for readout along the path. At that time, the step performed by block 584 is to set the pointers for numerical maps.

Figures 22A, 22B:
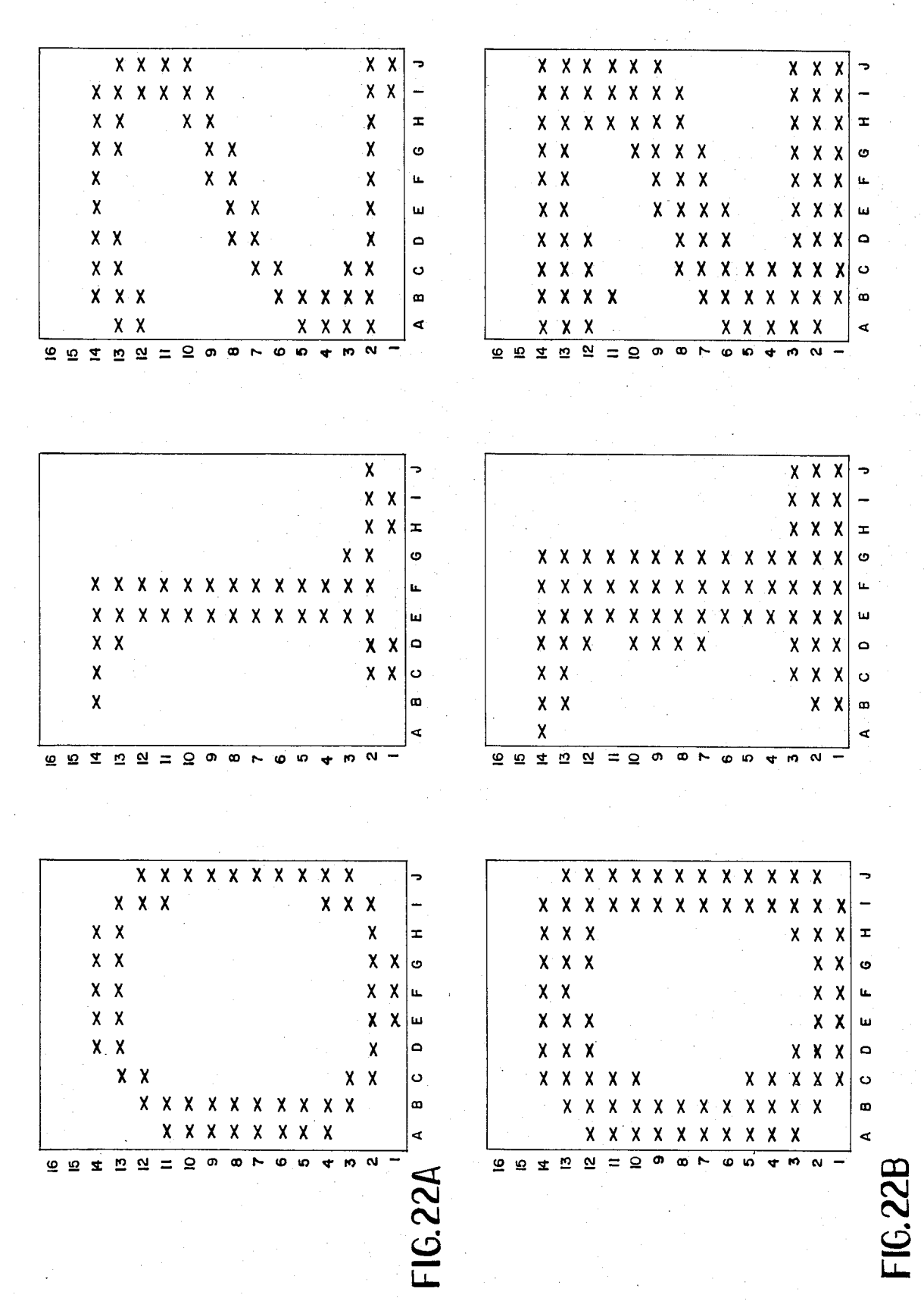

FIGS. 22A and 22B illustrate the generation of character maps. Each map is generated from repeated readings of a learning set which comprises a plurality of media that provide multiple examples of each set of patterns. In the specific example under consideration, the learning set consists of a plurality of end plugs, on each of which seven alphanumeric characters are stamped. The number of plugs is sufficiently large to provide multiple examples of each character of both the alphabetical and the numerical set.

Using the method described in connection with FIG. 7B, line-present (dark) and line-absent (light) indications are provided for each character of the learning set during each reading thereof. A number is stored in RAM for each element of the grid matrix portion with which a particular character is associated. Each such number indicates the number of times which that element was read with a particular status indication, i.e. with a line-present indication or a line-absent indication. The status indication which is provided by the majority of readings then becomes the status indication stored for that element for purposes of generating its character map. It should be noted that the expression "majority of readings", as used above, is defined by empirically determined factors. For example, these factors may dictate that a particular status indication is to be adopted only if 70% or more (rather than 51%) of all readings of that element for the character under consideration yield the same result. In the latter case, if only 69% of all readings provide the same result, the status of the element is considered to be indefinite. Thus, a number of elements will fall into a twilight zone and no status indications will be recorded for them.

FIG. 22A illustrates maps for the numerical characters 0, 1 and 2. The grid matrix portion in each instance is limited to 10 horizontal elements and 16 vertical elements in the illustrated example. The crosses indicate the elements for which line-present (dark) indications were read in a majority of the readings. It will be seen that the corresponding portions of a particular character are not necessarily mapped in the same way even though the character is symmetrical. For example, the vertical portions of the character 0 differ from each other in the drawing. The left hand side contains a larger number of elements that show up dark in the majority of readings, than does the right hand side. Similarly, the top and bottom portions of this character have different numbers of dark elements.

FIG. 22B illustrates maps for the same characters that are shown in FIG. 22A which are, however, plotted in accordance with different criteria than the characters of FIG. 22A. Thus, elements that appear light in a majority of readings are indicated by blanks in FIG. 22B, while the crosses designate those elements that do not show up light in a majority of the readings.

A comparison of the maps of FIGS. 22A and 22B for the same character, indicates the location of the above-mentioned twilight zone in which the status of elements is not readily identifiable. For example, in FIG. 22A the map for character 1 does not show elements D-3, D-4 . . . D-12 to be dark. However, in the corresponding map of FIG. 22B, elements D-3, D-7, D-8, D-9, D-10 and D-12 are indicated as not being light. Thus, the last-recited elements fall into the zone of uncertainty and cannot be used either to identify with another character, or to distinguish over it.

On the other hand, in FIG. 22A, elements G-4, G-5 . . . G-14 of the character 1 are all indicated as not being dark. In the corresponding map of FIG. 22B, the latter elements are all shown as not being light. Hence, in accordance with the criteria adopted, the final map for the character 1 may well show elements G-4 through G-14 as being dark. However, FIG. 22A represents a more conservative, and therefore a more reliable, map of character 1, since it excludes elements G-4 to G-14 and does not depict them as being dark in the majority of readings.

Figures 23A, 23B:
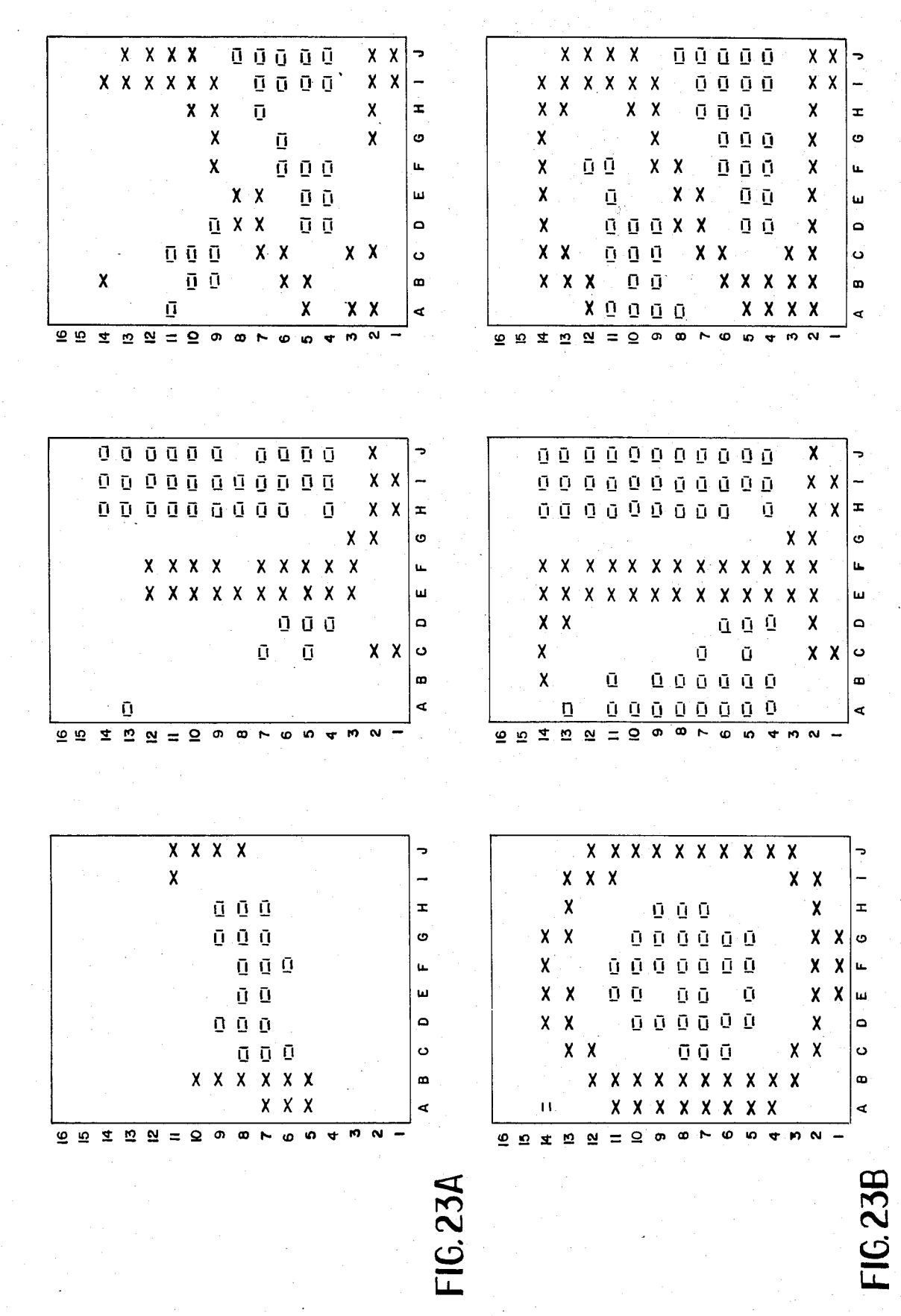

FIG. 23A illustrates "care" maps for the aforesaid characters 0, 1 and 2. Each care map is limited to elements of maximum difference between a particular character and all other characters of the same set, i.e. all other numerical characters in the example under consideration. This is accomplished by taking the character map of a particular character and comparing it successively with the character maps of each of the remaining characters of the same set. Each comparison identifies correspondingly positioned elements that are identical. The character which has the largest number of identical elements with the unknown character against which it is compared, is designated as the "most similar" character. For example, if the characters 1 through 9 are successively compared to the character 0, character 9 may well end up as being the "most similar" character.

Thereafter, correspondingly positioned dissimilar elements are identified in the maps of the compared characters, i.e. the character being tested and the most similar character, e.g. the maps of characters 0 and 9. These elements then constitute a preliminary "care" map, so named because it contains the sole elements of concern for distinguishing between the two characters.

The care map which is generated in this manner is subsequently compared to the character map of each of the remaining characters in the set. In the example under consideration, the care map for the character 0 is successively compared to the character map for each of characters 1 through 8. In these comparisons, correspondingly positioned dissimilar elements are identified and a refined care map is generated for character 0. Of the group of dissimilar elements that are identified upon comparison of the character 0 with its most similar character, (here assumed to be the character 9), the only elements retained in the refined care map are those which also qualify as dissimilar elements in each comparison of character 0 with characters 1 through 8.

As a final optional step, a normalization number may be computed for each character, such that a perfect match will result in a number to which all other matches for that character can be referenced. Using an 8-bit word, the number 255 is conveniently designated as the number against which each correlation index is compared in order to obtain a figure of merit of the closeness of the matched characters.

FIG. 23B illustrates an optional extension of the care map concept in which the most probable dark and light elements are added to the care map of FIG. 23A, until each map contains a predetermined number of elements. Elements which are common to all characters are deleted in these maps.

As previously explained, the grid matrix is a purely imaginary concept which is introduced herein for the purpose of visualizing the operation of the invention. This is likewise true for the pattern and care maps discussed above for the known characters. Although these maps may be physically plotted or printed, they have reality in the present invention solely in the form of signals stored at appropriate addresses in PROM or RAM. Thus, the various comparisons and other manipulations required to generate and store the signals for the maps illustrated in FIGS. 22A to 23B, are preferably performed in the correlator under control of the microprocessor.

Although the foregoing disclosure of a preferred embodiment of a system and method for pattern recognition is deemed to be adequate for a full understanding of the present invention by those skilled in the art, for the sake of completeness of this disclosure Appendix A is included herewith and provides the pertinent computer program in machine language for operating the disclosed embodiment of the invention.

From the foregoing discussion of a preferred embodiment of the invention, it will be clear that the system and method disclosed herein and specific features thereof are not limited to the optical readout of a string of alphanumeric characters stamped onto the surface of a metallic end plug, but that they are applicable to the readout of any line pattern or patterns of arbitrary shape and orientation from different kinds of media, in particular to the readout of a succession of line patterns. The invention enables the readout to be carried out with a high degree of reliability under many different adverse conditions. The system is tolerant of blotches, marks and scratches on the medium, of media of different reflectivity, of pattern-carrying surfaces which are not planar, of surfaces that are not uniform, and of patterns that depart from the norm by variations in their position, size, orientation and line width. In addition to the specific example illustrated and described herein, the invention is applicable to the readout of characters or other line patterns stamped onto the curved surfaces of turbine blades, onto the flat surfaces of keys, characters appearing on tires, characters embossed on a surface, characters printed on paper to check the type fonts of the corresponding typewriter or printer, and characters disposed on a variety of other media.

The term line pattern is used herein in its broadest sense and is understood to include the line configuration established by an etched mask or the like for making various microcircuit components, by substrates for the same purpose, by VLSI and hybrid microcircuits, by printed circuits and by similar circuit components. By comparing a map of the known configuration to a map of any of the aforesaid components, a manufacturing inspection of the latter may be performed directed to various objectives, e.g. to make a topological inspection for checking the presence or absence of interconnections in these components, to check circuit elements, etc. Accordingly, the present invention is not limited to the readout of alphanumeric characters, but is applicable to the readout of any type of pattern, or sets of patterns, limited in number primarily by the available storage capacity of the system. Further, since the invention is capable of learning new patterns, there is essentially no limit on the number of new patterns that can be committed to memory to identify similar unknown patterns.

Although the invention is primarily intended to facilitate the readout of low-quality patterns, i.e. patterns which are difficult to read because of factors associated with variations of the pattern, or with the background against which the pattern must be read, or with both, it is equally operable to the readout of high-quality patterns. Under certain conditions some features of the invention may be omitted, or used alone, or used with some but not all of the disclosed features. Thus, the present invention includes individual features of the overall system disclosed herein, and it further applies to the combination of some of the features disclosed herein without other disclosed features.

Further, modifications or variations of specific features that lie within the ordinary skill of one knowledgeable in the pattern recognition field, are intended to be included in the scope of the present invention. For example, it has already been noted that the reader head may be adapted by means of slip rings to permit continuous rotation of the optical system instead of rotation through a specific angle and a subsequent return to the starting position. It will also be clear to those skilled in the art that the optical system may be maintained stationary and that the plug may be rotated within the reader head. Thus, relative motion may be provided either by the motion of the medium or by the motion of the reader head, relative to the other, or by motion of both. Under certain conditions it may also be advantageous to substitute a standard television camera for the present reader head in order to dispense with relative mechanical motion altogether.

Although the source of illumination has been shown to be an incandescent, high-intensity lamp, other sources of illumination, including lasers, may be used. The light may be directed or diffused, depending on the particular requirements of the specific application.

Electronic scanning of the linear diode array is used in a preferred embodiment of the invention in order to reduce the required amount of circuitry, as well as the cost of the system. With the latter implementation, serial readout of the diode output signals is obtained. However, the invention is not so limited and simultaneous sampling of all diodes may be preferred under certain conditions, for example, to speed up the operation.

Variations may be implemented with respect to certain portions of the method disclosed. Thus, an alternative technique for locating the peaks which indicate the presence of unknown characters, was discussed in connection with FIG. 20. Other modifications may be made where desired. For example, although FIG. 7B illustrates a circular configuration of matrix elements against which the test element is compared by an edge enhancement operation, different types of configurations may be used. Thus, the neighboring elements may be arranged in an X-format configuration, with the test element at the center. Another way of arranging these elements is to cluster them at the corners of a square, with the clusters spaced from the centrally located test element. The criteria that must be observed in any of these configurations, is to preserve symmetry by placing the test element at the center of mass (centroid) of the configuration of neighboring elements and to place the most distant element of the configuration no farther than is permissible by considerations of line width of the unknown pattern.

It has already been mentioned that certain steps of the inventive method disclosed herein are advantageously performed in the microprocessor, although they could be implemented outside the latter if desired. Other operations which are performed by circuitry, e.g. by the correlator, could also be implemented in the microprocessor. The decision where, when and how to perform and implement a particular function is dictated primarily by the desired performance, by economic factors, by convenience and, at times, by the commercial availability of electronic components that have certain desired characteristics. Accordingly, whether or not an operation is performed in the microprocessor or outside of it, is a consideration which is extraneous to the invention itself.

From the foregoing discussion it will be clear that the invention lends itself to numerous variations, modifications, substitutions and equivalents that lie well within the knowledge of those skilled in the art. Accordingly, it is intended that the invention be limited only by the scope of the appended claims.

We claim:

1. A system for serially reading out a succession of unknown, discrete line patterns approximately conforming to an expected pattern size, spacing and line width respectively and disposed in approximate alignment along a predetermined pattern on a pattern-carrying medium, each of said unknown patterns being selected from at least one set of known mutually different patterns;

said system comprising:

means for illuminating said medium:

a light-receiving system including an array of light sensitive devices for sensing diffused light reflected from said path, said array being adapted to generate a plurality of output signals each having an amplitude which is a function of the intensity of light reflected by a corresponding one of a plurality of discrete area elements on the surface of said medium;

means for periodically sampling said output signals of said array, successive samplings of said output signals of said array being representative of the light reflected by successive columns of said discrete area elements on said medium surface, wherein each column is perpendicular to said path;

means responsive to said samplings of said output signals for providing status indications for respective ones of said area elements each representative of the presence or absence of a pattern line in each of said area elements;

first and second storage means;

means for storing said status indications derived from successive samplings of said output signals of said array at addressable memory locations of said first storage means, said stored status indications jointly defining a pattern map of each of said unknown patterns by the position of said status indications on an imaginary grid matrix whose matrix elements correspond to said area elements of said pattern-carrying medium surface;

means for counting said status indications representative of the presence of a pattern line in each of said area elements derived from each of said samplings;

means for determining the running sum of said line-present status indications for M samplings, where M samplings covers a dimension in the path direction which approaches without exceeding the expected pattern dimension in said path direction;

means for storing a predetermined count threshold in said second storage means;

means for comparing the running sum of line-present status indications in the information accumulated from M samplings of said array output signals until first and second running sums are detected which are, in sequence, smaller and greater respectively than said count threshold;

means for accumulating said status indications in said first storage means from a plurality of successive samplings, said plurality of samplings comprising said M samplings whose running sum is greater than said count threshold and N subsequent samplings, where N+M is the number of samplings required to completely cover said succession of unknown patterns;

means for collecting data from said stored status indications;

means for determining the running sum of line-present status indications in said collected data for P samplings, where P is the number of samplings required to cover the maximum expected pattern dimension in said path direction;

means for detecting peaks in said last-recited running sum of line-present status indications;

means for eliminating data collected from said samplings outside a span which asymmetrically straddles a first selected one of said peaks in said path direction, said span measuring $H_1 > P$, said last-recited means being effective to reduce the area for consideration in said grid matrix to a portion of the latter which includes a first unknown pattern corresponding to said first selected peak;

means for locating the centroid of said status indications representative of the presence of a pattern line in each of said area elements in said path direction within said grid matrix portion;

means for locating the centroid of said status indications representative of the presense of a pattern line in each of said area elements in said grid matrix portion in a direction perpendicular to said path;

means for reducing the area for consideration of said grid matrix portion by eliminating data collected outside a span having a dimension of $V_1$ elements in said perpendicular direction centered on said last-located centroid, where $V_1 > P$;

said centroid-locating and area-reducing means being adapted to carry out at least one further area reduction to locate said first unknown pattern within a grid matrix portion having dimensions in said path direction and said perpendicular direction respectively of $H_2$ by $V_2$ elements where $H_1 > H_2 P$, and $V_1 > V_2 > P$;

means including said centroid-locating and area-reducing means for locating the remaining unknown patterns of said succession in identically dimensioned grid matrix portions each of which straddles a separate selected peak whereby the map of each unknown pattern is defined in a separate one of said grid matrix portions;

means for identifying said unknown patterns with reference to known patterns of said set, said identifying means including:

means for storing a pattern map and a care map respectively in said second storage means for each of said known patterns;

means for comparing the pattern map of a first one of said succession of unknown patterns with the pattern map of a first known pattern to determine identities between correspondingly positioned area elements in said compared maps;

means for comparing the identical elements so determined with correspondingly located elements of the care map of said first known pattern to determine identities there between, the number of elements determined to be identical by said last-recited comparing means constituting a correlation index;

means including both said previously recited comparing means for successively comparing said first unknown pattern with the remaining known patterns of said set to provide a correlation index for each such comparison;

means for selecting the largest and second largest ones of said correlation indices;

means for storing in said second storage means respectively, a predetermined correlation threshold, a predetermined minimum difference threshold, and the difference in magnitude between the largest and second largest ones of said correlation indices;

means for comparing said largest correlation index to said correlation threshold;

means responsive to said last-recited comparing means if said correlation threshold is exceeded for comparing said difference in magnitude to said minimum difference threshold;

means responsive to said last-recited comparing means if said minimum difference threshold is exceeded for storing a standard code for said first unknown pattern representative of the known pattern that produced said largest correlation index upon comparison; and means for storing an error code if either one of said thresholds is larger than the quantity compared thereto;

whereby said system is further adapted to read out the remaining stored for each identified pattern, and an error code is stored for each pattern which remains unidentified.

2. A system in accordance with claim 1, wherein said means for storing a pattern map and a care map further includes means for storing a map of each of said known patterns for a plurality of possible positions within the grid matrix portion occupied by said map;

said means for comparing the unknown pattern under test with successive known patterns of said set including means for performing said comparison for each of said plurality of positions for respective known patterns; and means for retaining only the maximum correlation index resulting from said comparison of each known pattern for said plurality of positions;

whereby said largest and second largest correlation indices are selected from said respective maximum correlation indices.

3. A system in accordance with claim 2, wherein said plurality of positions for respective known patterns comprises 9 different positions of each known pattern within its grid matrix portion.

4. A system in accordance with claim 2, wherein $H_1 = V_1$ and $H_2 = V_2$.

5. A system in accordance with claim 3, wherein:
$M = 10$
$N = 250$
$P = 14$
$H_1 = V_1 = 18$, and
$H_2 = V_2 = 16$.

6. A system in accordance with claim 2, and further comprising:

means for providing said selected peaks at locations along said path which conform to the expected spacing of said unknown patterns;

means for providing a count of said selected peaks;

means for storing a peak count threshold in said second storage means equal to the predetermined number of discrete patterns in said succession;

means for comparing said selected peak count to said peak count threshold; and means responsive to said last-recited comparing means to initiate the isolation of said unknown patterns within their respective grid matrix portions when said peak count threshold is reached by said count.

7. A system in accordance with claim 6, in which said medium surface is cylindrical and is encircled by said path; and wherein said succession consists of 7 patterns positioned along said path.

8. A system in accordance with claim 2, and further comprising:

means for choosing peaks from said detected peaks only at locations along said path which conform to the expected spacing of said unknown patterns;

means for selecting the largest one of said chosen peaks;

means for blanking out Q scans of data in a region straddling the location of said selected largest peak;

means for counting line-present signals in the remaining portion of said stored data;

means for determining the running sum of said last-recited signals for P scans;

means including said peak detecting means for detecting peaks in said last-recited running sum;

means for repeating the foregoing process of selecting the largest peak from said last-detected peaks;

means for providing a count of said selected peaks;

means for storing a peak count threshold in said second storage means equal to the predetermined number of discrete patterns in said succession;

means for comparing the count of said selected peaks to said peak count threshold; and means responsive to said last-recited comparing means to initiate the isolation of said unknown patterns within their respective grid matrix portions when said peak count threshold is reached by said count.

9. A system in accordance with claim 8, wherein the area covered by said Q scans extends $-2$ scans and $+16$ scans respectively on opposite sides of said largest peak.

10. A system in accordance with claim 2, wherein said means for periodically sampling the output signals of said array is adapted to sample at a rate sufficiently high to provide multiple samplings of the line width of said patterns.

11. A system in accordance with claim 2, wherein said array comprises a plurality of aligned, discrete, light sensitive devices each adapted to generate a separate output signal; and said sampling means including means for periodically scanning the output signals of said array in succession.

12. A system in accordance with claim 11, and further including means for providing relative motion in said parallel direction between said medium and said light receiving system at a velocity which permits multiple scans of said array output signals to be performed within the line width of said patterns.

13. A system in accordance with claim 11, wherein said means for collecting data includes means for accepting as data only status indications from the central portion of each scan, said central scan portions bracketing the expected location of an unknown pattern on said medium in said perpendicular direction.

14. A system in accordance with claim 13, wherein said array includes 64 photodiodes and wherein said central scan portion covers 32 photodiodes symmetrically positioned with respect to the center of each scan.

15. A system in accordance with claim 1, wherein said means for comparing the maps of said unknown and known patterns respectively includes an EXCLUSIVE OR circuit connected to receive status indication signals at its inputs corresponding to each of said compared maps; and said means for comparing the identical elements determined by said last-recited comparing means with corresponding elements of said care map includes a logical AND circuit connected to receive status indication signals at its inputs corresponding to said compared elements.

16. A system in accordance with claims 1 or 2, and further comprising:
   means for generating said known pattern maps by repeatedly reading a learning set, said learning set comprising a plurality of said media which jointly contain at least one example of each of said known patterns; and
   said means for storing said known pattern maps in said second storage means including means for storing an appropriate status indication for each element of each repeatedly read known pattern in which the presence or absence respectively of a line is indicated for the majority of readings of said known pattern.

17. A system in accordance with claim 16 and further comprising means for generating said care maps including:
   means for successively comparing the pattern map of a first one of said set of known patterns with the pattern map of each of the remaining patterns of said set to determine identities between correspondingly located elements of said compared pattern maps, whereby the pattern map having the largest number of elements identical to those of the pattern map of said first known pattern is defined as most similar thereto;
   means for identifying correspondingly located dissimilar elements in the map of said first known pattern and said most similar map;
   means for generating a preliminary care map for said first known pattern containing only said dissimilar elements;
   means for successively comparing said preliminary care map to the pattern map of each of the remaining known patterns of said set to identify correspondingly located, dissimilar elements;
   means for generating a refined care map for said first known pattern containing only said first-identified dissimilar elements which are also identified as dissimilar in each of said last-recited comparisons; and
   means for repeating the foregoing process to generate care maps for the remaining patterns of said set of known patterns.

18. A system in accordance with claims 1 or 11, wherein said illuminating means is a light source and wherein the desired light intensity varies in accordance with the conditions encountered during the operation;
   said system further comprising means for successively approximating the desired light intensity reflected to said array by correspondingly varying the power applied to said light source;
   whereby the actual light intensity is capable of rapidly following changes in the desired light intensity.

19. A system in accordance with claim 18, wherein selected ones of said light sensitive devices constitute a predetermined control group;
   said system further comprising:
   means for sampling the output signals derived from said control group for each of said scans;
   means for comparing the total output of said control group against a predetermined intensity threshold at intervals determined by the scan rate;
   means for providing a step increase from zero power to full power of said light source following the initial comparison;
   means for turning said light source off at the first-occurring comparison following said initial comparison at which said light intensity has risen above said intensity threshold;
   means for providing a step increase to half power of said light source at the next comparison at which said light intensity has fallen below said intensity threshold;
   means for providing a step increase or step decrease of light source power at each subsequent comparison at which said light intensity is smaller or greater respectively than said intensity threshold, the magnitude of said last-recited step being determined by the relationship $K/2^{n-1}$, where:
   K is the maximum level of a predetermined plurality of light intensity levels, and
   n is the number of comparisons remaining to be carried out; and
   means for terminating the operation of said comparing means after a predetermined number of said comparisons have taken place.

20. A system in accordance with claims 1 or 11, wherein said means for providing status indications comprises:
   means for storing the amplitude of each of said output signals in said first storage means as one of a predetermined plurality of light intensity ' levels corresponding to the light reflected by a corresponding area element of said surface;
   means for testing the intensity level stored for each area element with respect to the average of the intensity levels stored for a plurality of neighboring area elements, said neighboring elements being arranged in a predetermined configuration symmetrically disposed with respect to the element under test and positioned no closer to the latter than said expected line width of said patterns, said test means including means for comparing said average intensity level with the intensity level stored for said test element; and
   means for providing a line-present or line-absent status indication for said test element depending on whether its intensity level is lower or higher respectively than said average intensity level.

21. A system in accordance with claim 20, wherein the amplitude of said output signals is stored as one of possible 256 light intensity levels.

22. A system in accordance with claim 20, and further including:
   a programmable control circuit;
   A/D conversion means for successively converting each of said output signals from its analog format to a multi-bit digital signal, the amplitude of each of said output signals being represented as one of said predetermined plurality of light intensity levels by its corresponding digital signal;
   means for applying the output of said A/D conversion means to said first storage means under the control of said control circuit;
   summing means controlled by said control circuit and having one input thereof coupled to the output of said first storage means, said summing means being adapted to receive data from said first storage means under the control of said control circuit;

a summing register coupled to the output of said summing means and controlled by said control circuit;

means for coupling the output of said summing register to a further input of said summing means;

first and second D/A conversion means having their inputs coupled to the output of said summing register and to the output of said first storage means respectively;

said comparing means including first and second threshold setting means coupled to the output of said first D/A conversion means; and first and second comparators having one input coupled to said first and second threshold setting means respectively and another input coupled to the output of said second D/A conversion means, each of said comparators being adapted to provide a binary status indication signal at its output if the threshold set for it is exceeded;

first and second shift registers coupled to the outputs of said first and second comparators respectively to receive said status indication signals under the control of said control circuit; and first and second buffer means coupled to the outputs of said first and second shift registers respectively;

whereby the analog output signals provided by said array are converted to binary status indication signals each representative of the presence of absence respectively of a line of an unknown pattern on the corresponding element of said medium surface.

23. A system in accordance with claim 1, and further comprising means for determining a normalization index for each identified pattern of said succession equal to the ratio of a constant and the number of dissimilar elements in the care map of the corresponding known pattern, said normalization index being a figure of merit of correct pattern identification.

24. A system in accordance with claims 1 or 11, wherein said succession of unknown patterns comprises a string of characters and wherein said known patterns are selected from a set of alphabetical characters and a set of numerical characters, the position of each unknown character on said medium surface being determinative of the set to which it belongs;

said system further comprising:

means for setting a syntax flag for each unknown character depending on its position in said character string; and means for recognizing said syntax flag to identify the set of characters against which the unknown character currently being read is to be compared.

25. A method for serially reading a succession of unknown, discrete line patterns approximately conforming to an expected pattern size, spacing and line width respectively and disposed in approximate alignment along a predetermined path on a pattern-carrying medium, each of said unknown patterns being selected from at least one set of known, mutually different patterns;

said method comprising the operations of:

(1) illuminating said medium;

(2) sensing light reflected from said path by the use of a light-receiving system, said system including a light sensitive array adapted to generate a plurality of output signals each capable of providing a status indication representative of the presence or absence of a line of said unknown patterns in a discrete area element on a surface of said medium;

(3) periodically sampling the output signals of said array, the output signals derived from successive samplings of said array being representative of light reflected by successive columns of said discrete area elements on said medium surface, wherein each column is perpendicular to said path;

said output signals representative of the presence of a line being jointly adapted to define maps of said unknown patterns by their position on an imaginary grid matrix of elements corresponding to said area elements, said matrix being dimensioned to completely encompass said succession of unknown patterns in the path direction and in a direction perpendicular thereto respectively;

(4) locating each of said unknown patterns within said grid matrix including the steps of:

(a) comparing data representative of a running sum of said output signals indicative of the presense of a line derived from an accumulation of said sampled output signals for M samplings of said array to detect first and second running sums which are, in sequence, smaller and greater respectively than a predetermined count threshold, where the dimension in the path direction defined by said M samplings approaches but is less than the expected pattern dimension in the same direction;

(b) storing the data representative of said accumulated output signals for said M samplings whose running sum is greater than said count threshold;

(c) storing data collected from said last-recited M samplings and accumulated from N successive samplings taken subsequent to said last-recited M samplings, where $N+M$ is the number of samplings required to completely sample said succession of unknown patterns in said path direction;

(d) determining a running sum of said accumulated output signals in said stored data for P samplings, where P is the number of samplings required to cover the maximum expected pattern dimension in said path direction;

(e) detecting peaks in said running sum of said accumulated output signals;

(f) eliminating data collected from said samplings outside a span which asymmetrically straddles a first-selected one of said peaks in said path direction, said span measuring $H_1$ elements, where $H_1 > P$, said data elimination being effective to reduce the area for consideration in said grid matrix to a portion thereof which includes a first unknown pattern corresponding to said first selected one of said peaks;

(g) locating the centroid of said line-present output signals in said path direction within said portion of said grid matrix;

(h) locating the centroid of said line-present output signals within said portion of said grid matrix in a direction perpendicular to said path;

(i) reducing said portion of said grid matrix to a perpendicular dimension of $V_1$ elements centered on said last-located centroid by eliminating sampling data collected beyond said perpendicular dimension, where $V_1 > p$;

(j) repeating said centroid-locating and area-reducing steps at least once until said first unknown pattern is located within a grid matrix portion whose dimensions are $H_2 > H_2P$, and $V_1 > V_2 > P$; and (k) repeatedly performing said centroid-locating and area-reducing steps to locate each remaining unknown pattern of said succession of unknown patterns in identically dimensioned grid matrix portions each straddling a separate selected peak;

(5) identifying each of said unknown patterns relative to the known patterns of said set, including the steps of:

(a) comparing the map of said first unknown pattern with a previously stored map of a first one of said set of known patterns to determine identities between correspondingly located elements in said compared maps;

(b) comparing said last-determined elements with corresponding elements of a previously stored care map of said first known pattern to determine identities between correspondingly located elements, the number of identical elements determined by said comparison with said care map providing a correlation index;

(c) repeating steps (5) (a) and (5) (b) for the remaining ones of said set of known patterns;

(d) selecting the largest and the second largest of the correlation indices so determined;

(e) determining the difference in magnitude between said two selected indices;

(f) comparing said largest index to a predetermined correlation threshold;

(g) comparing said magnitude difference to a predetermined minimum difference threshold if said correlation threshold is exceeded in step (5) (f);

(h) storing a standard code for said first unknown pattern if said minimum difference threshold is exceeded in step (5) (g), said standard code being representative of the known pattern to which said largest correlation index corresponds;

(i) storing an error code if either one of said thresholds is larger than the quantity compared thereto in steps (5) (f) or (5) (g) and (j) repeating steps (5) (a) through (5) (i) for each of the remaining unknown patterns in said succession;

whereby the patterns on said medium surface are read out and a representative standard code is stored for each identified pattern, and an error code is stored for each pattern which remains unidentified.

26. A method in accordance with claim 25, and further including the steps of:

repeating steps (5)(a) and (5)(b) for each of a plurality of possible locations of each known pattern within said grid matrix; and retaining only the maximum correlation index determined for a given known pattern for selection purposes in step (5)(d);

whereby said largest and second largest correlation indices are selected from said respective maximum correlation indices.

27. A method in accordance with claim 25, wherein said peaks are selected only from those detected peaks whose location conforms to the expected spacing of said unknown patterns along said path;

and further comprising the steps of:

providing a count of said selected peaks;

comparing said last-recited count to a predetermined peak count threshold; and initiating the isolation of said unknown patterns within their respective portions of said grid matrix when said peak count threshold is reached;

whereby said peak count threshold may be selected to equal the predetermined number of unknown patterns in said succession to provide an indication that all patterns have been located.

28. A method in accordance with claim 25, and further comprising the steps of:

choosing peaks from said detected peaks only at locations along said path which conform to the expected spacing of said unknown patterns;

selecting the largest one of said chosen peaks;

blanking out Q scans of data in a region straddling the location of said selected largest peak;

counting line-present signals in the remaining portion of said stored data;

determining the running sum of said last-recited signals for P scans;

detecting peaks in said last-recited running sum; and repeating the process of selecting the largest peak until the number of peaks so selected is equal to the predetermined number of unknown patterns which constitute said succession.

29. A method in accordance with claim 28, wherein said Q scans are selectively located $-2$ scans and $+16$ scans respectively on opposite sides of said largest peak.

30. A method in accordance with claim 26, wherein said sampling occurs at a rate sufficiently high to provide multiple samplings of the line width of said patterns.

31. A method in accordance with claim 26 wherein:
$M = 10$
$N = 250$
$P = 14$
$H_1 = V_1 = 18$
$H_2 = V_2 = 16$; and wherein said plurality of possible locations is equal to 9.

32. A method in accordance with claim 26, wherein said array comprises a plurality of aligned, discrete light sensitive devices each adapted to generate a separate one of said output signals;

said method further including the steps of:

scanning the output signals of said array in succession during each of said periodic samplings; and providing relative motion in the direction of said path between said medium and said light receiving system at a velocity which permits multiple scans of said array output signals to be performed during a single line width of said patterns.

33. A method in accordance with claim 32, wherein the collection of data from the information accumulated by each of said scans is limited to the central portion of said scans which brackets the expected location of an unknown pattern on said medium.

34. A method in accordance with claim 25, wherein in step (5)(a) the status indication signals stored at corresponding locations of the compared maps are combined by an EXCLUSIVE OR operation; and in step (5)(b) the status indication signals of the compared elements are combined by a logical AND operation.

35. A method in accordance with claim 26, wherein said maps of said known patterns are generated by repeatedly reading a learning set, said learning set comprising a plurality of said media which jointly contain at least one example of each of said known patterns; and storing a status indication for each element of each repeatedly read known pattern in which the presence or absence respectively of a line is indicated for the majority of readings of said known pattern.

36. A method in accordance with claim 35, wherein the generation of each of said care maps includes the steps of:

successively comparing the pattern map of a first one of said set of known patterns with the pattern map of each of the remaining patterns of said set to determine identities between correspondingly located elements of said compared pattern maps, whereby the pattern map having the largest number of elements identical to those of the pattern map of said first known pattern is defined as most similar thereto;

identifying correspondingly located dissimilar elements in the map of said first pattern and said most similar map;

generating a preliminary care map for said first known pattern containing only said dissimilar elements;

successively comparing said preliminary care map to the pattern map of each of the remaining known patterns of said set to identify correspondingly located dissimilar elements;

generating a refined care map for said first known pattern containing only said first-identified dissimilar elements which are also identified as dissimilar in each of said last-recited comparisons; and repeating the foregoing process to generate care maps for the remaining patterns of said set of known patterns.

37. A method in accordance with claims 25 or 32 wherein the illumination of said medium is provided by a variably powered light source and wherein the desired light intensity for reading out said patterns may change in accordance with conditions encountered during the operation;

said method further including the steps of varying the light intensity provided by said light source through corresponding changes of the applied power in a manner which successively approximates the desired light intensity at any given time during said operation;

whereby the actual light intensity is capable of rapidly following changes in the desired light intensity.

38. A method in accordance with claim 37 wherein said successive approximations are carried out by the sequential steps of:

sampling the output signals derived from a predetermined control group of said light sensitive devices for each of said scans;

comparing the total output of said control group against a predetermined intensity threshold at intervals determined by the scan rate;

providing a step increase from zero power to full power of said light source following the initial comparison;

turning said light source off at the first-occuring comparison following said initial comparison at which said light intensity has risen above said intensity threshold;

providing a step increase to half power of said light source at the next comparison at which said light intensity has fallen below said intensity threshold;

providing a step increase or step decrease of light source power at each subsequent comparison at which said light intensity is smaller or greater respectively than said intensity threshold, the magnitude of said last-recited step being determined by the relationship $K/2^{n-1}$, where:

K is the maximum level of a predetermined plurality of light intensity levels, and n is the number of the comparison carried out; and periodically repeating said last-recited operation up to a predetermined number of said comparisons.

39. A method in accordance with claims 26 or 32 wherein the amplitude of each of said device output signals at any given instant is a function of the intensity of light reflected thereto from a single area element of said patterncarrying medium surface and the status indication stored in the corresponding grid matrix elements represents the presence or absence of a line in said area element;

each of said status indications being derived from the corresponding output signal by the steps of:

storing the amplitude of said output signal as one of a predetermined plurality of light intensity levels;

testing the intensity level stored for the corresponding area element with respect to the average of the intensity levels stored for a plurality of neighboring area elements, said neighboring elements being arranged in a predetermined configuration symmetrically disposed with respect to the element under test and positioned no closer to the latter than said expected line width of said patterns, said testing operation including the step of comparing said average intensity level with the intensity level stored for said test element; and storing a line-present or line-absent status indication for said test element depending on whether its intensity level is lower or higher respectively than said average intensity level.

40. A method in accordance with claim 25 and further including the step of determining a normalization index for each identified pattern from the ratio of a constant and the number of dissimilar elements in the care map of the corresponding known pattern, said normalization index being indicative of the degree of certainty of correct pattern identification.

41. A method in accordance with claims 26 or 32 wherein said succession of unknown patterns comprises a string of characters and wherein said known patterns comprise a set of alphabetical characters and a set of numerical characters from which said unknown characters have been selected, the position of each unknown character on said medium surface being determinative of the set to which it belongs;

said method further including the steps of:

setting a syntax flag for each unknown character depending on its position in said string; and recognizing said syntax flag to identify the set of characters against which the unknown character currently being read is to be compared.

42. A system for serially reading out a string of unknown, discrete characters of approximately uniform expected size, spacing and line width respectively disposed in approximate alignment along a path which encircles a reflective cylindrical surface, each of said unknown characters being selected from either a set of alphabetical characters or a set of numerical characters depending on the position of the character along said path;

said system comprising:

an incandescent light source for illuminating said surface;

a light receiving system for sensing diffused light reflected from said path, said light receiving system including a light sensitive array of aligned, discrete photodiodes each adapted to generate a separate output signal, each of said output signals having an amplitude which is a function of the intensity of light reflected by a discrete area element of said surface;

means for providing relative rotary motion between said surface and said light receiving system;

means for successively scanning the output signals of said diodes at periodic intervals, said scanning means being adapted to perform multiple scans for each character line width during said relative rotary motion, successive scans of said array being representative of the light reflected by successive columns of said discrete area elements on said surface, wherein each column is perpendicular to said path;

first and second storage means;

means for storing the amplitude of each of said output signals in said first storage means as one of a predetermined plurality of light intensity levels corresponding to the light reflected by a corresponding area element of said surface;

means for testing the intensity level of each area element with respect to the average of the intensity levels of a plurality of neighboring area elements, said neighboring area elements being arranged in a predetermined configuration symmetrically disposed with respect to the element under test and positioned no closer to the latter than said expected character line width, said test means including means for comparing said average intensity level with the intensity level stored for said test element;

means for providing a line-present or line-absent status indication for said test element depending on whether its intensity level is lower or higher respectively than said average intensity level;

means for storing said status indications at corresponding addresses of said first storage means, said stored status indications jointly defining maps of said unknown characters by their position on an imaginary grid matrix whose matrix elements correspond to said area elements of said cylindrical surface, means for setting a syntax flag for each unknown character depending on its position in said character string;

means for locating each of said unknown characters including means for counting line-present signals in said stored status indications derived from successive samplings;

means for determining the running sum of said line-present signals for M samplings, where M samplings covers a dimension in the path direction which approaches without exceeding the expected character dimension in said path direction;

means for storing a predetermined count threshold in said second storage means;

means for comparing the running sum of line-present signals in the information accumulated from M scans of said array output signals until first and second running sums are detected which are, in sequence, smaller and greater respectively than said count threshold;

means for accumulating said status indications in said first storage means from a plurality of successive scans, said plurality of scans comprising said M scans whose running sum is greater than said count threshold and N subsequent scans, where N+M is the number of scans required to completely cover said string of unknown characters;

means for collecting from said stored status indcations only the central portion of each scan for use as data, said central scan portion bracketing the expected location of said unknown patterns in said vertical direction;

means for determining the running sum of line-present signals in said collected data for P scans, where P is the number of scans required to cover the maximum expected character dimension in said path direction;

means for detecting peaks in said last-recited running sum of line-present signals;

means for eliminating data collected from said samplings outside a span which asymmetrically straddles a first selected one of said peak in said path direction, said span measuring $H_1$ elements, where $H_1 > P$, said data elimination means being effective to reduce the area for consideration in said grid matrix to a portion thereof which includes a first unknown pattern corresponding to said first selected peak;

means for locating the centroid of line-present elements in said path direction within said grid matrix portion;

means for locating the centroid of line-present elements in said grid matrix portion in a direction perpendicular to said path;

means for reducing said grid matrix portion by eliminating data collected outside a scan portion of $V_1$ elements in said perpendicular direction centered on said last-located centroid, where $V_1 < P$;

said centroid-locating and area-reducing means being adapted to carry out at least one further area reduction to locate said first unknown character within a grid matrix portion having dimensions in said path direction and in said perpendicular direction respectively of $H_2$ by $V_2$ elements, where $H_1 > H_2 > P$, and $V_1 > V_2 > P$; and means including said centroid-locating and areareducing means for locating the remaining unknown characters of said string in identically dimensioned grid matrix portions each straddling a separate selected peak;

means for recognizing said syntax flag to identify the set of characters against which each unknown character is to be compared;

means for identifying said located unknown characters with reference to the known characters of said identified character set including means for storing a character map and a care map respectively in said second storage means for each of said known characters, said character map being stored for each of a plurality of different positions of said known character on said map;

means for comparing the character map of a first one of said string of unknown characters with the character map of a first known character for each of said plurality of positions to determine identities between correspondingly located elements in said compared maps;

means for comparing the identical elements so determined for each of said comparisons with correspondingly located elements of the care map of said first known character to determine identities therebetween, the number of elements determined to be identical by said last-recited comparing means constituting a correlation index;

means for selecting the maximum correlation index determined for said first known character for said plurality of positions;

means including both said previously recited comparing means for successively comparing said first unknown character with the remaining known characters of said identified character set to provide a maximum correlation index for each such comparison;

means for selecting the largest and second largest ones of said maximum correlation indices;

means for storing in said second storage means respectively, a predetermined correlation threshold, a predetermined minimum difference threshold, and the difference in magnitude between said thresholds;

means for comparing said largest correlation index to said correlation threshold;

means responsive to said last-recited comparing means if said correlation threshold is exceeded for comparing said difference in magnitude to said minimum difference threshold;

means responsive to said last-recited comparing means if said minimum difference threshold is exceeded for storing a standard code for said first unknown character representative of the known character that produced said largest correlation index upon comparison; and means for storing an error code if either one of said thresholds is larger than the quantity compared thereto.

43. A system in accordance with claim 42 and further comprising:

means for providing said selected peaks at locations along said path which conform to the expected spacing of said unknown characters;

means for providing a count of said selected peaks;

means for storing a peak count threshold in said second storage means equal to the number of characters in said string;

means for comparing said selected peak count to said peak count threshold; and means responsive to said last-recited comparing means to initiate the isolation of said unknown characters within their respective grid matrix portions when said peak count threshold is reached by said count.

44. A system in accordance with claim 42 and further comprising:

means for choosing peaks from said detected peaks only at locations along said path which conform to the expected spacing of said unknown characters;

means for selecting the largest one of said chosen peaks;

means for blanking out Q scans of data in a region straddling the location of said selected largest peak;

means for counting line-present signals in the remaining portion of said stored data;

means for determining the running sum of said last-recited signals for P scans;

means including said peak detecting means for detecting peaks in said last-recited running sum;

means for repeating the foregoing process of selecting the largest peak from said last-detected peaks;

means for providing a count of said selected peaks;

means for storing a peak count threshold in said second storage means equal to the predetermined number of characters in said string;

means for comparing the count of said selected peaks to said peak count threshold; and means responsive to said last-recited comparing means to initiate the isolation of said unknown characters within their respective grid matrix portions when said peak count threshold is reached by said count.

45. A system in accordance with claim 42 and further comprising:

means for generating said known character maps by repeatedly reading a learning set, said learning set comprising a plurality of said reflective, cylindrical surfaces which jointly contain at least one example of each of said known characters; and said means for storing said known character maps in said second storage means including means for storing an appropriate status indication for each element of each repeatedly read known character in which the presence or absence respectively of a character line is indicated for the majority of readings of said known character.

46. A system in accordance with claim 45 and further comprising means for generating said care maps including:

means for successively comparing the character map of a first one of respective sets of known characters with the character map of each of the remaining patterns of the corresponding character set to determine identities between correspondingly located elements of said compared character maps, whereby the character map having the largest number of elements identical to those of the character map of said first known character is defined as most similar thereto;

means for identifying correspondingly located dissimilar elements in the map of said first known character and said most similar map;

means for generating a preliminary care map for said first known character containing only said dissimilar elements;

means for successively comparing said preliminary care map to the character map of each of the remaining known characters of the corresponding set to identify correspondingly located, dissimilar elements;

means for generating a refined care map for said first known character containing only said first-identified dissimilar elements which are also identified as dissimilar in each of said last-recited comparisons; and means for repeating the foregoing process to generate a refined care map for each of the remaining characters of said set of known characters.

* * * * *